US012689779B2

(12) United States Patent
Park et al.

(10) Patent No.: US 12,689,779 B2
(45) Date of Patent: Jul. 21, 2026

(54) METHOD FOR PROCESSING MEDIA DATA AND DEVICE FOR PROCESSING MEDIA DATA

(71) Applicant: LG ELECTRONICS INC., Seoul (KR)

(72) Inventors: Jonghwan Park, Seoul (KR); Joonhee Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/730,656

(22) PCT Filed: Jan. 19, 2023

(86) PCT No.: PCT/KR2023/000941
§ 371 (c)(1),
(2) Date: Jul. 19, 2024

(87) PCT Pub. No.: WO2023/140645
PCT Pub. Date: Jul. 27, 2023

(65) Prior Publication Data
US 2025/0106450 A1      Mar. 27, 2025

(30) Foreign Application Priority Data

Jan. 19, 2022  (KR) ........................ 10-2022-0008110
Mar. 28, 2022  (KR) ........................ 10-2022-0038266

(51) Int. Cl.
*H04N 21/2362*      (2011.01)
*H04N 21/434*      (2011.01)

(52) U.S. Cl.
CPC ..... *H04N 21/2362* (2013.01); *H04N 21/4345* (2013.01)

(58) Field of Classification Search
CPC ........... H04N 21/2362; H04N 21/4345; H04N 21/25841; H04N 21/235; H04N 21/435; (Continued)

(56) References Cited

U.S. PATENT DOCUMENTS

2014/0354890 A1*  12/2014  Eyer ................... H04N 21/4524
                                                              348/732
2020/0177931 A1    6/2020  Yamagishi et al.
2021/0014541 A1*   1/2021  Park ................... H04N 21/2381

FOREIGN PATENT DOCUMENTS

KR      10-2017-0134180      12/2017
KR           10-1982382       5/2019
(Continued)

OTHER PUBLICATIONS

PCT International Application No. PCT/KR2023/000941, International Search Report dated Apr. 27, 2023, 14 pages.
(Continued)

*Primary Examiner* — Oschta I Montoya
(74) *Attorney, Agent, or Firm* — LEE, HONG, DEGERMAN, KANG & WAIMEY

(57) ABSTRACT

A method for processing media data according to embodiments may comprise the steps of: receiving service list provision information; transmitting region selection information on the basis of the service list provision information; and receiving media data on the basis of the region selection information.

18 Claims, 77 Drawing Sheets

(58) Field of Classification Search
CPC ........... H04N 21/6334; H04N 21/6405; H04H
60/39; H04H 2201/40; H04H 60/51;
H04H 20/93
See application file for complete search history.

(56) References Cited

FOREIGN PATENT DOCUMENTS

| | | |
|---|---|---|
| KR | 10-2020-0098537 | 8/2020 |
| KR | 10-2308877 | 10/2021 |

OTHER PUBLICATIONS

European Patent Office Application Serial No. 23743489.9, Search Report dated Sep. 9, 2025, 10 pages.
Paul Higgs Hisilicon Technologies Co Ltd: "TM-I0044 diff-A177 vs. A177r1," Digital Video Broadcasting (DVB); Service Discovery and Programme Metadata for DVB-I, XP017859220, Aug. 2020, 175 pages.

* cited by examiner

FIG 4a

| Element or Attribute Name | | Use | Data Type | Format |
|---|---|---|---|---|
| ServiceDiscoveryListTable | | 1 | | Root element |
| | SditInetUrl | 0..N | anyURI | URL to access signaling/ESG objects. |
| | @urlType | 1 | unsignedByte | Type of files available with this URL. |
| Service | | 1..N | | Service information |
| | @serviceId | 1 | unsignedShort | Number that uniquely identifies this service within the scope of the originalNetworkId. |
| | @globalServiceId | 0..1 | uri | Globally unique service identifier. It is mapped with the global service id in the ESG. For the traditional DVB-C/S/T service, this attribute is not present. |
| | @originalNetworkId | 1 | unsignedShort | Number that uniquely identifies the original network which this service was originally generated. |
| | @transportStreamId | 0..1 | unsignedShort | Number that uniquely identifies the transport stream. This attribute should be present in the traditional DVB-C/S/T service, but it may not be present for the DVB-I service with ISO BMFF format. |
| | @frequencyNum | 0..1 | unsignedShort | Number that uniquely identifies the frequency number of physical layer. This attribute shall be present when the service is traditional terrestrial service. |
| | @serviceCategory | 1 | unsignedByte | The category of this service. It can be linear, on-demand, or application service. More detail is listed in the table below. |
| | @svcSeqNum | 1 | unsignedByte | Version of service information in this table -- increments by one for each new version of service data in RFD; wraps around to 0. |
| | @contentFormat | 0..1 | unsignedByte | The format of contents of this service (See Table 8.4). |
| | @hidden | 0..1 | boolean | Indicates whether this service is hidden in theservice list or shown to users. The default value is 'FALSE'. |
| | @selectable | 0..1 | boolean | |
| | @hidden(visible)_guide | 1 | unsignedByte | |
| | @hidden(visible)_presentation | 0..1 | anyURI | |

FIG 4b

| @appRendering | 0..1 | boolean | Indicates whether any application will be executed first and render this service. The default value is 'FALSE'. |
|---|---|---|---|
| @MediaPresentationDescription | 0..1 | anyURI | URL pointing to MPD signaling description |
| @ApplicationInformationTable | 0..1 | anyURI | URL pointing to AIT signaling description |
| @DistributionWindowDescription | 0..1 | anyURI | URL pointing to DWD signaling description |
| RunningStatus | 0..1 | unsignedByte | Specify the status of this service as running, not running or starts in a few seconds, etc.. |
|   @duration | 0..1 | unsignedInt | When the RunningStatus is not running (for example, not running or pausing), the pausing time duration in seconds. |
|   @resumeTime | 0..1 | dateTime | When the RunningStatus is not running (for example, not running or pausing), the resumeddate and time. |
| Name | 0..N | string | Name of the service |
|   @lang | 1 | lang | Language of the service name |
| ServiceLanguage | 0..N | lang | Available languages of the service |
| Icon | 0..N | anyURI | URL pointing to icon (image). Multiple URLs could be used to point to icons (images) of different width and height or different representation formats. |
|   @mimeType | 0..1 | string | The optional MIME type of the icon allowing receivers to preemptively ignore fetching image types they are not capable of using. |
|   @width | 0..1 | unsignedInt | Width of the referenced image in pixels. |
|   @height | 0..1 | unsignedInt | Height of the referenced image in pixels. |
|   @dataSize | 0..1 | unsignedInt | Size of the image data in bytes. |
|   @displayDuration | 0..1 | unsignedInt | The icon(image) display time duration in seconds. |
| svcInetUrl | 0..N | anyURI | URL to access signaling/ESG objects for this service. |
|   @urlType | 1 | unsignedByte | Type of files available with this URL |

FIG 5

| | Hidden (=0) | Hidden (=1) |
|---|---|---|
| hide_guide (=0) | a) When Hidden=0, hide_guide flag is ignored.<br>b) Logical channel visible<br>c) Visible even in EPG/ESG | d) Logical channels are skipped during channel.<br>e) Access to direct channel entry is indicated as if it is not defined.<br>f) Logical channel information may be visible in the EPG depending on the value of hide_guide (=0) |
| hide_guide (=1) | g) When Hidden=0, hide_guide flag is ignored.<br>h) Logical channel visible<br>i) Visible even in EPG/ESG | j) Logical channels are skipped during channel.<br>k) Access to direct channel entry is indicated as if it is not defined.<br>l) Can be processed as a test signal m) Logical channel information may be visible in the EPG depending on the value of hide_guide (=1)<br>n) (new) However, accessible in app service |

FIG 6

| Type | Values | |
| --- | --- | --- |
| 0x0000 | Rendering by device | hidden(visible) presentation |
| 0x0001 | Alternative link of Service provider | www.bbc.co.kr/alternative/music |
| 0x0002 | Linked service(alternative channel) | DVBtriplet : /DITS-(OriginalNetworkID)-(TransportStreamID)-(serviceID)<br><br>Ex) Application/DITS-11-20-06 |
| 0x0003 | Stereoscopic channel guide | DVBtriplet : /DITS-(OriginalNetworkID)-(TransportStreamID)-(serviceID)<br><br>Ex) Application/DITS-11-20-06 |
| 0x0004 | ESG, BCG(Broadband Content Guide) link | loginformDB.html |
| 0x0005 | Alternative app service | App dedicated channel<br><br>e.g.) Access to app using AIT |

FIG 8a

| Element or Attribute Name | | | Use | Data Type | Format |
|---|---|---|---|---|---|
| ServiceDiscoveryListTable | | | 1 | | Root element |
| | SdltInetUrl | | 0..N | anyURI | URL to access signaling/ESG objects. |
| | | @urlType | 1 | unsignedByte | Type of files available with this URL |
| | Service | | 1..N | | Service information |
| | | @serviceId | 1 | unsignedShort | Number that uniquely identifies this service within the scope of the originalNetworkId. |
| | | @globalServiceId | 0..1 | uri | Globally unique service identifier. It is mapped with the global service id in the ESG. For the traditional DVB-C/S/T service, this attribute is not present. |
| | | @originalNetworkId | 1 | unsignedShort | Number that uniquely identifies the original network which this service was originally generated. |
| | | @transportStreamId | 0..1 | unsignedShort | Number that uniquely identifies the transport stream. This attribute should be present in the traditional DVB-C/S/T service, but it may not be present for the DVB-I service with ISO BMFF format. |
| | | @LCN | 0..1 | positiveInteger | Logical ChannelNumber |
| | | @frequencyNum | 0..1 | unsignedShort | Number that uniquely identifies the frequency number of physical layer. This attribute shall be present when the service is traditional terrestrial service. |
| | | @serviceCategory | 1 | unsignedByte | The category of this service. It can be linear, on-demand, or application service. More detail is listed in the table below. |

FIG 8b

| @svcSeqNum | 1 | unsignedByte | Version of service information in this table – increments by one for each new version of service data in RFD; wraps around to 0. |
|---|---|---|---|
| @contentFormat | 0..1 | unsignedByte | The format of contents of this service (See Table 8.4). |
| @hidden | 0..1 | boolean | Indicates whether this service is hidden in theservice list or shown to users. The default value is 'FALSE'. |
| @selectable | 0..1 | boolean | |
| @hidden(visible)_guide | 1 | unsignedByte | |
| RelatedMaterial | | | |
| @HowRelated:href | | | element with an @href attribute carrying the value |
| MediaLocator | | | |
| MediaURI | 0..1 | anyURI | whose value contains a URI to the XML AIT file or image and whose @contentType attribute carries the value. |
| @appRendering | 0..1 | boolean | Indicates whether any application will be executed first and render this service. The default value is 'FALSE'. |
| @MediaPresentation Description | 0..1 | anyURI | URL pointing to MPD signaling description |
| @ApplicationInformation Table | 0..1 | anyURI | URL pointing to AIT signaling description |
| @DistributionWindow Description | 0..1 | anyURI | URL pointing to DWD signaling description |
| Availability | 0..1 | unsignedByte | Specify the status of this service as running, not running or starts in a few seconds, etc.. |
| @ValidFrom | 0..1 | dateTime | The time and date that this service will become or became available. If not specified, it is assumed that the service is already available. |
| @ValidTo | 0..1 | dateTime | The time and date that this service will cease to be available. If not specified, it is assumed that the service will be available indefinitely. |

FIG 8c

| | | | | |
|---|---|---|---|---|
| @Days | | ServiceDays List | Defines which days of the week the service is available. If not specified then the service is available on all days (e.g. ServiceDays="1 4 7" means that the service is only available on Monday, Thursday and Sunday) | |
| @Recurrence | | unsignedInt | Specifies the weekly cadence of the scheduled availability for the service. If not specified then the recurrence occurs every week. | |
| Name | 0..N | string | Name of the service | |
| @lang | 1 | lang | Language of the service name | |
| ServiceLanguage | 0..N | lang | Available languages of the service | |
| Icon | 0..N | anyURI | URL pointing to icon (image). Multiple URLs could be used to point to icons (images) of different width and height or different representation formats. | |
| @mimeType | 0..1 | string | The optional MIME type of the icon allowing receivers to preemptively ignore fetching image types they are not capable of using. | |
| @width | 0..1 | unsignedInt | Width of the referenced image in pixels. | |
| @height | 0..1 | unsignedInt | Height of the referenced image in pixels. | |
| @dataSize | 0..1 | unsignedInt | Size of the image data in bytes. | |
| @displayDuration | 0..1 | unsignedInt | The icon(image) display time duration in seconds. | |
| svcInetUrl | 0..N | anyURI | URL to access signaling/ESG objects for this service. | |
| @urlType | 1 | unsignedByte | Type of files available with this URL | |

FIG 9

```
<RelatedMaterial xsi:type="tva2:ExtendedRelatedMaterialType">
            <!-- 19: Promotional still image -->
        <HowRelated href="urn:tva:metadata:cs:HowRelatedCS:2012:19"/>
        <MediaLocator>
        <MediaUri contentType="image/png">
                http://img-ctv.digitaluk.co.uk/channel7/service_a_linear.png
        </MediaUri>
        </MediaLocator>
        <!-- Alt text -->
        <PromotionalText>Service A</PromotionalText>
        </RelatedMaterial>
        <RelatedMaterial>
        <HowRelated href="urn:tva:metadata:cs:HowRelatedCS:2012:10.5"/>
        <MediaLocator>
                <MediaUri contentType="application/vnd.dvb.ait+xml">
                http://www.channel9.co.uk/player/ait.aitx?channel=channela
        </MediaUri>
                </MediaLocator>
<RelatedMaterial>
```

| Today | | 9:00 | 9:30 | 10:00 | 10:30 |
|---|---|---|---|---|---|
| Ch 4 | Channel 4 HD | Evenig news | | | |
| Ch 5 | BBC ONE HD | This week | | | |
| Ch 6 | BBC Two UHD | No Service | Perspectives : the magic of Houdini | | |
| Ch 7 | ITV HD | Dementiaville | | | |
| Ch 8 | BBC three HD | Family Guy | | | |
| Ch 9 | Discovery channel | Life of bear | | | |
| Ch 10 | | | | | |
| Ch 1001 | Kingdom | Kingdom #18 | | | |

[DVBiServiceListType]

```
<element name="ServiceList" type="dvbisd:DVBiServiceListType"/>
<complexType name="DVBiServiceListType">
    <sequence>
        <element name="Name" type="mpeg7:TextualType" maxOccurs="unbounded"/>
        <element name="ProviderName" type=" mpeg7:TextualType " maxOccurs="unbounded"/>
        <element name="RelatedMaterial" type="tva:RelatedMaterialType" minOccurs="0" maxOccurs="unbounded"/>
        <element name="RegionList" type="dvbisd:RegionListType" minOccurs="0"/>
        <element name="TargetRegion" type="dvbisd:RegionIdRefType" minOccurs="0" maxOccurs="unbounded"/>
        <element name="LCNTableList" type="dvbisd:LCNTableListType" minOccurs="0"/>
        <element name="Service" type="dvbisd:DVBiServiceType" minOccurs="0" maxOccurs="unbounded"/>
        <any namespace="##other" processContents="lax" minOccurs="0" maxOccurs="unbounded"/>
    </sequence>
    <attribute name="version" type="positiveInteger" use="required"/>
</complexType>
```

FIG 12b

| Name | Semantic Definition | Constraints |
|---|---|---|
| ServiceList | A list of the details and locations of IP services offered by the service provider. A service provider can divide their services into multiple service lists for administrative convenience. | Mandatory |
| Name | The name of this service list in a human readable form. Multiple service list names can be specified as long as they have different xml:lang values. | Mandatory 1..∞ |
| ProviderName | The name of the provider of this service list in a human readable form. Multiple values for the provider name can be specified as long as they have different xml:lang values. | Mandatory 1..∞ |
| RelatedMaterial | Additional material related to the service. Use to signal the following · Service list logos, see clause 5.2.5.1 | Optional 0..∞ |
| RegionList | A list of geographic regions with logical identifiers that are used to provide regionalization of the service list or services in the service list. | Optional |
| TargetRegion | The identifiers of those regions specified in the RegionList for which this service list is targeted. | Optional 0..∞ |
| LCNTableList | The list of tables that define regionalized and packaged logical channel numbers for the services in this service list. | Optional |
| Service | The services that are part of this service list. | Optional 0..∞ |
| @version | The version number of the service list. Must be incremented for every published change. | Mandatory |

FIG 13a

[DVBiServiceType]

```
<complexType name="DVBiServiceType">
  <sequence>
    <element name="UniqueIdentifier" type="dvbisd:ServiceIdentifierType"/>
    <element name="ServiceInstance" type="dvbisd:ServiceInstanceType" minOccurs="0" maxOccurs="unbounded"/>
    <element name="TargetRegion" type="dvbisd:RegionIdRefType" minOccurs="0" maxOccurs="unbounded"/>
    <element name="ServiceName" type="mpeg7:TextualType" maxOccurs="unbounded"/>
    <element name="ProviderName" type="mpeg7:TextualType" maxOccurs="unbounded"/>
    <element name="RelatedMaterial" type="tva:RelatedMaterialType" minOccurs="0" maxOccurs="unbounded "/>
    <element name="ServiceGenre" type="dvbisd-base:Genre" minOccurs="0"/>
    <element name="ServiceType" type="dvbisd-base:ServiceType" minOccurs="0"/>
    <element name="RecordingInfo" type="tva:ControlledTermType" minOccurs="0"/>
    <element name="GuideSource" type="dvbisd-base:BCGOffering" minOccurs="0"/>
  </sequence>
  <attribute name="version" type="positiveInteger" use="required"/>
</complexType>
```

FIG 13b

| Name | Semantic Definition | Constraints |
|------|---------------------|-------------|
| UniqueIdentifier | The unique ID of the service. This ID should never be changed for a service, even if all other parameters of the are changed. Refer to clause 5.2.2 for the suitable formats of the service identifier. | Mandatory |
| ServiceInstance | The instances(s) where the A/V content for the service may be found. If multiple elements of this type are present and available (refer to clause 5.2.4), the one with the lowest value of the @priority attribute has the highest priority. All ServiceInstances for a given Service carry the same editorial content. | Optional<br>$0..\infty$ |
| TargetRegion | The regions where the service is intended to be received. If not specified, no regional constraints exist and the services can be received anywhere. | Optional<br>$0..\infty$ |
| ServiceName | The name of the service. Multiple service names can be specified as long as they have different xml : lang values. | Optional<br>$1..\infty$ |

FIG 13c

| Name | Semantic Definition | Constraints |
|---|---|---|
| ProviderName | The name of the provider of this service in a human readable form. This element should include an xml : lang attribute to identify the language being usued. | Mandatory 1..∞ |
| RelatedMaterial | Additional material related to the service. Use to signal the following · Out of service banners, see clause 5.2.4.3 · Service related applications, see clause 5.2.3 · Service logos, see clause 5.2.5.2 | Mandatory 0..∞ |
| ServiceGenre | The genre of the service. | Optional 0..1 |
| ServiceType | The service type, as defined in ETSI EN 300 488 [6] | Optional 0..1 |
| RecordingInfo | IN some territories this signalling may help a DVB-I client determine whether or not the content from this service may be record, time-shifted and/or redistributed. How clients make use of this signalling is not defined by the present document. The value for this element should be taken from the RecordingInfoCS defined in cause 8.3.3. | Optional 0..1 |
| GuideSource | The details of a broadband contents guide carrying metadata for this service. | Optional 0..1 |
| @version | The version number of the service. Must be incremented for every published change. | Mandatory |

FIG 14a

[ServiceInstanceType]

```
<complexType name="ServiceInstanceType">
    <sequence>
        <element name="DisplayName" type="mpeg7:TextualType" minOccurs="0" maxOccurs="unbounded"/>
        <element name="RelatedMaterial" type="tva:RelatedMaterialType" minOccurs="0" maxOccurs="unbounded"/>
        <element name="DRMSystemId" type="string" minOccurs="0" maxOccurs="unbounded"/>
        <element name="ContentAttributes" type="dvbisd-base:ContentAttributesType" minOccurs="0"/>
        <element name="Availability" type="dvbisd-base:ServiceAvailabilityType" minOccurs="0"/>
        <element name="SubscriptionPackage" type="string" minOccurs="0" maxOccurs="unbounded"/>
        <element name="FTAContentManagement" type="dvbisd:FTAContentManagementType" minOccurs="0"/>
        <element name="SourceType" type="anyURI"/>
        <choice minOccurs="0" maxOccurs="unbounded">
            <element name="DVBTDeliveryParameters" type="dvbisd:DVBTDeliveryParametersType"/>
            <sequence>
                <element name="DVBSDeliveryParameters" type="dvbisd:DVBSDeliveryParametersType"/>
                <element name="SATIPDeliveryParameters" type="dvbisd:SATIPDeliveryParametersType" minOccurs="0"/>
            </sequence>
            <element name="DVBCDeliveryParameters" type="dvbisd:DVBCDeliveryParametersType"/>
            <element name="RTSPDeliveryParameters" type="dvbisd:RTSPDeliveryParametersType"/>
            <element name="MulticastTSDeliveryParameters" type="dvbisd:MulticastTSDeliveryParametersType"/>
            <sequence>
                <element name="DASHDeliveryParameters" type="dvbisd:DASHDeliveryParametersType"/>
                <element name="MulticastTSDeliveryParameters" type="dvbisd:MulticastTSDeliveryParametersType"
                    minOccurs="0"/>
            </sequence>
            <any namespace="##other" processContents="lax"/>
        </choice>
    </sequence>
    <attribute name="priority" type="integer" default="0"/>
</complexType>
```

FIG 14b

| Name | Semantic Definition | Constraints |
|---|---|---|
| DisplayName | Human-readable name of the service associated to this specific Service Location. Multiple service names may be provided as long as they all have different xml:lang attributes. When not present, ServiceName is used. | Optional 0..∞ |
| RelatedMaterial | Additional material related to the service. Use to signal the following<br>• Out of service banners, see clause 5.2.4.3<br>• Service related applications, see clause 5.2.3<br>• Service logos, see clause 5.2.5.2<br>Any related material with a particular value of HowRelated that is provided within a ServiceInstance element supersedes any corresponding related material with that value of HowRelated that is provided within a Service element. | Optional 0..∞ |
| DRMSystemId | Denotes any content protection schemes being used for this service. The value shall be the same as the @schemeIdURI defined in clause 8.4 of DVB A168 [10] | Optional 0..∞ |
| ContentAttributes | Refer to Annex D.1.3.2 of ETSI TS 103 205 [2] for semantic definition. | Optional 0..1 |
| Availability | Indicates the period(s) in time when this service location is expected to be active. | Optional 0..1 |
| SubscriptionPackage | Identifies the subscription packages in which this service is included. | Optional 0..∞ |
| FTAContentManagement | DVB-I service instances not using DRM may carry a FTAContentManagement element to define the content management policy for the ServiceInstance. The semantics of each attribute are those defined for the correspondingly named fields of the FTA_content_management_descriptor defined in clause 6.2.18.0 of ETSI EN 300 468 [6]. | Optional 0..1 |

FIG 14c

| SourceType | Identifies the primary delivery source for this service instance and thus determines the required delivery parameters according to Table 13. | Optional 0..1 |
|---|---|---|
| DVBTDeliveryParameters | Delivery parameters for DVB-T services. | To be specified in accordance with SourceType as described in Table 13. |
| DVBSDeliveryParameters | Delivery parameters for DVB-S services. | |
| DVBCDeliveryParameters | Delivery parameters for DVB-C services. | |
| RTSPDeliveryParameters | Delivery parameters for RTSP based services. | |
| MulticastTSDeliveryParameters | Delivery parameters for services delivered using multicast UDP. | |
| DASHDeliveryParameters | Delivery parameters for services using DVB DASH [10] delivery. | |
| SATIPDeliveryParameters | Provides parameters that a DVB-I client supporting SAT>IP as a "thin client" can use to receive the service instance from a SAT>IP server. | |
| @priority | The priority of this service instance relative to the other services instances of the service. | Optional |

FIG 15

```
[DASHDeliveryParameters]
<complexType name="DASHDeliveryParametersType">
    <sequence>
        <element name="UriBasedLocation" type="dvbisd-base:dvbExtendedURIType" maxOccurs="unbounded"/>
        <element name="MinimumBitRate" type="unsignedInt" minOccurs="0"/>
    </sequence>
</complexType>
```

| Name | Semantic Definition | Constraints |
|---|---|---|
| UriBasedLocation | Refer to Annex D.1.3.2 of ETSI TS 103 205 [2] for semantic definition. | Mandatory 1..∞ |
| MinimumBitRate | Threshold bit-rate under which an alternative source for the same service should be preferred, if available. | Optional |

FIG 16

```
<Option 1>
<complexType name="DASHDeliveryParametersType">
    <sequence>
        <element name="UriBasedLocation" type="dvbisd-base:dvbExtendedURIType" maxOccurs="unbounded"/>
        <element name="MinimumBitRate" type="unsignedInt" minOccurs="0"/>
        <element name="ComparisonBitRate" type="unsignedInt" minOccurs="0"/>
        <element name="ComparisonContentAttributeType" type="dvbisd-base:ContentAttributesType" minOccurs="0"/>
    </sequence>
</complexType>
<complexType name="ComparisonContentAttributeType">
    <sequence>
        <element name="AudioAttributes" type="tva:AudioAttributesType" minOccurs="0" maxOccurs="unbounded"/>
        <element name="VideoAttributes" type="tva:VudioAttributesType" minOccurs="0" maxOccurs="unbounded"/>
        <element name="CaptionLanguage" type="tva:CaptionLanguageType" minOccurs="0" maxOccurs="unbounded"/>
        <element name="SignLanguage" type="tva:SignLanguageType" minOccurs="0" maxOccurs="unbounded"/>
    </sequence>
</complexType>

<Option 2>
<complexType name="DASHDeliveryParametersType">
    <sequence>
        <element name="UriBasedLocation" type="dvbisd-base:dvbExtendedURIType" maxOccurs="unbounded"/>
        <element name="MinimumBitRate" type="unsignedInt" minOccurs="0"/>
        <element name="ComparisonContentAttributeType" type="dvbisd-base:ContentAttributesType" minOccurs="0"/>
    </sequence>
</complexType>
<complexType name="ComparisonContentAttributeType">
    <sequence>
        <element name="AudioAttributes" type="tva:AudioAttributesType" minOccurs="0" maxOccurs="unbounded"/>
        <element name="VideoAttributes" type="tva:VudioAttributesType" minOccurs="0" maxOccurs="unbounded"/>
        <element name="CaptionLanguage" type="tva:CaptionLanguageType" minOccurs="0" maxOccurs="unbounded"/>
        <element name="SignLanguage" type="tva:SignLanguageType" minOccurs="0" maxOccurs="unbounded"/>
        <element name="ComparisonBitRate" type="unsignedInt" minOccurs="0"/>
    </sequence>
</complexType>
```

FIG 17

```
<ServiceInstance priority="0">
  <DisplayName> ABC drama </DisplayName>
  <ContentAttributes>
    <dvbisd-base:AudioAttributes>
      <tva:Coding href="urn:mpeg:mpeg7:cs:AudioCodingFormatCS:2001:3.2">
        <tva:Name>MPEG-1 Audio Layer II</tva:Name>
      </tva:Coding>
    </dvbisd-base:AudioAttributes>
    <dvbisd-base:AudioAttributes>
      <tva:Coding href="urn:dvb:metadata:cs:AudioCodecCS:2007:3.1">
        <tva:Name>AC3</tva:Name>
      </tva:Coding>
    </dvbisd-base:AudioAttributes>
    <dvbisd-base:VideoAttributes>
      <tva:Coding href="urn:mpeg:mpeg7:cs:VideoCodingFormatCS:2001:2.2.2">
        <tva:Name>MPEG-2 Video Main Profile @ Main Level</tva:Name>
      </tva:Coding>
    </dvbisd-base:VideoAttributes>
  </ContentAttributes>
  <SourceType>urn:dvb:source:dvb-s</SourceType>
  <DVBSDeliveryParameters>
    <DVBTriplet origNetId="1" tsId="1101" serviceId="28106"/>
    <OrbitalPosition>19.2</OrbitalPosition>
    <Frequency>11836000</Frequency>
    <Polarization>horizontal</Polarization>
  </DVBSDeliveryParameters>
</ServiceInstance>
```

56000

```
<ServiceInstance priority="1">
  <DisplayName> ABC drama </DisplayName>
  <SourceType>urn:dvb:source:dvb-dash</SourceType>
  <DASHDeliveryParameters>
    <UriBasedLocation contentType="application/dash+xml">
      <dvbisd-base:URI>https://live.daserste.de/0001 Das%20Erste.mpd</dvbisd-base:URI>
    </UriBasedLocation>
    <MinimumBitrate> 1M </MinimumBitrate>
    <ComparisonBitRate> 7M </ComparisonBitRate>
    <ComparisonContentAttribute>
      <dvbisd-base:VideoAttributes>
        <tva:Coding href="urn:mpeg:mpeg7:cs:VideoCodingFormatCS:2001:2.2.2">
          <tva:Name>HEVC Video Main10 Profile @ Main Level</tva:Name>  : UHD enable
        </tva:Coding>
      </dvbisd-base:VideoAttributes>
    </ComparisonContentAttribute>
  </DASHDeliveryParameters>
</ServiceInstance>
```

```
<api_endpoint_URL>[?<query_params>]

ContentGuideSourceList>
  <ContentGuideSource CGSID="cgs-dvbi-01">
   <Name xml:lang="en">A-Z Content Guide</Name>
   <ProviderName xml:lang="en">A-Z Metadata</ProviderName>
   <RelatedMaterial>
    <HowRelated href="urn:dvb:metadata:cs:HowRelatedCS:2019:1002.1"/>
    <MediaLocator>
      <MediaUri contentType="image/png">
       https://cgs.az.metadata/static/logo.png
      </MediaUri>
    </MediaLocator>
   </RelatedMaterial>
   <ScheduleInfoEndpoint contentType="application/xml">
    <URI>https://cgs.az.metadata/schedule</URI>
   </ScheduleInfoEndpoint>
   <ProgramInfoEndpoint contentType="application/xml">
    <URI>https://cgs.az.metadata/program</URI>
   </ProgramInfoEndpoint>
   <GroupInfoEndpoint contentType="application/xml">
    <URI>https://cgs.az.metadata/group</URI>
   </GroupInfoEndpoint>
  </ContentGuideSource>
</ContentGuideSourceList>
```

FIG 22a

```
DVB-I service scheme
<complex Type name = "ServiceListType">
        <sequence>
                <element name="Name"type="mpeg7:TextualType"maxOccurs="unbounded"/>
                <element name="ProviderName"type="mpeg7:TextualType"maxOccurs=
                "unbounded"/>
                <element name="RelatedMaterial"type="tva:RelatedMaterialType"minOccurs="0"
                maxUccurs="unbounded"/>
                <element name="RegionList"type="dvbisd:RegionListType"minOccurs="0"/>
                <element name="TargetRegion"type="dvbisd:RegionRefType"minOccurs="0"
                maxUccurs="unbounded"/>
                <element name="LCNTableTable"type="dvbisd:LCNTableListType"minOccurs="0"/>
                <choice minOccurs="0">
                        <element name="ContentGuideSourceList"type="dvbisd:
                        ContentGuideSourceListType"/>
                        <element name="ContentGuideSource"type="dvbisd:
                        ContentGuideSourceType"/>
                </choice>
                <element name="Service"type="dvbisd:ServiceType"minOccurs="0" maxOccurs=
                "unbounded"/>
                <any namespace="##other"processContents="lax"minminOccurs="0" maxOccurs=
                "unbounded"/>
        </sequence>
        <attribute name="Version"type="PositiveInteger"use="required"/>
        <attribute name="MinimumMetadataUpdatePeriod"type="duration"use="optional"/>(option 1)
</complexType>

<complex Type name = "ServiceType">
        <sequence>
                <element name="UniqueIdentifier"type="dvbisd:ServiceIdentifierType"/>
                <element name="ServiceInstance"type="dvbisd:ServiceInstanceType"minOccurs="0"
                maxUccurs="unbounded"/>
                <element name="TargetRegion"type="dvbisd:RegionRefType"minOccurs="0"
                maxUccurs="unbounded"/>
                <element name="ServiceName"type="mpeg7:TextualType"maxUccurs=
                "unbounded"/>
                <element name="ProviderName"type="mpeg7:TextualType"maxUccurs=
                "unbounded"/>
                <element name="RelatedMaterial"type="tva:RelatedMaterialType"minOccurs="0"
                maxUccurs="unbounded"/>
                <element name="ServiceGenre"type="tva:GenreType"minOccurs="0"/>
                <element name="ServiceType"type="tva:ControlledTermType"minOccurs="0"/>
                <element name="RecordingInfo"type="tva:ControlledTermType"minOccurs="0"/>
                <choice minOccurs="0">
                        <element name="ContentGuideSource"type="dvbisd:
                        ContentGuideSourceType"/>
                        <element name="ContentGuideSourceRef"type="dvbisd:
                        ContentGuideProviderRedIdType"/>
                        <element name="MinimumMetadataUpdatePeriod"type="dvbisd:
                        MinimumMetadataUpdatePeriodType"minOccurs="0"/>(option 2)
                </choice>
```

FIG 22b

```
                    <element name="ContentGuideSourceRef"type="dvbisd:
                    ContentGuideProviderRedIdType"minOccurs="0"/>
                    <element name="MinimumMetadataUpdatePeriod"type=
                    "dvbisd:MinimumMetadataUpdatePeriodType"minOccurs="0"/>(option 3)
            </sequence>
            <attribute name="Version"type="PositiveInteger"use="required"/>
            <attribute name="dynamic"type="boolean"default="false"/>
            <attribute name="MinimumMetadataUpdatePeriod"type="duration"use="optional"/>
            (option 4)
    </compexType>
    <complexType name="ServiceInstanceType">
            <sequence>
                    <element name="DisplayName"type="mpeg7:TextualType"minOccurs="0"
                    maxOccurs="unbounded"/>
                    <element name="RelatedMaterial"type="tva:RelatedMaterialType"minOccurs="0"
                    maxOccurs="unbounded"/>
                    <element name="ContentProtection"type="dvbisd:ContentProtectionType"
                    minOccurs="0"maxOccurs="unbounded"/>
                    <element name="ContentAttributes"type="dvbisd:ContentAttributesType"
                    minOccurs="0"/>
                    <element name="SubscriptionPackage"type="string"minOccurs="0"
                    maxOccurs="unbounded"/>
                    <element name="FTAContentManagement"type="dvbisd:
                    FTAContentManagementType"minOccurs="0"/>
                    <element name="SourceType"type="anyURI"/>
                    <choice minOccurs="0">
                            <sequence>
                                    <element name="DVBTDeliveryParameters"type="dvbisd:
                                    DVBTDeliveryParametersType"/>
                                    <element name="SATIPDeliveryParameters"type="dvbisd:
                                    SATIPDeliveryParametersType"minOccurs="0"/>
                            </sequence>
                    <element name="DisplayName"type="mpeg7:TextualType"minOccurs="0"
                    maxOccurs="unbounded"/>
                    <element name="RelatedMaterial"type="tva:RelatedMaterialType"minOccurs="0"
                    maxOccurs="unbounded"/>
                    <element name="ContentProtection"type="dvbisd:ContentProtectionType"
                    minOccurs="0"maxOccurs="unbounded"/>
                    <element name="ContentAttributes"type="dvbisd:ContentAttributesType"
                    minOccurs="0"/>
                    <element name="SubscriptionPackage"type="string"minOccurs="0"
                    maxOccurs="unbounded"/>
                    <element name="FTAContentManagement"type="dvbisd:
                    FTAContentManagementType"minOccurs="0"/>
                    <element name="SourceType"type="anyURI"/>
                    <choice minOccurs="0">
                            <sequence>
                                    <element name="DVBTDeliveryParameters"type="dvbisd:
                                    DVBTDeliveryParametersType"/>
                                    <element name="SATIPDeliveryParameters"type="dvbisd:
                                    SATIPDeliveryParametersType"minOccurs="0"/>
                            </sequence>
```

FIG 22c

```
<element name="DisplayName"type="mpeg7:TextualType"minOccurs="0"
maxOccurs="unbounded"/>
<element name="RelatedMaterial"type="tva:RelatedMaterialType"minOccurs="0"
maxOccurs="unbounded"/>
<element name="ContentProtection"type="dvbisd:ContentProtectionType"
minOccurs="0"maxOccurs="unbounded"/>
<element name="ContentAttributes"type="dvbisd:ContentAttributesType"
minOccurs="0"/>
<element name="SubscriptionPackage"type="string"minOccurs="0"
maxOccurs="unbounded"/>
<element name="FTAContentManagement"type="dvbisd:
FTAContentManagementType"minOccurs="0"/>
<element name="SourceType"type="anyURI"/>
<choice minOccurs="0">
        <sequence>
                <element name="DVBTDeliveryParameters"type="dvbisd:
                DVBTDeliveryParametersType"/>
                <element name="SATIPDeliveryParameters"type="dvbisd:
                SATIPDeliveryParametersType"minOccurs="0"/>
        </sequence>
        <sequence>
                <element name="DVBSDeliveryParameters"type="dvbisd:
                DVBSDeliveryParametersType"/>
                <element name="SATIPDeliveryParameters"type="dvbisd:
                SATIPDeliveryParametersType"minOccurs="0"/>
        </sequence>
        <element name="DVBCDeliveryParameters"type="dvbisd:
        DVBCDeliveryParametersType"/>
        <element name="RTSPDeliveryParameters"type="dvbisd:
        RTSPDeliveryParametersType"/>
        <element name="MulticastTSDeliveryParameters"type=
        "dvbisd:MulticastTSDeliveryParametersType"/>
        <sequence>
        <element name="DASHDeliveryParameters"type="dvbisd:
        DASHDeliveryParametersType"/>
        <element name="MulticastTSDeliveryParameters"type="dvbisd:
        MulticastTSDeliveryParametersType"minOccurs="0"/>
        </sequence>
        <any namespace="##other"processContents="lax"/>
</choice>
```

```
....
<complex Type name = "ContentGuideSourceType">
        <sequence>
                <element name="Name"type="mpeg7:TextualType"minOccurs="0"maxOccurs=
                "unbounded"/>
                <element name="ProviderName"type="mpeg7:TextualType"maxOccurs=
                "unbounded"/>
                <element name="RelatedMaterial"type="tva:RelatedMaterialType"minOccurs="0"
                maxUccurs="unbounded"/>
                <element name="ScheduleInfoEndpoint"type="dvbisd:ExtendedURIType"
                minOccurs="0"/>
                <element name="ProgramInfoEndpoint"type="dvbisd:ExtendedURIType"
                minOccurs="0"/>
                <element name="GroupInfoEndpoint"type="dvbisd:ExtendedURIType"
                minOccurs="0"/>
                <element name="MoreEpisodesEndpoint"type="dvbisd:ExtendedURIType"
                minOccurs="0"/>
                <element name="MinimumMetadataUpdatePeriod"type="dvbisd:
                MinimumMetadataUpdatePeriodType"minOccurs="0"/>(option 5)
        </sequence>
        <attribute name="CGSID"type="ContentGuideProviderIdType"use="required"/>
        <attribute name="dynamic"type="boolean"default="false"/>
        <attribute name="MinimumMetadataUpdatePeriod"type="duration"use="optional"/>(option 6)
</complexType>

<complex Type name = "LCNTableEntryType">
        <attribute name="ChannelNumber"type="PositiveInteger"use="required"/>
        <attribute name="ServiceRef"type="dvbisd:ServiceIdentifierType"use="required"/>
        <attribute name="Selectable"type="boolean"default="true"/>
        <attribute name="visible"type="boolean"default="true"/>
        <attribute name="dynamic"type="boolean"default="false"/>
</complexType>
```

FIG 24

```
[DVB-I Service List Discovery schema]<?xml version="1.0" encoding="UTF-8"?>
<schema xmlns="http://www.w3.org/2001/XMLSchema" xmlns:dvbisId="urn:dvb:metadata:servicelistdiscovery:
2019" xmlns:mpeg7="urn:tva:mpeg7:2008" xmlns:tva="urn:tva:metadata:2019" xmlns:dvbisd="urn:dvb:metadata:
servicediscovery:2019" targetNamespace="urn:dvb:metadata:servicelistdiscovery:2019" elementFormDefault=
"qualified" attributeFormDefault="unqualified">
    <import namespace="urn:tva:metadata:2019" schemaLocation="tva_metadata_3-1.xsd"/>
    <import namespace="urn:tva:mpeg7:2008" schemaLocation="tva_mpeg7.xsd"/>
    <import namespace="urn:dvb:metadata:servicediscovery:2019" schemaLocation="dvbi_v1.0.xsd"/>
    <element name="ServiceListEntryPoints" type="dvbisId:ServiceListEntryPointsType"/>
    <complexType name="ServiceListEntryPointsType">
        <sequence>
            <element name="ServiceListRegistryEntity" type="dvbisId:OrganizationType"/>
            <element name="ProviderOffering" type="dvbisId:ProviderOfferingType" minOccurs="0"
            maxOccurs="unbounded"/>
        </sequence>
    </complexType>

.....

<complexType name="ProviderOfferingType">
        <sequence>
            <element name="Provider" type="dvbisId:OrganizationType"/>
            <element name="ServiceListOffering" type="dvbisId:ServiceListOfferingType"
            maxOccurs="unbounded"/>
        </sequence>
    </complexType>
    <complexType name="ServiceListOfferingType">
        <sequence>
            <element name="ServiceListName" type="mpeg7:TextualType" maxOccurs="unbounded"/>
            <element name="ServiceListURI" type="dvbisd:ExtendedURIType" maxOccurs=
            "unbounded"/>
            <element name="Language" type="tva:AudioLanguageType" minOccurs="0" maxOccurs="unbounded"/>
            <element name="Genre" type="tva:GenreType" minOccurs="0" maxOccurs="unbounded"/>
            <element name="TargetCountry" type="dvbisd:ISO-3166-List" minOccurs="0" maxOccurs="unbounded"/>
        </sequence>
        <attribute name="regulatorListFlag" type="boolean" default="false"/>
    </complexType>
</schema>
```

FIG 26a

```
DVB-I service scheme<complexType name="ServiceListType">
  <sequence>
    <element name="Name" type=" mpeg7:TextualType" maxOccurs="unbounded"/>
    <element name="ProviderName" type=" mpeg7:TextualType" maxOccurs="unbounded"/>
    <element name="RelatedMaterial" type="tva:RelatedMaterialType" minOccurs="0"
    maxOccurs="unbounded "/>
    <element name="RegionList" type="dvbisd:RegionListType" minOccurs="0"/>
    <element name="TargetRegion" type="dvbisd:RegionIdRefType" minOccurs="0" maxOccurs="unbounded"/>
    <element name="LCNTableTable" type="dvbisd:LCNTableListType" minOccurs="0"/>
    <choiceminOccurs="0">
      <element name="ContentGuideSourceList" type="dvbisd:ContentGuideSourceListType"/>
      <element name="ContentGuideSource" type="dvbisd:ContentGuideSourceType"/>
    </choice>
    <element name="Service" type="dvbisd:ServiceType" minOccurs="0" maxOccurs="unbounded"/>
    <any namespace="##other" processContents="lax" minOccurs="0" maxOccurs="unbounded"/>
  </sequence>
  <attribute name="version" type="positiveInteger" use="required"/>
  <attribute name="MinimumMetadataUpdatePeriod" type="duration" use="optional"/ > (option 1)
</complexType>

<complexType name="ServiceType">
  <sequence>
    <element name="UniqueIdentifier" type="dvbisd:ServiceIdentifierType"/>
    <element name="ServiceInstance" type="dvbisd:ServiceInstanceType" minOccurs="0" maxOccurs=
    "unbounded"/>
    <element name="TargetRegion" type="dvbisd:RegionIdRefType" minOccurs="0" maxOccurs="unbounded"/>
...
    <choice minOccurs="0">
      <element name="ContentGuideSource" type="dvbisd:ContentGuideSourceType"/>
      <element name="ContentGuideSourceRef" type="dvbisd:ContentGuideProviderRefIdType"/>
      <element name="MinimumMetadataUpdatePeriod" type="dvbisd: MinimumMetadataUpdatePeriodType "
      minOccurs="0"/ > (option 2)
    </choice>
    <element name="ContentGuideServiceRef" type="dvbisd:ServiceIdentifierType" minOccurs="0"/>
    <element name="MinimumMetadataUpdatePeriod" type="dvbisd:MinimumMetadataUpdatePeriodType "
    minOccurs="0"/ >(option 3)
```

FIG 26b

```
</sequence>
<attribute name="version" type="positiveInteger" use="required"/>
<attribute name="dynamic" type="boolean" default="false"/>
<attribute name="MinimumMetadataUpdatePeriod" type="duration" use="optional"/ > (option 4)

....
<complexType name="ContentGuideSourceType">
  <sequence>
    <element name="Name" type="mpeg7:TextualType" minOccurs="0" maxOccurs="unbounded"/>
    <element name="ProviderName" type="mpeg7:TextualType" maxOccurs="unbounded"/>
    <element name="RelatedMaterial" type="tva:RelatedMaterialType" minOccurs="0" maxOccurs=
    "unbounded "/>
    <element name="ScheduleInfoEndpoint" type="dvbisd:ExtendedURIType"/>
    <element name="ProgramInfoEndpoint" type="dvbisd:ExtendedURIType" minOccurs="0"/>
    <element name="GroupInfoEndpoint" type="dvbisd:ExtendedURIType" minOccurs="0"/>
    <elementname="MoreEpisodesEndpoint" type="dvbisd:ExtendedURIType" minOccurs="0"/>
    <element name="MinimumMetadataUpdatePeriod" type="dvbisd:MinimumMetadataUpdatePeriodType
    "minOccurs="0"/ > (option 5)
  </sequence>
  <attribute name="CGSID" type="dvbisd:ContentGuideProviderIdType" use="required"/>
  <attribute name="dynamic" type="boolean" default="false"/>
  <attribute name="MinimumMetadataUpdatePeriod" type="duration" use="optional"/ > (option 6)
</complexType>
```

FIG 29a

```
DVB-I service scheme
....
        <complexType name="ContentGuideSourceType">
                <sequence>
                        <element name="Name" type="mpeg7:TextualType" minOccurs="0"
                        maxOccurs="unbounded"/>
                        <element name="ProviderName" type="mpeg7:TextualType" maxOccurs=
                        "unbounded"/>
                        <element name="RelatedMaterial" type="tva:RelatedMaterialType"
                        minOccurs="0" maxOccurs="unbounded "/>
                        <element name="ScheduleInfoEndpoint" type="dvbisd:ExtendedURIType"/>
                        <element name="ProgramInfoEndpoint" type="dvbisd:ExtendedURIType"
                        minOccurs="0"/>
                        <element name="GroupInfoEndpoint" type="dvbisd:ExtendedURIType"
                        minOccurs="0"/>
                        <element name="MoreEpisodesEndpoint" type="dvbisd:ExtendedURIType"
                        minOccurs="0"/>
                        <element name="IndividualPeriodEndpoint" type="dvbisd:ExtendedURIType"
                        minOccurs="0"/>
                </sequence>
                <attribute name="CGSID" type="dvbisd:ContentGuideProviderIdType" use=
                "required"/>
        <attribute name="dynamic" type="boolean" default="false"/>
  <attribute name="MinimumMetadataUpdatePeriod" type="duration" use="optional"/ >
        </complexType>
```

FIG 29b

```
DVB-I service scheme
....
<complexType name="ServiceType">
        <sequence>
                <element name="UniqueIdentifier" type="dvbisd:ServiceIdentifierType"/>
                <element name="ServiceInstance" type="dvbisd:ServiceInstanceType" minOccurs="0"
                maxOccurs="unbounded"/>
                <element name="TargetRegion" type="dvbisd:RegionIdRefType" minOccurs="0"
                maxOccurs="unbounded"/>
                <element name="ServiceName" type="mpeg7:TextualType" maxOccurs=
                "unbounded"/>
                <element name="ProviderName" type="mpeg7:TextualType" maxOccurs=
                "unbounded"/>
                <element name="RelatedMaterial" type="tva:RelatedMaterialType" minOccurs="0"
                maxOccurs="unbounded "/>
                <element name="ServiceGenre" type="tva:GenreType" minOccurs="0"/>
                <element name="ServiceType" type="tva:ControlledTermType" minOccurs="0"/>
                <element name="RecordingInfo" type="tva:ControlledTermType" minOccurs="0"/>
                <choice minOccurs="0">
                        <element name="ContentGuideSource" type="dvbisd:
                        ContentGuideSourceType"/>
        <element name="IndividualPeriodEndpoint" type="dvbisd:ExtendedURIType"
        minOccurs="0"/>
                        <element name="ContentGuideSourceRef" type="dvbisd:
                        ContentGuideProviderRefIdType"/>
                </choice>
                <element name="ContentGuideServiceRef" type="dvbisd:ServiceIdentifierType"
                minOccurs="0"/>
        </sequence>
        <attribute name="version" type="positiveInteger" use="required"/>
</complexType>
```

FIG 30

```
DVB-I service scheme
....
<ContentGuideSourceList>
        <ContentGuideSource CGSID="cgs-dvbi-01">
                <Name xml:lang="en">A-Z Content Guide</Name>
                <ProviderName xml:lang="en">A-Z Metadata</ProviderName>
                <RelatedMaterial>
                        <HowRelated href="urn:dvb:metadata:cs:HowRelatedCS:2019:1002.1"/>
                        <MediaLocator>
                                <MediaUri contentType="image/png">
                                https://cgs.az.metadata/static/logo.png
                                </MediaUri>
                        </MediaLocator>
                </RelatedMaterial>
                <ScheduleInfoEndpoint contentType="application/xml">
                        <URI>https://cgs.az.metadata/schedule </URI>
                </ScheduleInfoEndpoint>

...
                <IndividualPeriodEndpoint contentType="application/xml">
                        <URI>https://cgs.az.metadata/IndividualPeriod </URI>
                </IndividualPeriodEndpoint>
        </ContentGuideSource>
</ContentGuideSourceList>
```

FIG 33

```xml
<?xml version="1.0" encoding="UTF-8"?>
<schema xmlns="http://www.w3.org/2001/XMLSchema" xmlns:dvbisId="urn:dvb:metadata:
servicelistdiscovery:2020" xmlns:mpeg7="urn:tva:mpeg7:2008" xmlns:tva="urn:tva:metadata:2019"
xmlns:dvbisd="urn:dvb:metadata:servicediscovery:2020" targetNamespace="urn:dvb:metadata:
servicelistdiscovery:2020" elementFormDefault="qualified" attributeFormDefault="unqualified">
        <import namespace="urn:tva:metadata:2019" schemaLocation="tva_metadata_3-1.xsd"/>
        <import namespace="urn:tva:mpeg7:2008" schemaLocation="tva_mpeg7.xsd"/>
        <import namespace="urn:dvb:metadata:servicediscovery:2020" schemaLocation=
        "dvbi_v2.0.xsd"/>
        <element name="ServiceListEntryPoints" type="dvbisId:ServiceListEntryPointsType"/>
        <complexType name="ServiceListEntryPointsType">
                <sequence>
                        <element name="ServiceListRegistryEntity" type="dvbisId:
                        OrganizationType"/>
                        <element name="ProviderOffering" type="dvbisId:ProviderOfferingType"
                        minOccurs="0" maxOccurs="unbounded"/>
                        <element name="Extension" type="dvbisd:ExtensionBaseType" minOccurs="0"
                        maxOccurs="unbounded"/>
                </sequence>
        </complexType>
```

FIG 34

|  | Semantic Definition | Constraints |
|---|---|---|
| OSName | Supportable OS version and name |  |
| ServiceCode | Supportable service code within the device |  |
| TargetLocation2 | A target location where the device is made, e.g., UK, Nordic |  |
| Sourcelocation | A location of a streaming server that provides each service |  |
| PublishedDate | Service list publish data |  |
| ReleasedDate | Service list release data |  |
| Manufacturer | A service list implementation company |  |
| ManufacturerURL | URL of the service list implementation company |  |
| ServiceDescription | A brief description of the service list. e.g.: List indicating text |  |
| ServiceReport | A service list issue or consumption report |  |

<FirmwareUpgrade>

|  | Semantic Definition | Constraints |
|---|---|---|
| Version | Firmware version number that the platform should support |  |
| UpdateLocationURL | URL accessible for firmware update |  |

<ServiceAvailability>

|  | Semantic Definition | Constraints |
|---|---|---|
| Version | Current version in which the service list is provided |  |
| ServiceAvailability SearchURL | URL for moving to a web page where service search is available such that additional services provided by the service list provider may be added |  |
| ServiceAvailability DBUpdateURL | Link URL for service data base update. Schema to support XML update based on IETF RFC 5261 is downloaded, and fetching may be performed through the corresponding information. |  |

FIG 35a

```
<?xml version="1.0" encoding="UTF-8"?>
<!DOCTYPE xml>
<!-- Example of ServiceListEntryPoint published by a DVB-mfr Servicelist Server -->
<ServiceListEntryPoints xmlns="urn:dvb:metadata:servicelistdiscovery:2020" xmlns:xsi=
"http://www.w3.org/2001/XMLSchema-instance"xsi:schemaLocation="urn:dvb:metadata:dvbmfr-
extensions:2020 ../dvbmfr_extensions_v1.0.xsd" xsi:dvbmfr="urn:dvb:metadata:dvbmfr-extensions:
2020"xmlns:dvbisd="urn:dvb:metadata:servicediscovery:2020" xmlns:tva="urn:tva:metadata:2019">
        //DVB-I discovery scheme compatible
        <ServiceListRegistryEntity>
    <Name>DVB-I Manufacturer Server Registry</Name>
  </ServiceListRegistryEntity>
<ProviderOffering>
  <Provider>
    <Name>DVB-I Manufacturer Server #1</Name>
  </Provider>
  <ServiceListOffering>
    <ServiceListName>LG channels </ServiceListName>
    <ServiceListURI contentType="application/xml">
      <dvbisd:URI>https://www.LgChannels/dvbmfr/UK/servicelist.xml</dvbisd:URI>
    </ServiceListURI>
                    <Language> Eng </Language>
                    <TargetCountry> UK </TargetCountry>
  </ServiceListOffering>
</ProviderOffering>

<!--Attributes for checking whether a list is receivable -->
<Extension xmlns:dvbmfr="urn:dvb:metadata:dvbmfr-extensions:2020" xsi:type="dvbmfrx:
mfrServiceListEntryPointsType" extensionName="DVB-I mfr">
  <dvbmfr:mfrServiceListRegistryEntity specVersion="1">

//addtional information for mfrs
```

FIG 35b

```
<dvbmfr:FirmwareUpgrade>
        <dvbmfr:Version>1.1</dvbmfr:Version>
        <dvbmfr:UpdateLocationURL contentType="application/xml">
                <dvbisdURL>https://www.LgChannels/FirmwareUpgrade/
                upgrade.xml </dvbisd:URI>
        </dvbmfr:UpdateLocationURL>
    </dvbmfr:FirmwareUpgrade>
    <dvbmfr:ServiceAvailability>
<dvbmfr:Version>1</dvbmfr:Version>
<dvbmfr:ServiceAvailabilitySearchURL contentType="application/xml">
    <dvbisdURL>https://www.LgChannels/dvbmfr/ServiceSearchURL.html </dvbisd:URI>
</dvbmfr:ServiceAvailabilityMapIdleURL>
<dvbmfr:ServiceAvailabilityDBUpdateURL contentType="application/xml">
    <dvbisdURL>https://www.LgChannels/dvbmfr/ServiceAvailabilityMapUdpade.xml
    </dvbisd:URI>
</dvbmfr:ServiceAvailabilityDBUpdateURL>
</dvbmfr:ServiceAvailability>
                <dvbmfr:ServiceReport> https://my.lgChannels.com/ServiceReport/list/main
                </dvbmfr:ServiceReport>

</dvbmfr:mfrServiceListRegistryEntity>
</Extension>
</ServiceListEntryPoints>
```

FIG 36

⚙ Setting

Service list selection

Selection service list

AGCOM
Italian Trusted Service

TVformTheWorld
TV service from the world in English
TV aus Deutshland

British DVB-I
Documentaries

SES
Germany FTA

DVB
DVB-I Reference Client service list

Filter

| Provider | LG channels |
| Language | eng |
| Genre | |
| Country | UK |

◯ Regulator list
Multiple values can be separated by comma

[ Filter ]

FIG 37

[Use case 1 occurring when multiple service lists are merged]

| Service list | Service ID | LCN | Legacy | Content |
|---|---|---|---|---|
| List Provider name A | Sid = s01 | 13 | 13 | News |
| List Provider name B | Sid = s01 | 13 | 13 | News |
| List Provider name C | Sid = s02 | 14 | 14 | Drama |
| List Provider name D | Sid = s05 | 15 | 15 | TV show |

[Use case 2 occurring when multiple service lists are merged]

| Service list | Service ID | LCN | Legacy | Content |
|---|---|---|---|---|
| List Provider name A | Sid = s01 | 10 | 10 | News |
| List Provider name B | Sid = s03 | 10 | | Drama channel |

[Use case 3 occurring when multiple service lists are merged]

| Service list | Service ID | LCN | Legacy | Content |
|---|---|---|---|---|
| DVB-T | Sid = s01 | 10 | 10 | Movie |
| List Provider name A | Sid = s03 | 10 | 10 | Movie |
| List Provider name B | Sid = s13 | 10 | - | News |

[Use case 4 occurring when multiple service lists are merged]

| Service list | Service ID | LCN | Legacy | Content |
|---|---|---|---|---|
| List Provider name A | Sid = s01 | 9 | 9 | BBC News |
| List Provider name B | Sid = s20 | 9 | 9 | KBS News |

```
<complexType name="LCNTableType">
  <sequence>
    <element name="TargetRegion" type="dvbisd:RegionIdRefType" minOccurs="0" maxOccurs="unbounded"/>
    <element name="SubscriptionPackage" type="dvbisd:SubscriptionPackageType" minOccurs="0" maxOccurs="unbounded"/>
    <element name="LCN" type="dvbisd:LCNTableEntryType" minOccurs="0" maxOccurs="unbounded"/>
    <!-- An extension for channel collision -->
    <element name="SecondaryChannelNumberRange" type="SecondaryChannelNumberRangeType" use="optional"/>
    <!-- An extension for channel collision -->
  </sequence>
</complexType>
<complexType name="LCNTableEntryType">
  <attribute name="channelNumber" type="positiveInteger" use="required"/>
  <!-- An extension for channel collision -->
  <attribute name="minorChannelNumber" type="positiveInteger" use="optional"/>
  <attribute name="FlexibleNumber" type="boolean" default="true"/> //false : list provider based channel number used to show different lists
  for the same channel
  <attribute name="FavoriteChannelNumber" type="positiveInteger" use="optional"/>
  <!-- An extension for channel collision -->
  <attribute name="serviceRef" type="dvbisd:ServiceIdentifierType" use="required"/>
  <attribute name="selectable" type="boolean" default="true"/>
  <attribute name="visible" type="boolean" default="true"/>
</complexType>
<!-- An extension for channel collision -->
<complexType name="FavoriteChannelNumberRangeType">
  <sequence>
    <attribute name="from" type="positiveInteger" use="optional"/>
    <attribute name="to" type="positiveInteger" use="optional"/>
  </sequence>
</complexType>
<!-- An extension for channel collision -->
```

FIG 39b

| | Semantic Definition | Constraints |
|---|---|---|
| MinorChannelNumber | Allocating minor channels of LCN channel, e.g.) 7-1, 100-1 | |
| FlexibleNumber | In the setting mode, the channel banner shows the existing channel number and identifies it with the name of the service list provider.. e.g.) Different service provider names and text colors | |
| FavoriteChannel Number | Preferred channel number in addition to the defined channelNumber when a conflict occurs | |
| SecondaryChannel NumberRange | SecondaryChannelNumberRange range, which allows LCN allocation to be assigned in the range in case of conflict | |

FIG 40

```
<LCNTableList>
<LCNTable>
<LCN channelNumber="0"  serviceRef="s1"/>
<LCN channelNumber="2"  serviceRef="s2"/>
<LCN channelNumber="14"  serviceRef="s3"/>
<LCN channelNumber="16"  serviceRef="s4"/>
<LCN channelNumber="20"  serviceRef="s5"/>
<LCN channelNumber="21"  serviceRef="s6"/>
<LCN channelNumber="34"  serviceRef="s7"/>
</LCNTable>
</LCNTableList>
```
<Service list 1>

```
<LCNTableList>
<LCNTable>
<LCN channelNumber="647"  serviceRef="sid1"/>
<LCN channelNumber="11"  serviceRef="sid2"/>
<LCN channelNumber="4"  serviceRef="sid3"/>
<LCN channelNumber="3"  serviceRef="sid4"/>
<LCN channelNumber="8"  serviceRef="sid5"/>
<LCN channelNumber="12"  serviceRef="sid6"/>
<LCN channelNumber="34"  serviceRef="sid7"/>
<LCN channelNumber="324"  serviceRef="sid8"/>
<LCN channelNumber="642"  serviceRef="sid8"/>
<LCN channelNumber="640"  serviceRef="sid10"/>
<LCN channelNumber="641"  serviceRef="sid11"/>
<LCN channelNumber="643"  serviceRef="sid12"/>
<LCN channelNumber="644"  serviceRef="sid13"/>
<LCN channelNumber="645"  serviceRef="sid14"/>
<LCN channelNumber="1001"  serviceRef="sid15"/>
<LCN channelNumber="1002"  serviceRef="sid16"/>
<LCN channelNumber="1003"  serviceRef="sid17"/>
<LCN channelNumber="1004"  serviceRef="sid18"/>
<LCN channelNumber="1005"  serviceRef="sid19"/>
<LCN channelNumber="1006"  serviceRef="sid20"/>
<LCN channelNumber="1007"  serviceRef="sid21"/>
<LCN channelNumber="1008"  serviceRef="sid22"/>
<LCN channelNumber="0"  serviceRef="sid23" FavoriteChannelNumber="1000"/>
</LCNTable>
</LCNTableList>
```
<Service list 2>

DVBI
DVB-I video player

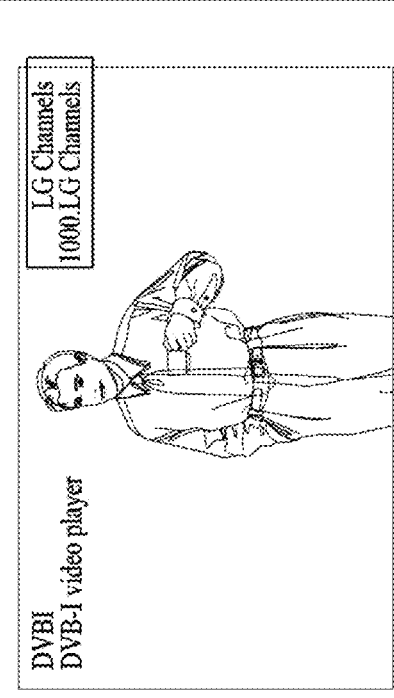

LG Channels
1000 LG Channels

FIG 41a

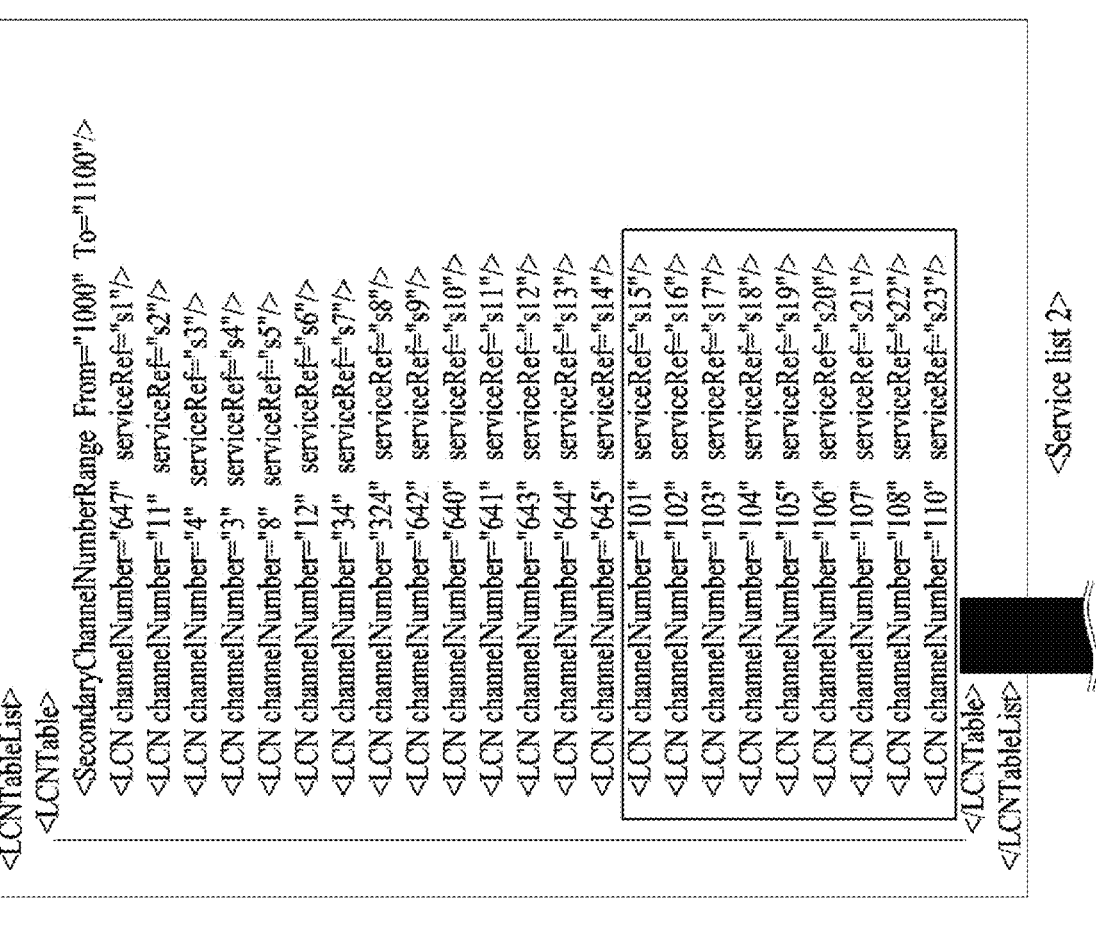

```
<LCNTableList>
 <LCNTable>
  <SecondaryChannelNumberRange From="1000" To="1100"/>
  <LCN channelNumber="647"   serviceRef="s1"/>
  <LCN channelNumber="11"    serviceRef="s2"/>
  <LCN channelNumber="4"     serviceRef="s3"/>
  <LCN channelNumber="3"     serviceRef="s4"/>
  <LCN channelNumber="8"     serviceRef="s5"/>
  <LCN channelNumber="12"    serviceRef="s6"/>
  <LCN channelNumber="34"    serviceRef="s7"/>
  <LCN channelNumber="324"   serviceRef="s8"/>
  <LCN channelNumber="642"   serviceRef="s9"/>
  <LCN channelNumber="640"   serviceRef="s10"/>
  <LCN channelNumber="641"   serviceRef="s11"/>
  <LCN channelNumber="643"   serviceRef="s12"/>
  <LCN channelNumber="644"   serviceRef="s13"/>
  <LCN channelNumber="645"   serviceRef="s14"/>
  <LCN channelNumber="101"   serviceRef="s15"/>
  <LCN channelNumber="102"   serviceRef="s16"/>
  <LCN channelNumber="103"   serviceRef="s17"/>
  <LCN channelNumber="104"   serviceRef="s18"/>
  <LCN channelNumber="105"   serviceRef="s19"/>
  <LCN channelNumber="106"   serviceRef="s20"/>
  <LCN channelNumber="107"   serviceRef="s21"/>
  <LCN channelNumber="108"   serviceRef="s22"/>
  <LCN channelNumber="110"   serviceRef="s23"/>
 </LCNTable>
</LCNTableList>
```

<Service list 2>

```
<LCNTableList>
 <LCNTable>
  <LCN channelNumber="100"  serviceRef="s1"/>
  <LCN channelNumber="101"  serviceRef="s2"/>
  <LCN channelNumber="102"  serviceRef="s3"/>
  <LCN channelNumber="103"  serviceRef="s4"/>
  <LCN channelNumber="104"  serviceRef="s5"/>
  <LCN channelNumber="105"  serviceRef="s6"/>
  <LCN channelNumber="106"  serviceRef="s7"/>
 </LCNTable>
</LCNTableList>
```

<Service list 1>

FIG 41b
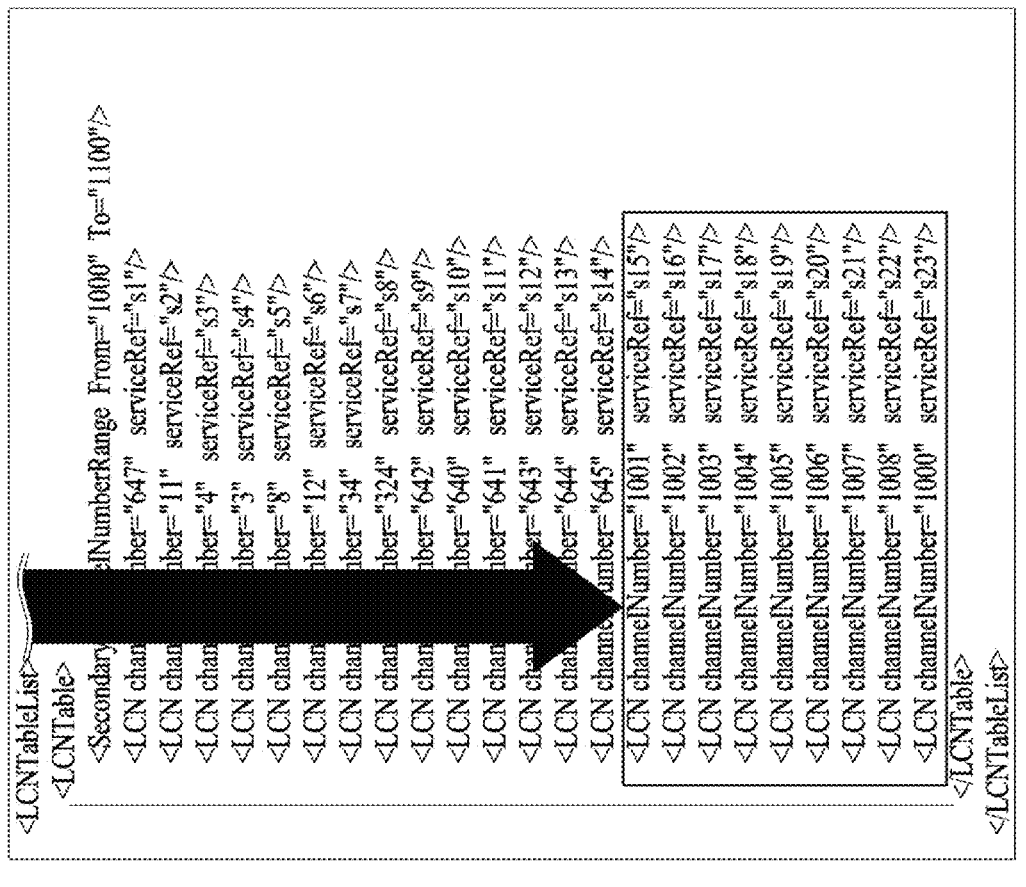
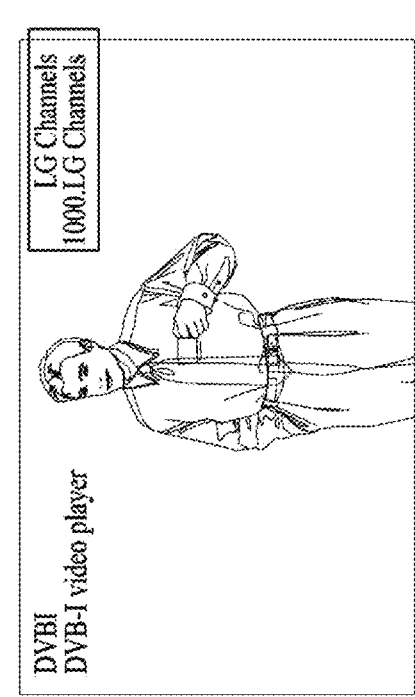

FIG 43

```
<Service version="1">
<UniqueIdentifier>goodservice</UniqueIdentifier>
<ServiceInstance priority="2">
        <DVBSDeliveryParameters>
<DVBTriplet origNetId="1" tsId="2" serviceId="3"/>
        <OrbitalPosition>-5</OrbitalPosition>
        <Frequency>11179</Frequency>
        <Polarization>vertical</Polarization>
        </DVBSDeliveryParameters>
</ServiceInstance>
<ServiceInstance priority="1">
        <DisplayName>DVB-S service </DisplayName>
<DASHDeliveryParameters>
                <UriBasedLocation contentType="application/dash+xml">
                <URI>https://www.goodservice.com/goodservice.mpd</URI>
                </UriBasedLocation>
        </DASHDeliveryParameters>
</ServiceInstance>
                <ServiceName>DVB-S </ServiceName>
                <ProviderName>DVB-S</ProviderName>
                <ContentGuideServiceRef>goodservice</ContentGuideServiceRef>
</Service>
```

FIG. 44

| Order | Description | Syntax and code | Interface |
|---|---|---|---|
| 0 | DVB-x pre-install or mobile user registry | Delivery method selection | |
| 1 | The DVB-I client sends a discovery query to the service list registry. | HTTP GET http://CSR/query?TargetCountry=GBR&regulatorListFlag=true& | B1 |
| 2 | In response to B1, the server returns service lists in the SLR in the form of entry points according to the query condition. | `<ProviderOffering>`<br> `<Provider><Name>Freeview</Name></Provider>`<br>  `<ServiceListOffering regulatorListFlag="true">`<br>   `<ServiceListName>Freeview </ServiceListName>`<br>   `<ServiceListURI contentType="application/xml">`<br>    `<URI>htttp://freeview.tv/GBR_service_list.xml</URI>`<br>   `</ServiceListURI>`<br>  `</ServiceListOffering>` | B2 |
| 3 | The client makes a selection and request based on the `<providerOffering>` information. | HTTP GET htttp://freeview.tv/GBR_service_list.xml | F1 |
| 4 | The client parses the received service list and installs and provides the service. | Service list reception complete | F2 |

FIG 45

[option 1]

```
<complex Type name="ServiceListOfferingType">
    <sequence>
        <element name="ServiceListName" type="mpeg7:TextualType" maxOccurs="unboun ded"/>
        <element name="ServiceListURI" type="dvbisd:ExtendedURIType" maxOccurs="unbounded"/>
        <element name="Delivery" type="dvbsid:DeliveryType"/> <!--new feature -->
        <element name="Language" type="tva:AudioLanguageType" minOccurs="0" maxOccurs="unbounded"/>
        <element name="Gener" type="tva:GenerType" minOccurs="0" maxOccurs="unboun ded"/>
        <element name="TargetCountry" type="dvbisd:ISO-3166-List" minOccurs="0" maxOccurs="unboun ded"/>
    </sequence>
    <attribute name="regulatorListFlag" type="booleam" default="false"/>

</complex Type >
```

| Delivery | Identifies the delivery methods used to deliver the services in the Service List. Indicating which of the delivery methods are required in order to offer an acceptable experience, as defined by the service list provider.<br><br>This enables a client to determine if all required delivery sources are available before attempting installation of the Service List. | Mandatory |
|---|---|---|

FIG 46

```
<complex Type name="DeliveryType">
    <sequence>
        <element name="DASHDelivery" type="dvbisd:DASHDeliveryType" minOccurs"0"/>
        <element name="DVBTDelivery" type="dvbisd:DVBTDeliveryType" minOccurs"0"/>
        <element name="DVBCDelivery" type="dvbisd:DVBCDeliveryType" minOccurs"0"/>
        <element name="DVBSDelivery" type="dvbisd:DVBSDeliveryType" minOccurs"0"/>
        <element name="RTSPDelivery" type="dvbisd:RTSPDeliveryType" minOccurs"0"/>
    <element name="MulticastTSDelivery" type="dvbisd:MulticastTSDeliveryType" minOccurs"0"/>
    <element name="ApplicationDelivery" type="dvbisd:ApplicationTypeListType" minOccurs"0"/>
    <element name="OtherDeliveryParameters" type="dvbisd:ExtensionBaseType" minOccurs"0"/>
    </sequence>
</complexType>

<complexType name="AbstractDeliveryType" abstract="true">
    <attribute name="required" type="boolean" default="false"/>
    <attribute name="availability" type="boolean" default-"false"/>
    <attribute name= "priority" type="integer"/>
    <attribute name="recommendation" type=" boolean" />

</complexType>
```

| Name | Sematic Definition | Constraints |
|---|---|---|
| @required | Indicates whether the delivery type must be supported by the DVB-I client and available, in order to offer an cceptable experience as defined by the service list provider. | Mandatory |
| @availability | A delivery type is available when the related broadcast signal or IP network can be used by the client to retrieve DVB services. | Mandatory |
| @priority | The priority of the service list relative to the other delivery methods. Lower values of this attribute indicate a higher priority | Optional |

FIG. 47

| Order | Description | Syntax 또는 code | Interface |
|---|---|---|---|
| 0 | DVB-x pre-install or mobile user registry | Delivery method selection | |
| 1 | The DVB-I client sends a discovery query to the service list registry according to the pre-installed delivery method. | HTTP GET http://CSR/query?TargetCountry= GBR®ulatorListFlag=true&dvb-t | B1 |
| 2 | In response to B1, the server returns service lists in the SLR in the form of entry points according to the query condition. Depending on <Delivery> defined in <ProviderOffering> received by the DVB-I client, the delivery method that is mandatorily supported by the list and the method that is supportable by the IP only device are defined. | <ProviderOffering> <Provider><Name>Freeview</Name></Provider> <ServiceListOffering regulatorListFlag="true"> <ServiceListName>Freeview </ServiceListName> <ServiceListURI contentType="application/xml"> <URI>http://freeview.tv/GBR_service_list.xml</URI> </ServiceListURI> <Delivery> <DASHDelivery required ="true" availability = "yes" priority="1" recommended ="yes"> <DVBTDelivery required = "false" availability ="yes" priority="2" recommended ="yes"> <MulticastTSDelivery required ="false" availability = "yes" priority="3" recommended ="yes"> </Delivery> </ServiceListOffering> </ProviderOffering> | B2 |
| 3 | The client makes a selection and request based on the <providerOffering> information. | HTTP GET http://freeview.tv/GBR_service_list.xml | F1 |
| 4 | The client parses the received service list and installs and provides the service. | Service list reception complete | F2 |

FIG 48a

```
<?xml version="1.0' encoding-"UTF-8"?>
<ServiceList version-"1" xml lang="en" xmlns="urn:dvb : metadata : servicediscoverv:2021x"
xmlns:xsi= "http:/ /www.w3.org/2001/XMLSchema- instance"
xsi:schemaLocation="urn: dvb: metadata:servicediscovery:2021x ../dvbi_v3.1.xsd">
        <Name>Italian public broadcasting company 3 examples</Name>
        <ProviderName>Italian public broadcasting company</ProviderName>
        <RegionList Version="1">
                <Region countryCodes= "ITA" regionID="Italy">
                        <Region regionID= "Piemonte">
                                <RegionName>Piemonte</RegionName>
                                <PostcodeRange from= "15010" to="15122"/>
                                <PostcodeRange from= "14010" to="14100"/>
                                <PostcodeRange from= "13811" to="13900"/>
                                <PostcodeRange from= "12010" to="12025"/>
                                <PostcodeRange from= "28010" to="28100"/>
                                <PostcodeRange from= "10100" to="10156"/>
                                <PostcodeRange from= "28801" to="28925"/>
                                <PostcodeRange from= "13010" to="13100"/>
                        </Region>
                        <Region regionID= "Lombardia">
                                <RegionName>Lombardia</RegionName>
                                <PostcodeRange from= "24010" to="24129"/>
                                <PostcodeRange from= "25010" to="25136"/>
                                <PostcodeRange from= "22010" to="22100"/>
                                <PostcodeRange from= "26010" to="26100"/>
                                <PostcodeRange from= "23801" to="23900"/>
                                <PostcodeRange from= "26811" to="26900"/>
                                <PostcodeRange from= "46010" to="46100"/>
                                <PostcodeRange from= "20010" to="20162"/>
                                <PostcodeRange from= "20811" to="20900"/>
                                <PostcodeRange from= "27010" to="27100"/>
                                <PostcodeRange from= "23010" to="23100"/>
```

FIG 48b

```
        </Region>
    </Region>
</RegionList>
<LcntableList>
    <LCNTable>
        <TargetRegion>Piemonte</Target Region>
        <LCN channelNumber= "3" serviceRef= "tag: rai.it, 2019 :rai-3-piemonte"/>
    </LCNTable>
    <LCNTable>
        <TargetRegion>Lombardia</Target Region>
        <LCN channelNumber= "3" serviceRef= "tag: rai.it, 2019 :rai-3-lombardia"/>
    </LCNTable>
</LcntableList>
<Service version= "1">
    <UniqueIdentifier>tag : rai.it, 2019 : rai-3-piemonte</UniqueIdentifier>
    <ServiceInstance priority= "1">
        <DisplayName>Rai 3 Regional Lombardia</DisplayName>
        </Availability>
          <Period>
            <Interval startTime= "17:30:00Z" endTime= "18:00:00Z" days= "1 2 3 4 5 6 7"/>
          </Period>
        </Availability>
        <DASHDeliveryParameters>
                <UriBasedLocation contentType= "application/ dash+xml">
<URI>https://www.raiplay.it/dvbi/mpd/rai3_tgr_lombardia.mpd</URI>
                </UriBasedLocation>
```

FIG 53

```
{
    "typ" : "JWT"
    "alg" : "HS512"
}
{

"sub" : "1"
    "iss" : "ori"
    "exp" : "1639089718"
    "iat" : "1636987918"
    "jti" : "jwt001"
    "Dvb" : "DVB-I service list"
    "ServiceListPronider" : "BBC"
    "ServiceListname" : "BBC one live channel"
    "SSRS" : "required"

[option 1]

```
<complex Type name="ServiceListOfferingType">
    <sequence>
        <element name="ServiceListName" type="mpeg7:TextualType" maxOccurs="unboun ded"/>
        <element name="ServiceListURl" type="dvbisd:ExtendedURIType" maxOccurs="unbounded"/>
        <element name="Language" type="tva:AudioLanguageType" minOccurs="0" maxOccurs="unbounded"/>
        <element name="Gener" type="tva:GenerType" minOccurs="0" maxOccurs="unboun ded"/>
        <element name="TargetCountry" type="dvbisd:ISO-3166-List" minOccurs="0" maxOccurs="unboun ded"/>
        <element name="TargetONID" type="text" minOccurs="0" maxOccurs="unboun ded"/>
        <element name="SRSsupport" type="text" minOccurs="0" maxOccurs="unboun ded"/>
    </sequence>
    <attribute name="regulatorListFlag" type="booleam" default="false"/>
</complex Type >
```

@SRSupport values :

| SRSsupport value | Meaning |
|---|---|
| PC | Indicates the server support postcode query (see Section 5.6.4.2) |
| RM | Indicataes the server supports query through receivable multiplex (see Section 5.6.4.3) |
| RI | Indicates the server supports query through regionId (see Section 5.6.4.4) |

FIG 56

[option 2]

```
<complex Type name="serviceListOfferingType">
    <sequence>
        <element name="ServiceListName" type="mpeg7:TextualType" maxOccurs="unboun ded"/>
        <element name="ServiceListURI" type="dvbisd:ExtendedURIType" maxOccurs="unbounded"/>
        <element name="Language" type="tva:AudioLanguageType" minOccurs="0" maxOccurs="unbounded"/>
        <element name="Gener" type="tva:GenerType" minOccurs="0" maxOccurs="unboun ded"/>
        <element name="TargetCountry" type="dvbisd:ISO-3166-List" minOccurs="0" maxOccurs="unboun ded"/>
        <element name="TargetONID" type="text" minOccurs="0" maxOccurs="unboun ded"/>
        <element name="SRSsupport" type="SRSupportType" minOccurs="0" maxOccurs="1"/>
    </sequence>
    <attribute name="regulatorListFlag" type="booleam" default="false"/>
</complex Type >
```

FIG 57

| Req 5.1.1 | Provision of Service Lists based on geographic location | Agreed | 1 |
|---|---|---|---|

The provision of service lists to clients in the DVB-I specification at the highest level shall be based on physical geographic location as is reasonably possible (e.g. user selected territory/region, user entered postcode*, Compliant servers shall provide a complete, vaild and meaningful response to any request based solely on physical geographic location and clients will take full responsibility for rendering the subsequent Uls (e.g. to be compliant with regulatory requirements on prominence etc)

Note: clirnts can thus alaways rely on receiving a valid list based on user selected territory/region or user entered postcode data only

| Req 5.1.2 | Optional pseudo-geographic location data | Agreed | 1 |
|---|---|---|---|

Further optional pseudo-geographic location data may be used based on information such as that which might be inferred by receivable T/C/S multiplexes, or acquired by the server/edge such as geoIP lookup. Support for this additional data is optional for borh clients and servers. Where T/C/S multiplexes data are supplied by the client this shall not include any reception parameters such as signal strength or signal quality indicators, nor any other aspect of such multiplex reception

FIG 58

```
<simpleType name="SRSupportType">
    <restriction base="string">
        <pattern value=" /^(PC,RM,RI | PC,RM | PC,RI | PC | PC,RI,RM)$/"/>
    </restriction>

</simpleType>
```

```
<Servicelist Offering Type>
        ...
        <SRSsupport>PC, RI</SRSsupport>
        ...
</ServiceListOfferingType>

<ServiceListOfferingType>
        ...
        <SRSsupport>PC, RM</SRSsupport>
        ...
</ServiceListOfferingType>

<ServiceListOfferingType>
        ...
        <SRSsupport>PC, RM,RI</SRSsupport>
        ...
</ServiceListOfferingType>
```

Transmit service list offering information — S6101

Receive region selection information based on
service list offering information — S6102

Transmit media data based on region selection information — S6103

METHOD FOR PROCESSING MEDIA DATA AND DEVICE FOR PROCESSING MEDIA DATA

CROSS-REFERENCE TO RELATED APPLICATION(S)

This application is the National Stage filing under 35 U.S.C. 371 of International Application No. PCT/KR2023/000941, filed on Jan. 19, 2023, which claims the benefit of earlier filing date and right of priority to Korean Application Nos. 10-2022-0008110, filed on Jan. 19, 2022, and 10-2022-0038266, filed on Mar. 28, 2022, the contents of which are all hereby incorporated by reference herein in their entireties.

TECHNICAL FIELD

The present disclosure relates to a media data processing method and a media data processing apparatus.

BACKGROUND ART

Conventionally, IP-based linear channel services are provided in a manner in which a customer receives IP linear services through an STB provided by a specific operator (e.g. ISP, network operator) after authentication through a subscription. Recently, with the advent of connectivity TVs, STB-less IP linear services have also emerged. In this regard, representative standard technologies include ATSC 3.0, IBB, and HbbTV, and clients can receive various linear rich-media services by operating applications on the OS platform inside the TV. Various operators develop their own service applications that can be installed on the TV platform, and the applications define servers that can provide data for the service and APIs that allow requests/reception. Based on this life cycle, the client can access apps through the TV UI and receive various services through the apps.

Around the world, including North America and Europe, the preference for OTT channels has become as high as linear TV watching, making this expanding OTT market an essential media application for IP-based devices. However, influential OTTs have become exclusive services with their own platforms and service ecosystems. In other words, each OTT has its own app-ecosystem, including codecs, protocol stacks, applications, and browsers.

In this regard, it is necessary to address issues such as dependency on exclusive platforms and application operations of OTTs.

In this regard, it is necessary to improve IP-based TV services that can provide the same user experience as terrestrial, satellite, and cable linear channels.

The client (receiver) receives service entry points for channels in all regions, filters them, and provides region-based services corresponding to the scanned RF signals, which increases the data processing burden.

The server transmits service entry points for all regional channels to the client (receiver), which increases the amount of transmitted and received data throughput.

DISCLOSURE

Technical Problem

It is an object of a media data processing device according to embodiments to provide a method/device for providing an IP-based TV service that is capable of providing the same user UX as a terrestrial, satellite, or cable linear channels.

It is another object of the present disclosure to provide a proposed method in service discovery technology to provide an Internet-based broadcast service according to embodiments.

It is another object of the media data processing device according to embodiments to provide a proposed method/device that can be added in a service discovery technology to provide an Internet-based broadcast service.

A method/device according to embodiments proposes a method for addressing the issue of over-running while maintaining backward compatibility.

A method/device according to embodiments proposes receiver operations based on the position of @MinimumMetadataUpdatePeriod, as different roles and receiver operations are performed depending on the DVB-I service hierarchy when applying a client-side algorithm for dynamic polling.

As a content guide manager and a service list manager have separate parsing and caching processes, and need indications of channels that may change dynamically in managing the acquired LCN DB information, a method/device according to embodiments extends corresponding information.

In assigning a logical channel number corresponding to a single service, a method/device according to embodiments adds an indication that the channel is a channel to which dynamic polling is applied rather than a static pull method.

Since the DVB-I phase 1 scheme receives data according to a pull-only method, it cannot be determined whether the latest information at the code level has been acquired. A method/device according to embodiments proposes a method for the DVB-I client to increase the polling interval in a specific interval to update the latest information.

A method/device according to embodiments may acquire event information at the service list or service level in the service hierarchy at once, but the method may not update specific intervals for individual services, as the same method is used at both levels. Thus, a solution is proposed.

Embodiments propose a service in which services are discovered at the receiver native level and the client accesses an accessible service server to receive a linear service, as opposed to the existing technology that requires an app to be executed to provide a channel UX similar to a terrestrial (T), satellite (S), or cable (C) linear channel service.

Embodiments also propose service scenarios that integrate independent platforms of OTTs into one unified TV-native platform to allow users to receive OTT content within a channel without executing an OTT app.

Technical Solution

In one aspect of the present disclosure, provided herein is a method of processing media data according to embodiments including receiving service list provision information, transmitting region selection information based on the service list provision information, and receiving media data based on the region selection information.

In another aspect of the present disclosure, provided herein is a method of processing media data according to embodiments including transmitting service list provision information, receiving region selection information based on the service list provision information, and transmitting media data based on the region selection information.

Advantageous Effects

Receivers that do not have conventional tuners may efficiently discover and acquire Internet-based broadcast services over a broadband network.

In receiving an aggregated service list according to embodiments, there is no need to receive the entire service list, due to management methods for each service and selective parsing and storage for each service.

In receiving a tailored service list based on region selection information according to embodiments, the amount of data transmitted and received between the server and the receiver may be reduced, thereby increasing data processing efficiency.

Since the reception device does not need to receive service entry points for channels in all regions, the data processing burden on the reception device may be reduced.

In addition, security concerns may be addressed as region selection information is allowed to be transmitted without the reception performance of the RF signal being disclosed by the reception device.

DESCRIPTION OF DRAWINGS

The accompanying drawings illustrate embodiments of the present disclosure and, together with the description, explain the principles of the invention.

FIG. 4 shows an extended syntax of a service discovery list table according to embodiments;

FIG. 5 shows an example of channel management according to embodiments;

FIG. 6 illustrates a hidden presentation according to a type according to embodiments;

FIG. 8 shows an example in which a related material is included in an SDLT according to embodiments;

FIG. 9 shows a RelatedMaterial syntax according to embodiments;

FIG. 11 shows a service list hierarchy according to embodiments;

FIG. 12 shows a DVB-I service list type according to embodiments;

FIG. 13 shows a DVB-I service type according to embodiments;

FIG. 14 shows a service instance type according to embodiments;

FIG. 15 shows DASH delivery parameters for simulcast according to embodiments;

FIG. 16 shows a scheme for selecting a service instance based on DASHDeliveryParametersType according to embodiments;

FIG. 17 shows an example of a DVB-I service instance according to embodiments;

FIG. 19 shows a ContentGuideSourceList according to embodiments;

FIG. 22 illustrates a DVB-I service scheme according to embodiments;

FIG. 24 shows a method of updating the latest information of a DVB-I service scheme and content guide according to embodiments;

FIG. 26 illustrates a method of acquiring the latest content guide information for each DVB-I service according to embodiments;

FIGS. 29 and 30 illustrate a DVB-I service scheme according to embodiments;

FIG. 33 shows DVB-I service discovery information according to embodiments;

FIG. 34 shows the syntax of a service list registry entity according to embodiments;

FIG. 35 shows semantics of a service list registry entity according to embodiments;

FIG. 36 illustrates a service list selection UI/UX according to embodiments;

FIG. 37 illustrates a method for coping with channel conflict in receiving a multiple service list according to embodiments;

FIG. 39 shows LCN table entry syntax according to embodiments;

FIG. 40 shows an example of resolving service channel conflicts according to embodiments;

FIG. 41 is an example of resolving a channel redundancy issue according to embodiments;

FIG. 43 illustrates a DVB-I based hybrid service scenario according to embodiments;

FIG. 44 illustrates a DVB-I service discovery procedure according to embodiments;

FIG. 45 illustrates a method of acquiring a DVB-I service list according to embodiments;

FIG. 46 illustrates a method of acquiring a DVB-I service list according to embodiments;

FIG. 47 illustrates a method of acquiring a DVB-I service list according to embodiments;

FIG. 48 illustrates a method of providing a DVB-I regional service list according to embodiments;

FIG. 53 illustrates a result of decoding a JWT according to embodiments;

FIG. 55 illustrates a DVB-I service list entry point schema according to embodiments;

FIG. 56 illustrates a DVB-I service list entry point schema according to embodiments;

FIG. 57 illustrates delivery of region selection information according to embodiments;

FIG. 58 illustrates a DVB-I service list entry point schema according to embodiments;

BEST MODE

Figure 1:
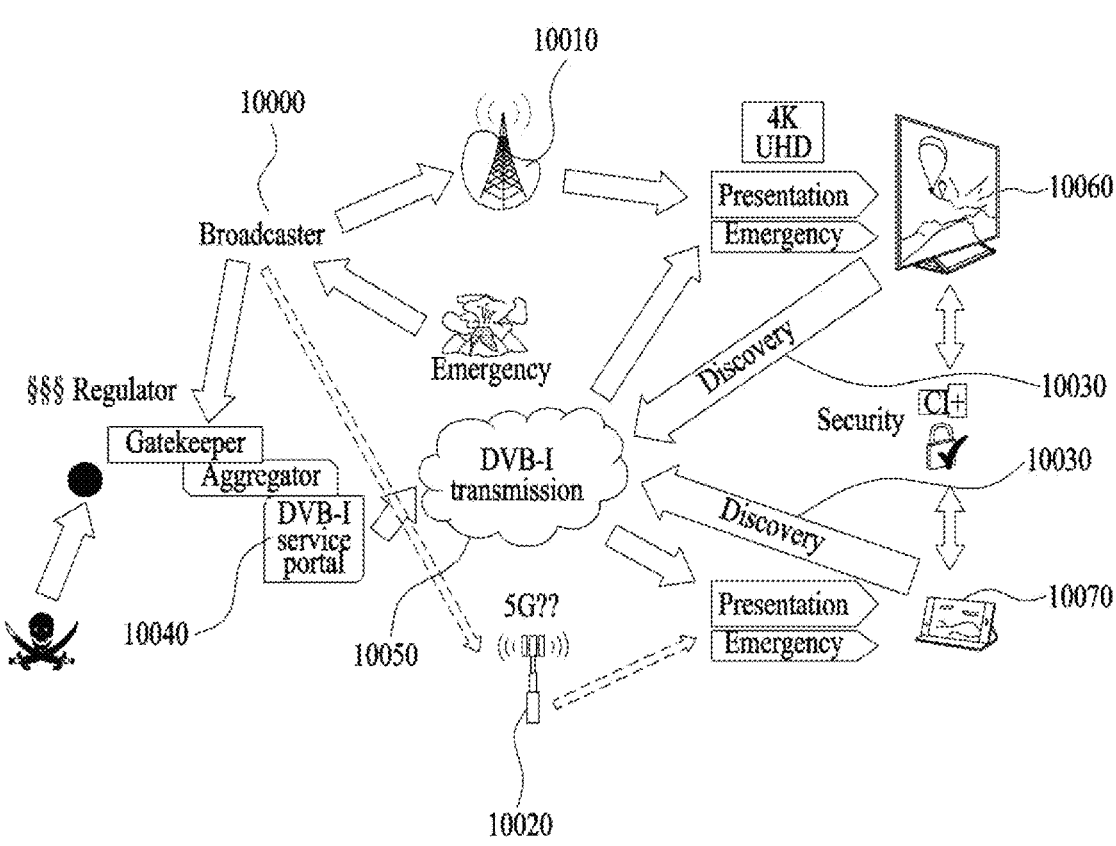
FIG. 1 shows a service scenario according to embodiments.

Hereinafter, embodiments disclosed in this specification will be described in detail with reference to the accompanying drawings. The same or similar components are given the same reference numbers and redundant description thereof is omitted. The suffixes "module" and "unit" of elements herein are used for convenience of description and thus are used interchangeably and do not have any distinguishable meanings or functions. Further, in describing the embodiments disclosed in this specification, if a detailed description of related known techniques would unnecessarily obscure the gist of the embodiments disclosed in this specification, detailed description thereof will be omitted. In addition, the attached drawings are provided for easy understanding of the embodiments disclosed in this specification and do not limit technical idea disclosed in this specification, and the embodiments should be construed as including all modifications, equivalents, and alternatives falling within the spirit and scope of the present disclosure.

It is apparent that the following embodiments are intended to embody the present disclosure and are not intended to limit or restrict the scope of the present disclosure. All techniques easily conceivable by those skilled in the art from the detailed description and embodiments of the present disclosure are interpreted as belonging to the scope of the present disclosure.

The following detailed description is to be construed in all aspects as illustrative and not restrictive. The scope of the present disclosure should be determined by reasonable interpretation of the appended claims and all changes which come within the equivalent scope of the present disclosure are within the scope of the present disclosure.

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the accompanying drawings and the detailed description should not be construed as limiting the embodiments set forth herein and should be interpreted as covering all equivalents to the embodiments disclosed in the accompanying drawings and the detailed description or other substitutions.

A media data processing method/device according to embodiments may refer to a media data transmission/reception method/device. The media data processing method/device according to the embodiments may be simply referred to as a method/device according to the embodiments.

The method/device according to embodiments relates to a method for discovering and acquiring Internet-based broadcasting-related media data (which may be referred to as a service).

FIG. 1 shows a service scenario according to embodiments.

Referring to FIG. 1, a broadcaster 10000 may transmit a service on a terrestrial (T), satellite (S), or cable (C) channel 10010 and an Internet channel 10020 simultaneously. Service providers and manufacturers of devices capable of receiving a DVB-I service 10050 may obtain authentication of a service channel through regulation and provide Internet channels through existing linear services and channel aggregators.

In order to present a list of existing linear broadcasting channels (for example, terrestrial, satellite, and cable channels) and an Internet channel list in an aggregated form, bootstrap 10030 may be operated based on service discovery information provided over the existing linear network.

On the broadcaster side, the existing traditional service provision type may be extended, and additional services may be provided in the form of an on-demand/multicast service along with the existing linear channel network. In addition, a personalization service may be provided through a connection-based usage report of an Internet channel.

From the perspective of TV/STB manufacturers, by providing a channel list 10040 aggregating OTT services with traditional T/S/C channels, opportunities to provide various services and expand the functions of the terminal may be obtained.

In the case of the network/ISP, OTT contents may be aggregated through their network infrastructure to expand service provision. In addition, through dynamic allocation of unicast/multicast, delivery performance enhanced compared to that of a terminal providing a non-management network-based service may be provided.

In other words, the broadcaster 10000 may transmit broadcast data over the traditional broadcast network 10010 and the Internet network 10020. A reception device according to embodiments, for example, a TV 10060 or a second device 10070 may make a request for the service discovery 10030 of the broadcast data to the DVB-I provider or server 10050, and receive the aggregated DVB-I service list 10040. Thus, service signaling may be performed on both the traditional linear channel and the Internet channel without the process of installing and executing a separate app at the native level.

Figure 2:
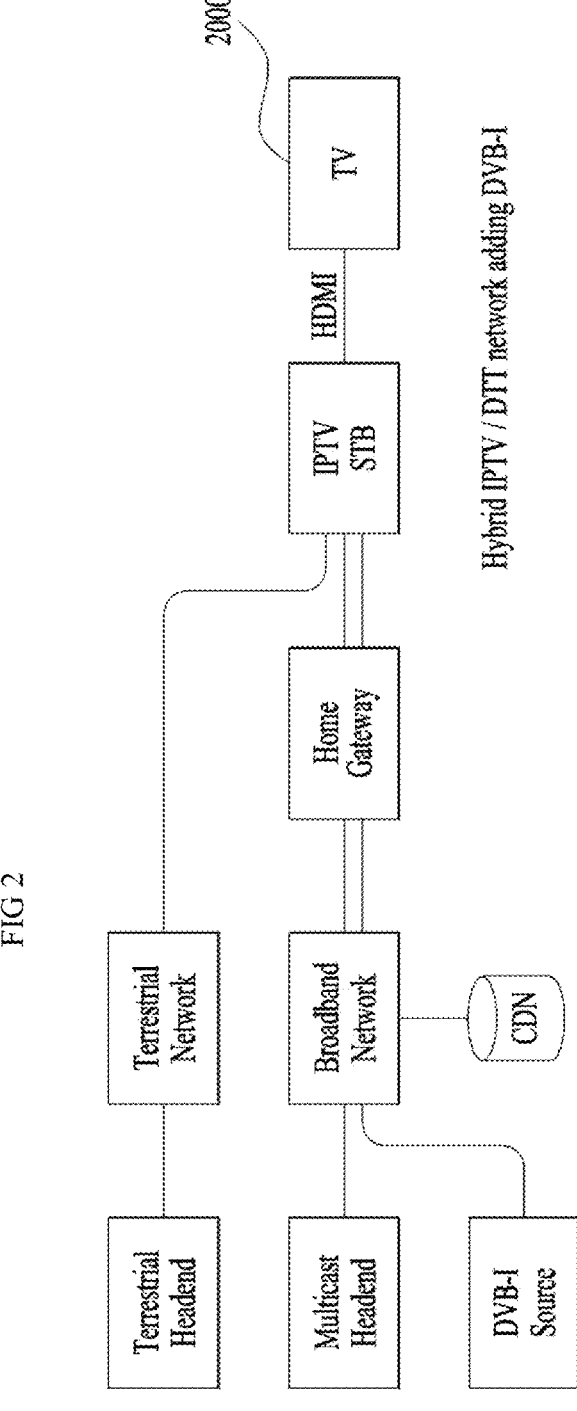
FIG. 2 shows a flowchart of an operation according to embodiments in terms of a network operator/ISP according to embodiments.

FIG. 2 is a flowchart of an operation according to embodiments from the perspective of a network operator/ISP according to embodiments.

The device 20000 according to the embodiments may be a TV receiver. That is, it may be a device according to a hybrid IPTV/DTT network that supports DVB-I service. The reception device 20000 may be connected to an STB. The connection may be established by, for example, HDMI. The IPTV STB may receive a terrestrial broadcast signal from a terrestrial headend over a terrestrial network, and may receive various services and/or data from a multicast headend, which provides multicast services, a DVB-I source, which provides DVB-I services, and/or a content delivery network (CDN), which provides Internet content or the like, through a home gateway and a broadband network.

In particular, in the case of OTT, an OTT application suitable for a different OS environment is separately provided for each existing terminal. However, the method/device according to the embodiments may use a service through an industry standard based ecosystem without such a separate application. This provides a common service interface, thereby providing a convenient and efficient service access.

Figure 3:
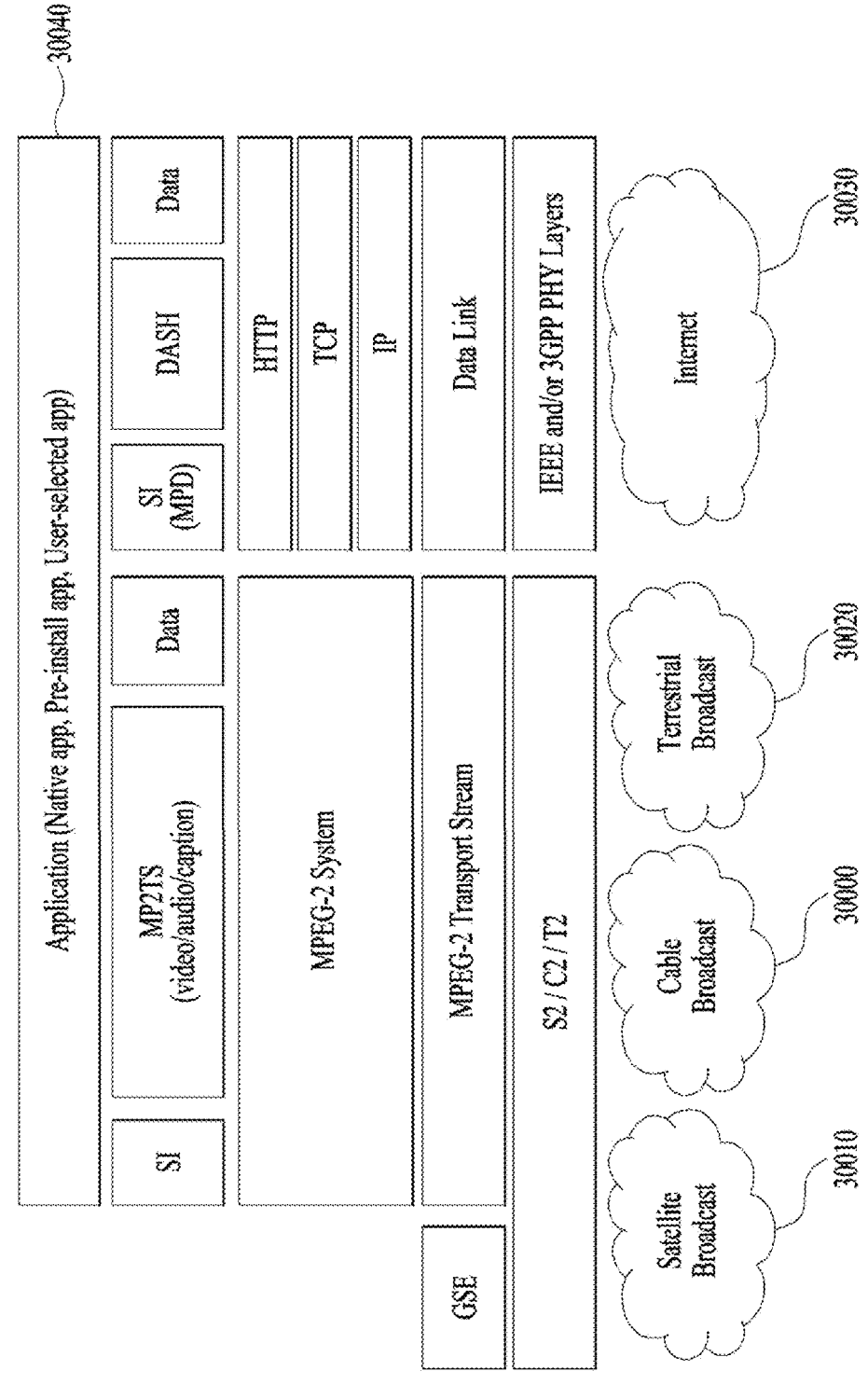
FIG. 3 shows a stack of a protocol for a DVB channel service according to embodiments.

FIG. 3 shows a stack of protocols for DVB channel services according to embodiments.

The TV device 20000 of FIG. 2 may perform the scenario of FIG. 1 based on the protocol structure of FIG. 3.

Services according to embodiments include DVB C/S/T/I services. Based on the protocol stack structure constituting the DVB-C (30000)/S (30010)/T (30020)/I (30030) service of FIG. 3, the embodiments propose a mechanism for discovering a DVB-I service transmitted through the Internet and a signaling scheme therefor. The method/device according to the embodiments may drive an application through service discovery, and an application 30040 according to the embodiments may include a native application, a pre-installed application, and a user-selected application.

FIG. 4 shows an extended syntax of a service discovery list table according to embodiments.

The method/device according to the embodiments may configure a service discovery list table (SDLT) for faster service discovery and service acquisition of the DVB-I service. FIG. 4 shows information included in the service list of FIGS. 11, 19, 28, 39, 49, 56, and 68.

The embodiments propose a method for configuring an SDLT and a USBD as shown in FIG. 4 in order to more quickly provide a service selected by a user from among services that may be provided to the user through a service discovery operation.

The SDLT may be the first essential information that the receiver should have for service discovery. Through this signaling data, the receiver may provide service list information that allows the user to select a service. Here, the SDLT may be configured to contain more information. Such configuration information may provide a large amount of service and enable quicker service play when the user selects a service.

When the SDLT is configured in this way, the USBD in the signaling metadata of an internet-based service may include a value of an element DeliveryMethod, which provides information mapped to the MPD. @serviceId and @globalServiceId may be used as information for mapping to the SDLT and information for mapping to the ESG.

Each element in the SDLT will be described with reference to the figure.

ServiceDiscoveryListTable represents a root element.

SdltInetUrl indicates a URL for accessing signaling/ESG objects.

@urlType indicates a type of files available with this URL.

Service represents service information.

@serviceId indicates a number that uniquely identifies this service within the range of originalNetworkId.

@globalServiceId indicates a globally unique service identifier. The value is mapped to the global service ID in the ESG. For the traditional DVB/T/S/C service, this attribute may not be present.

@originalNetworkId specifies a number that uniquely identifies the original network in which this service was originally generated.

@transportStreamId specifies a number that uniquely identifies a transport stream. This attribute is present in the traditional DVB-T/S/C service. However, this attribute may not be present for the DVB-T service with ISO BMFF format.

@frequencyNum specifies a number that uniquely identifies the frequency number of the physical layer. This attribute may be present when the service is a traditional terrestrial service.

@serviceCategory indicates the category of this service. The category may be a linear, on-demand, or application service.

@svcSeqNum indicates the version of service information. The value may increment by 1 for each new version of the service data in RFG.

@contentFormat indicates the format of contents of this service.

@hidden indicates whether this service is hidden in the service list or shown to users. The default value is "FALSE."

@appRendering indicates whether any application is executed first or renders this service. The default value is "FALSE."

@MediaPresentationDescription is a URL pointing to MPD signaling description.

@ApplicationInformationTable is a URL pointing to AIT signaling description.

@DistributionWindowDescription is a URL pointing to DWD signaling description.

RunningStatus specifies the status of this service.

FIG. 5 shows an example of channel management according to embodiments.

FIG. 5 shows the element "hidden" in FIG. 4.

When a DVB-I service is provided, there are two method of selecting a linear channel. The user may directly select a channel number or select a channel through channel surfing. Considering the characteristics of the DVB Internet channel, unicast may be received based on the HTTP network or a linear channel service may be provided in the form of multicast. The reception of a DVB broadcast channel is delivered to an unspecified number of devices through a dedicated frequency and logical channel. In contrast, for DVB-I, a subscription and streaming are provided through the Internet, and therefore hidden/inactive channel management of the channel is required.

For example, the broadcast network ATSC 1.0 may define channel management as follows.

@hidden: A boolean value indicating whether a logical channel is visible or hidden. It indicates the visible or hidden attribute when a user searches for the logical channel or directly selects a channel entry.

@hide_guide: A boolean value indicating whether a logical channel is visible or hidden in the EPG. It indicates the visible or hidden attribute of a channel guide for the user.

This method is an RF broadcasting environment-based channel management method, and channel management should be manually performed based on only the information in the service list. However, in the DVB-I environment, a return channel exists, and thus there may be various channel management methods.

In embodiments, when a channel is hidden/inactive in a DVB-I environment, a user may determine the existence/status of the corresponding channel using the return channel, and the hidden/inactive channel of an existing broadcast may be easily managed through an alternative service.

In the case of hide_guide (=1) and Hidden (=1), an indication that that the app service is accessible may be additionally signaled.

@Hidden(visible): A boolean value indicating whether a logical channel is visible or hidden. It indicates the visible or hidden attribute when a user searches for the logical channel or directly selects a channel entry.

@selectable: When this is set, a hidden service may be selected by direct input to the logical channel number. When the value is false, the hidden service cannot be selected even when the user directly inputs the hidden service.

@hidden_guide: When a channel is directly accessed in a hidden channel state, @hidden_guid may guide the state in the channel or display an alternative screen through a link. There may be type values indicating various types of channel guide methods.

@hidden(visible)_presentation: defines corresponding anyURI information according to a type value defined through hidden_guide.

FIG. 6 shows types of hidden guides related to a hidden presentation.

@Hidden(visible): A boolean value indicating whether a logical channel is visible or hidden. It indicates the visible or hidden attribute when a user searches for the logical channel or directly selects a channel entry.

@selectable: When this is set, a hidden service may be selected by direct input to the logical channel number. When the value is false, the hidden service cannot be selected even when the user directly inputs the hidden service.

@hidden_guide: When a channel is directly accessed in a hidden channel state, @hidden_guid may guide the state in the channel or display an alternative screen through a link. There may be type values indicating various types of channel guide methods.

@hidden(visible)_presentation: defines corresponding anyURI information according to a type value defined through hidden_guide.

FIG. 6 shows types of hidden guides related to a hidden presentation.

When the type is 0x0001, it indicates an alternative link of a service provider, and the hidden presentation may provide a connection address, for example, www.bbc.co.kr/alternative/music.

When the type is 0x0002, it indicates a linked service of an alternative channel, and the hidden presentation may signal a DVB triplet, for example, DITS-(OriginalNetworkID)-(TransportStreamID)-(serviceID).

When the type is 0x0003, it indicates a stereoscopic channel guide, and the hidden presentation may signal a DVB triplet, for example, DITS-(OriginalNetworkID)-(TransportStreamID)-(serviceID).

When the type is 0x0004, it indicates an ESG or broadband content guide (BCG) link, and a hidden presentation may signal loginformDB.html.

When the type is 0x0005, it indicates an alternative app service, and the hidden presentation may signal an app dedicated channel. Thus, the reception device may access the app using the AIT.

Figure 7:
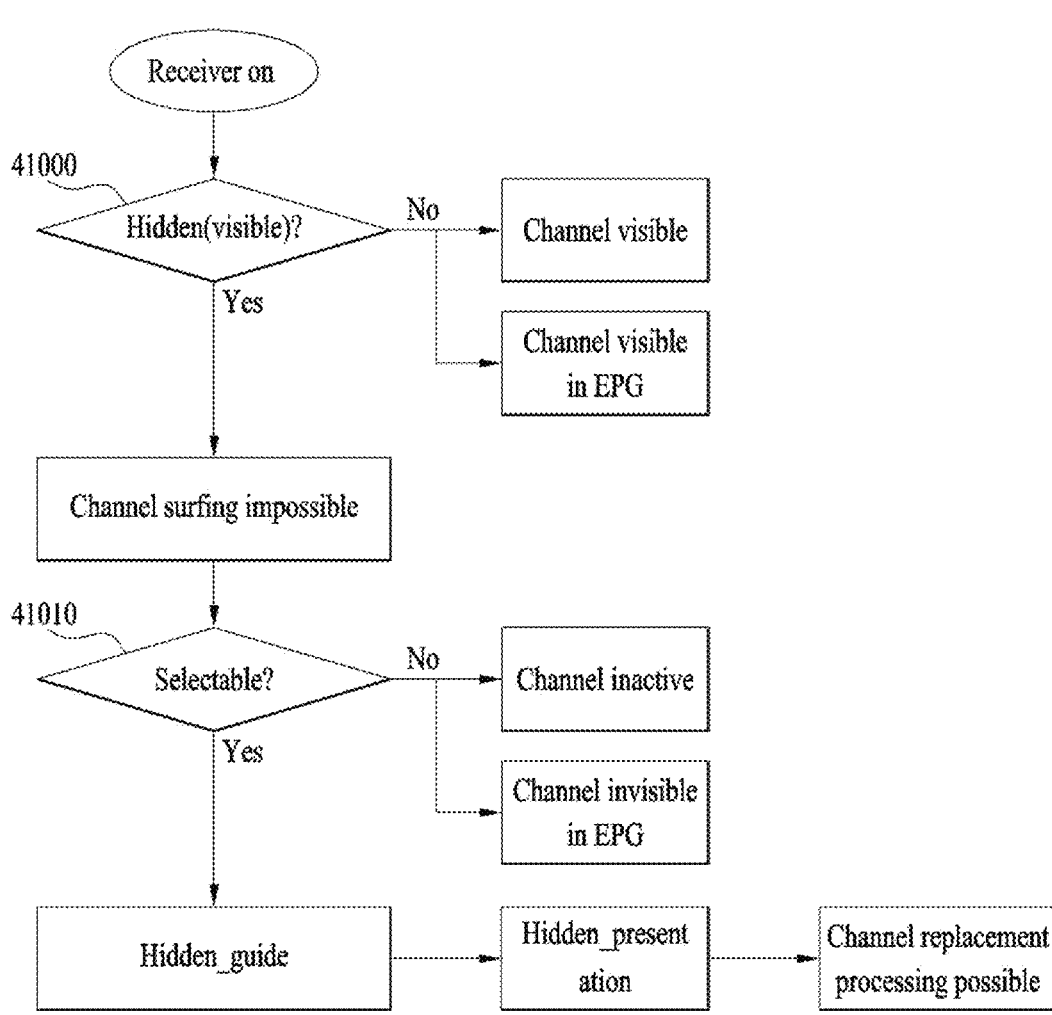
FIG. 7 is a flowchart of hidden channel management according to embodiments.

FIG. 7 is a flowchart of hidden channel management according to embodiments.

FIG. 7 is a flowchart of processing a channel based on a hidden channel related to FIG. 6.

The operations of the above-described embodiments will be described with reference to the flowchart.

In operation 41000, when the power of the reception device is turned on, the reception device checks whether the channel/service is hidden. When the channel/service is not hidden, the reception device indicates a visible channel and a visible channel guide on the display.

In operation 41010, when there is a hidden channel/service and channel surfing is impossible, the reception device checks whether the channel is selectable. When the channel is not selectable, the reception device notifies the user that the channel is inactive and the channel guide is not visible. In the case of YES for selection possibility, the reception device may generally process/display the hidden channel based on the hidden guide and the hidden presentation.

Figure 25:
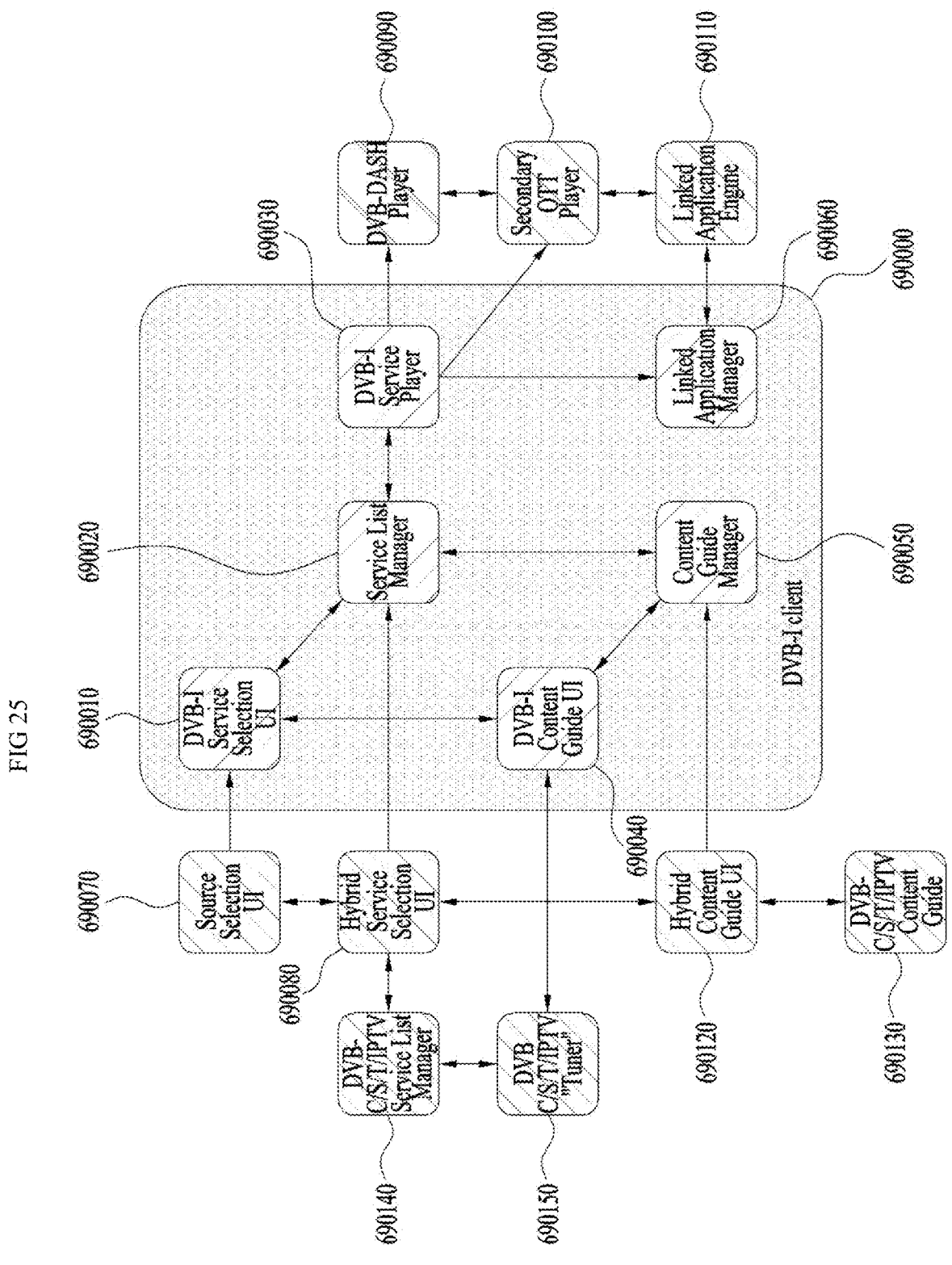
FIG. 25 shows a model of a DVB-I client according to embodiments.
Figure 31:
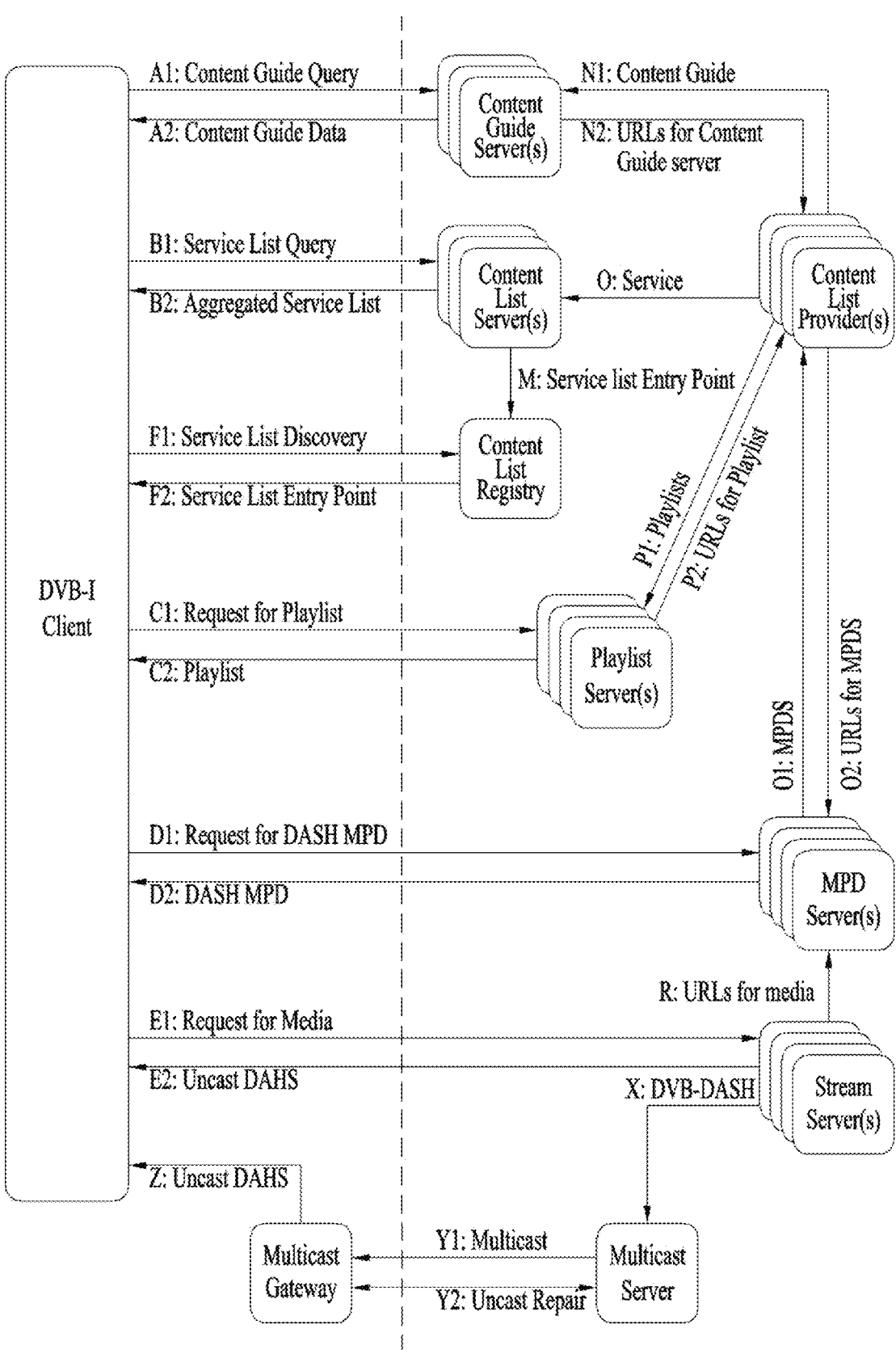
FIG. 31 shows a DVB-I model according to embodiments.
Figure 32:
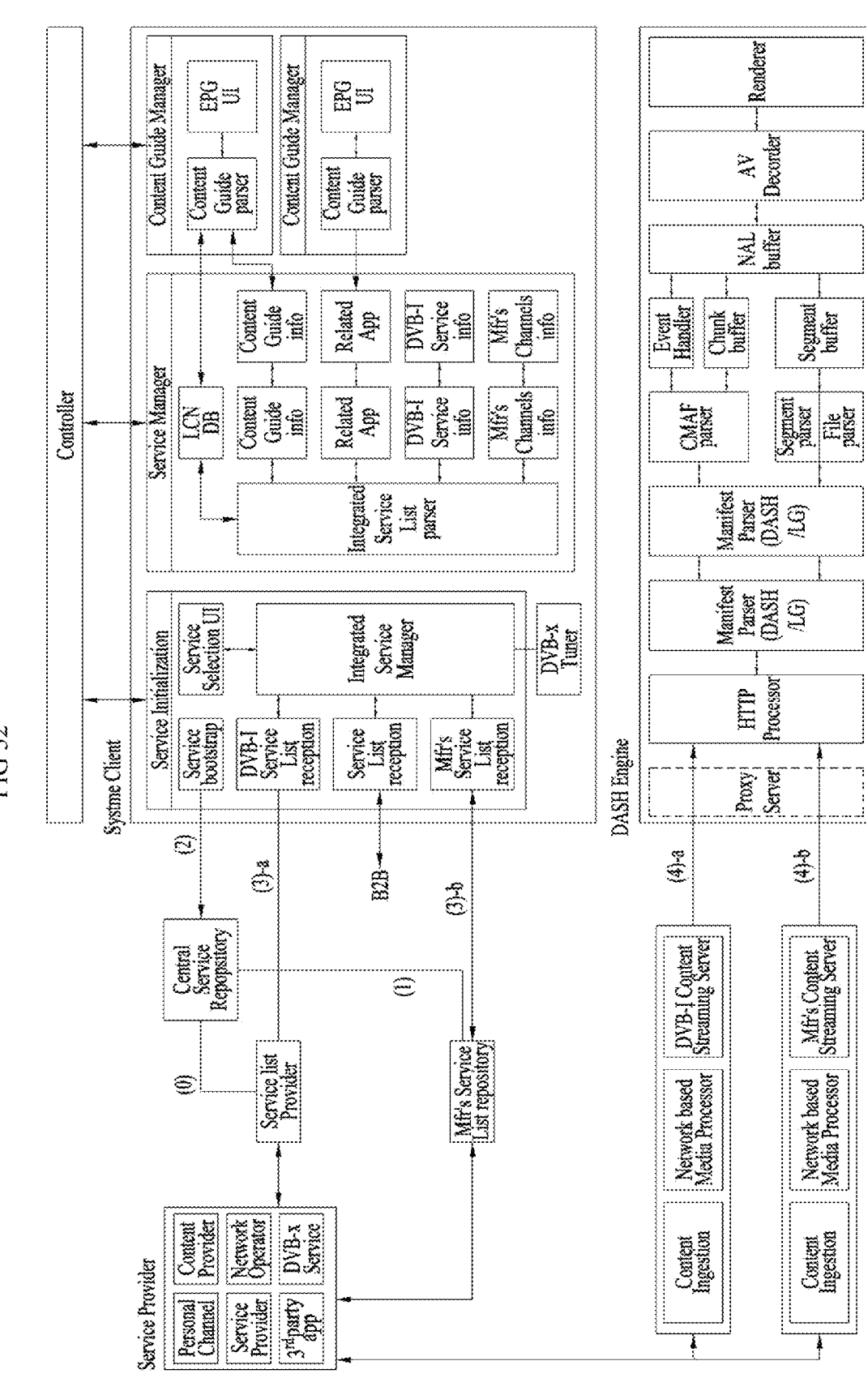
FIG. 32 shows a DVB-I service architecture for supporting a manufacturer service list according to embodiments.
Figures 49, 50:
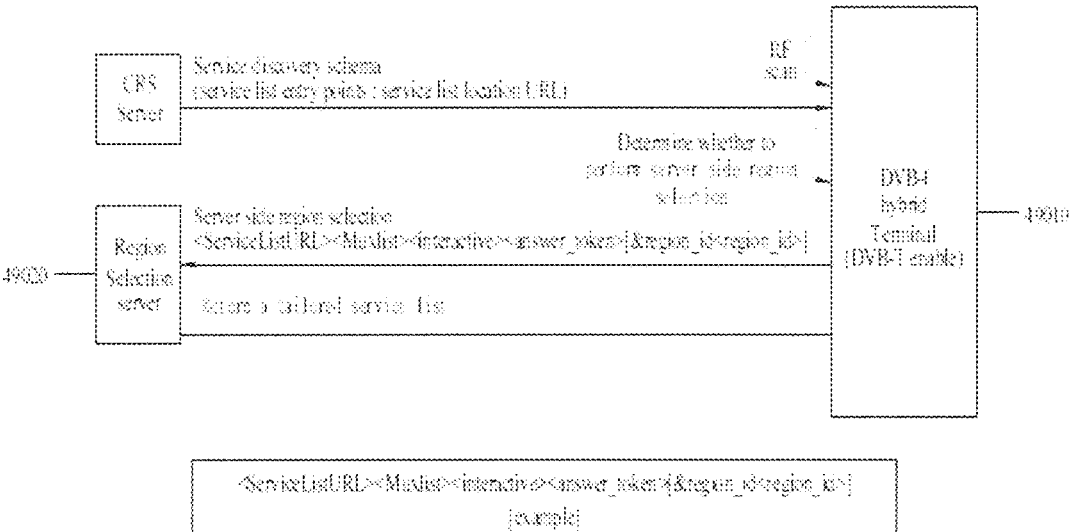
FIG. 49 illustrates server side region selection according to embodiments.
FIG. 50 illustrates an example JWT according to embodiments.
Figure 52:
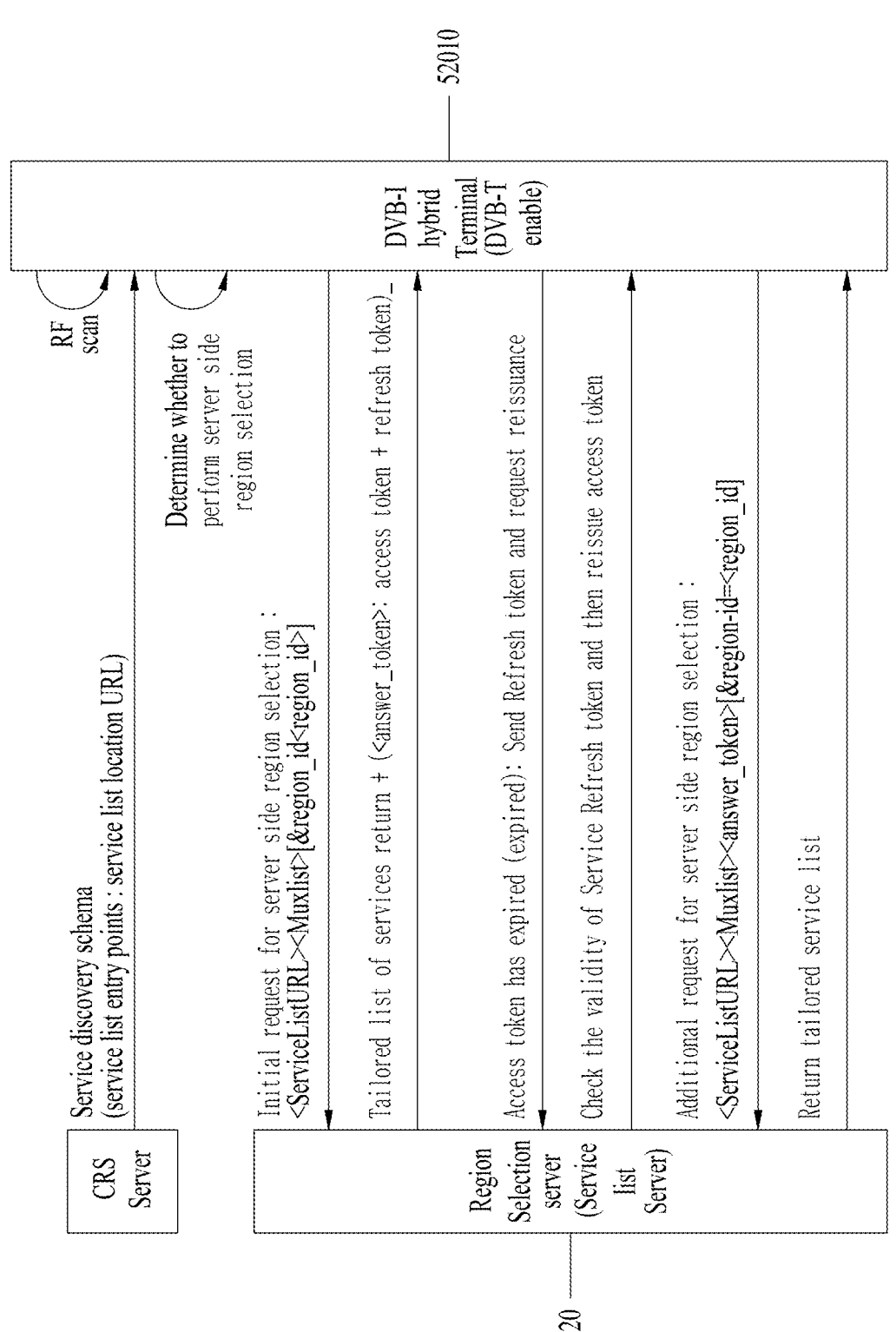
FIG. 52 illustrates a method of supporting SSRS according to embodiments.

The reception device according to the embodiments may correspond to the TV 10060, the 2nd device 1007 of FIG. 1, the TV 2000 of FIG. 2, the DVB-I client 690000 of FIG. 25, the DVB-I client of FIG. 31, the system client of FIG. 32, the DVB-I hybrid terminal 49010 of FIG. 49, and the DVB-I hybrid terminal 52010 of FIG. 52.

FIG. 8 shows an example in which a related material is included in an SDLT according to embodiments.

FIG. 8 is a syntax of an SDLT related to FIG. 4 and the like.

A method of providing a service related material when the service is a DVB-I part-time service and is inactive will be described with reference to FIG. 8.

As described above, the DVB-I service may provide an Internet linear channel, and in a service discovery process, a service may be provided in a part-time form in a specific LCN. In order not to cause confusion when the user selects directly a service through a channel number in the outside of service state, channel change API may be executed through an inactive service banner image or an additional application, or additional VoD service may be provided. In this regard, a hierarchy that fits the real practice is proposed by applying a datatype value that is actually used in the industry.

The SDLT of FIG. 8 may correspond to the SDLT according to the above-described embodiments. The elements/fields added will be described below.

@LCN indicates a logical channel number.

RelatedMaterial may further include the following elements.

@HowRelated:href may be delivered together with an @href element carrying a value.

MediaLocator may carry information about the location of the media.

Specifically, MediaURI may be a value containing a URI for an XML AIT file or image, and @contentType may carry the value.

Availability indicates the status of this service (running, not running or starts in a few seconds, etc.).

@ValidFrom indicates the time/date when this service becomes valid. When this value is not specified, it may be assumed that the service is already available.

@ValidTo indicates the time/date when this service will expire. When this value is not described, it may be assumed that this service is available indefinitely.

@Days indicates days of the week on which the service is available. When not specified, the service is available on all days. For example, ServiceDays="1 4 7" indicates that the service is only available on Monday, Thursday and Saturday.

@Recurrence indicates the weekly cadence of the scheduled availability for the service. When not specified, the recurrence occurs every week.

A receiver according to embodiments signals an actual effective time of a part-time service through attributes in an element <Availability>, and checks an inactive period. The screen shown in the LCN in the period may show the inactive state with an attribute defined in the element <RelatedMaterial>. @MediaURI is the same attribute as the above-mentioned hidden(visible)_presentation URI, and conforms to the HbbTV(AIT) app signaling and app life-cycle. When this value is omitted, an inactive alternative service may be provided through the URI defined in @ApplicationInformationTable. When content_type of @MediaURI is "image/png," an inactive service banner may be indicated. In the attribute @MediaURI, an inactive service may be provided through an image and app signaling according to content_type.

For example, according to @MediaURI, the reception device may provide an inactive state based on the image (image/png) (banner) of http://img-ctv.digitaluk.co.uk/channel7/service_a_linear.png.

According to @MediaURI, the reception device may provide an inactive state based on application/vnd.dvb.ait+xml(application) of http://www.channel9.co.uk/player/ait.aitx?channel=channela.

FIG. 9 shows a RelatedMaterial syntax according to embodiments.

The syntax of RelatedMaterial in FIG. 9 is the same as that described in FIG. 8.

Figure 10:
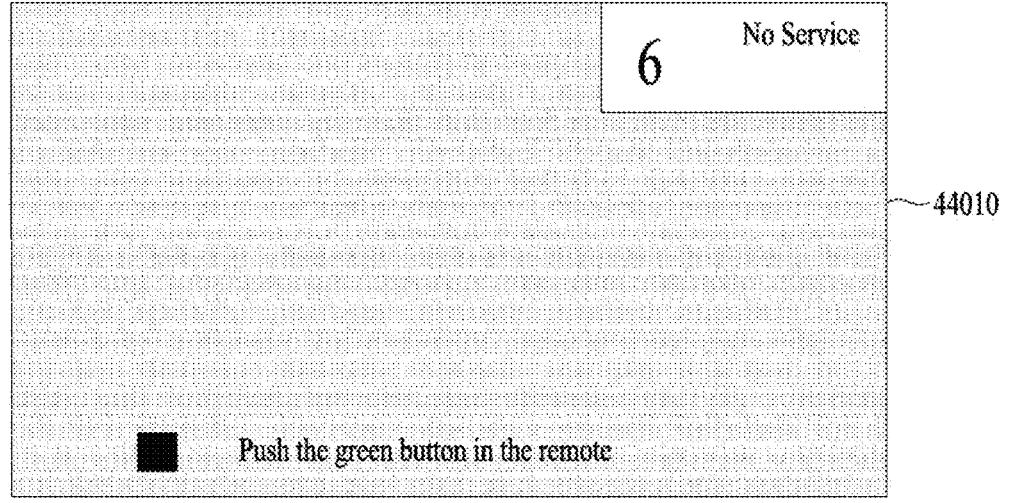
FIG. 10 shows an example of use of an inactive banner according to embodiments.

FIG. 10 shows an example of use of an inactive banner according to embodiments.

FIG. 10 may be included in an example of channel management in FIG. 7 and the like.

FIG. 9 shows a UI/UX that may be applied on a specific logical channel number (LCN) in an inactive service. The reception device may display an ESG 44000 on the display. In the case of LCN 6 on the UI/UX of the ESG 44000, the reception device may provide an alternative application such as a "No service" banner indicating "No service" as a current state (44010). The alternative application may be executed on the blank screen, or the reception device may receive a signal for selecting an alternative application by a user through a remote controller, and execute an operation related thereto.

FIG. 11 shows a service list hierarchy according to embodiments.

FIG. 11 shows a service list hierarchy for the service scenario of FIG. 1.

The DVB-I service list may contain respective services, and each service may contain service instances. Multiple service instances may be defined according to each delivery network, and uniqueness may be distinguished according to the URN of source_type.

The DVB service list type 45000 may reference the DVB-I service type 45010 for each service. The DVB-I service type 45010 signals a related material and a guide source. The DVB-I service type 45010 may reference the service instance type 45020 for each service instance. The service instance type 45020 signals a subscription package for the related material and a source type for URN. The service instance type may reference at least one of a delivery parameter type for DVB T/S/C, an RTSP delivery parameter type, a multicast delivery parameter type, or a DASH delivery parameter type.

The proposed source type URNs 45030 provide URNs for DVB T/S/C/IPTV/DASH, etc.).

The DVB service list type 45000 references the LCN table list type, and the LCN table list type references the LCN table type. The LCN table type, the DVB service list type 46000, and the DVB-I service type 45010 may reference REGION. Related region information may vary among services.

The elements in FIG. 11 will be described in detail with reference to the figures described below.

FIG. 12 shows a DVB-I service list type according to embodiments.

FIG. 12 shows service list information included in FIG. 11.

ServiceList is a list of details and locations of IP services provided by a service provider. Service providers may divide their services into multiple service lists. Thus, this attribute is essential.

Name is the name of a service list in a readable form. Multiple service list names may be expressed in different languages. This attribute is mandatory.

ProviderName is the name of the provider of the readable service list. Multiple values for the provider name may be described in different languages. This attribute is mandatory.

RelatedMaterial indicates an additional material related to the service. This attribute is optional.

RegionList is a list of geographic regions with logical identifiers that are used to provide regional information of services in the service list or the service list. This attribute is optional.

TargetRegion represent the identifiers of the regions specified in the RegionList for which this service list is targeted. This attribute is optional.

LCNTableList is a list of tables that define regionalized and packaged logical channel numbers for the respective services. This attribute is optional.

Service represents services that are part of the service list. This attribute is optional.

@version is the version number of the service list. The value is incremented for every published change. This attribute is mandatory.

FIG. 13 shows a DVB-I service type according to embodiments.

The DVB-I service types in FIG. 13 describe the above-described service types in the form of a table.

UniqueIdentifier is the unique ID of the service. This ID may never be changed for a service. Other parameters of this service may be changed. This attribute is mandatory.

Service Instance is an instance having A/V content for this service. When multiple elements of the type of this attribute are present and available, the one with a lower value of the @priority attribute may have a higher priority (or vice versa). All service instances for a given service may have the same content. This attribute is optional.

TargetRegion is the regions where the service is received. When not specified, no region constraints exist. This attribute is optional.

ServiceName is the name of the service. Service names may be specified in various languages. This attribute is mandatory.

ProviderName is the readable provider name of this service. This element may be specified in various languages and is mandatory.

RelatedMaterial is an additional material related to the service. The material may include, for example, out of service banners, service related applications, and service logos. This attribute is optional.

ServiceGenre is the genre of the service. ServiceGenre is optional.

ServiceType is the type of service (refer to the description in ETSI EN 300 468). ServiceType is optional.

RecordingInfo is information allow a DVB-I client to determine whether or not the content from this service is recorded, time-shifted, or redistributed. RecordingInfo is optional.

GuideSource is the details of a broadband content guide carrying metadata for this service. GuideSource is optional.

@version is the version number of this service. It is incremented for every published change. @version is mandatory.

FIG. 14 shows a service instance type according to embodiments.

Elements of a service instance type will be described with reference to FIG. 14.

DisplayName is a readable name of the service associated with a specific service location. Multiple service names may be specified in various languages. When not present, the ServiceName field may be used. This attribute is optional. In the present disclosure, an attribute may correspond to an element, a field, information, or a value according to a level, and may be referred to by various terms.

RelatedMaterial is an additional material related to the service. Specifically, it may include a no-service banner, service related applications, service logos, and the like. A related material with a specific value of the attribute How-Related, which is provided within a ServiceInstance element, supercedes any corresponding related material with the value of HowRelated provided within a Service element. This element is optional.

DRMSystemId indicates any content projection schemes used for the service. The value may be the same as the @schemeIdURI defined in document DVB A168. This value is optional.

ContentAttributes may refer to Annex D.1.3.2 of ETSI TS 103 205. This value is optional.

Availability indicates the period in time when this service location is expected to be active. This value is optional.

SubscriptionPackage specifies a subscription package in which this service is included. This value is optional.

FTAContentManagement: DVB-I service instances that do not use DRM may carry an FTAContentManagement element to define the content management policy for the ServiceInstance. The semantics of each attribute may be specified in the corresponding fields of FTA_content_management_descriptor, which is a descriptor in document ETSI EN 300 468. This value is optional.

SourceType identifies the primary delivery source for this service instance. SourceType determines the required delivery parameters. This value is optional.

DVBTDeliveryParameters provides delivery parameters for DVB-T serviceS.

DVBSDeliveryParameters provides delivery parameters for DVB-S services.

DVBCDeliveryParameters provides delivery parameters for DVB-C services.

RTSPDeliveryParameters provides delivery parameters for RTSP-based services.

MulticastTSDeliveryParameters provides delivery parameters for services delivered using multicast UDP.

DASHDeliveryParameters( ) provides delivery parameters for services using DVB DASH delivery.

SATIPDeliveryParameters provides parameters that a DVB-I client supporting SATIP may use to receive a service instance from an SATIP server.

The above-mentioned parameters may be described according to the SourceType.

@priority indicates the priority of this service instance relative to the other service instances of the service. This value is optional.

FIG. 15 shows DASH delivery parameters for simulcast according to embodiments.

UriBasedLocation: Refer to Annex D.1.3.2 of ETSI TS 103 205 [2] for semantic definition.

MinimumBitRate: Threshold bit-rate under which an alternative source for the same service should be preferred, if available.

This shows DASH delivery parameters for simulcast according to embodiments in a table.

The figure shows the detailed syntax of the above-described DASH delivery parameters.

DASHDeliveryParameters according to the embodiments may be additionally extended for simulcast.

UriBasedLocation may refer to Annex D.1.3.2 of document ETSI TS 103 205. It is mandatory. When the DASH service is simulcast, this value may provide location information based on the URI.

MinimumBitRate indicates a threshold bit-rate under which an alternative service for the same service should be preferred. This value is optional.

As a child element of the DVB-I service type, a service interface may be provided according to the delivery network. a client may consider each @priority and device capability and The reception device May determine a service instance.

Here, @minimumBitrate indicates throughput in terms of a network stack for receiving a stream within a service instance.

For example, @minimumBitrate according to the embodiments may indicate throughput in terms of a network stack for receiving a stream within a service instance. That is, the device according to the embodiments may check the minimum bit rate information for the minimum bit-rate at which the network may currently receive the DASH service.

Through the information, it may be determined whether the service instance is playable. However, in the case of the currently defined information, when multiple service instances are contained in DVBiservicetype, it is difficult for the client to select a service instance based only on the information of @minimumBitrate.

For example, it is assumed that there are two service instances as follows.

(Service instance 1) DVB-T delivery method, HD, H.264/ AVC (Service instance 2) DVB-I DASH delivery method, MinimumBitRate 1.5 Mbps For example, where there are two service instances (e.g., service instance 1 and service instance 2), a client related to the transmission/reception device according to the embodiments is an HEVC UHD capable terminal, and the network situation above the bit rate of the other comparison target may be ensured, the receiver (terminal) should request service instance 2 (e.g., HEVC UHD). However, unless the MPD is received through a request, the receiver cannot know, from the current information, an attribute indicating that a stream of better quality than instance 1 is included. Receiving and comparing all MPDs of all service instances may not only be a burden from the perspective of the receiver, but also may be an issue in rational network selection. A scheme for providing a better service between instances within DVB service scheme information is proposed below. That is, embodiments may be implemented in which the burden of the receiver parsing/analyzing all MPDs or similar signaling information is eliminated and the receiver is allowed to quickly identify and request a better service instance in response to a network situation of a specific bit rate or higher.

FIG. 16 shows a scheme for selecting a service instance based on DASHDeliveryParametersType according to embodiments.

The DASH DeliveryParametersType may include ComparisonBitRate and ComparisonContentAttributeType. The ComparisonContentAttributeType may include an AudioAttributes element, a VideoAttributes element, a CaptionLanguage element, and a SignLanguage element.

The ComparisonContentAttributeType may correspond to the ContentAttributes element included in the ServiceInstanceType 45020 of FIG. 45.

The DASHDeliveryParametersType may include ComparisonContentAttributeType. In addition, the ComparisonContentAttributeType may include AudioAttribute, VideoAttributes, CaptionLanguage, SignLanguage, and ComparisonBitRate as elements.

ComparisonBitRate and ComparisonContentAttributeType, which are common elements in options 1 and 2, may be defined as follows.

@ComparisonBitrate indicates a bitrate for handling a specific IP delivery service instance that provides a better user experience than a non-IP delivery service instance available for this service.

@ComparisonContentAttributeType indicates which video characteristic is available for the DVB-I client to provide a better user experience than the non-IP delivery service instances available for this service.

FIG. 17 shows an example of a DVB-I service instance according to embodiments.

There are two service instances: DVB-S ServiceInstance and DVB-I ServiceInstance.

The ServiceInstance of 56000 has priority 0, and the display name is ABC drama. As shown in FIG. 55, Audio-Attributes, VideoAttributes, and the like are signaled as attributes, and the ServiceInstance includes DVBSDelivery-Parameters. Here, the priority '0' may be an example value. In addition, the reception device according to the embodiments may check an additional service instance in addition to the service instance to provide, through signaling information according to embodiments, a service instance capable of providing a better service to the user in consideration of not only the priority value, but also the network status or available bandwidth and capabilities of the client.

The service instance of 56010 has priority 1, and the display name is ABC drama. DASHDeliveryParameters may signal the address of https://live.daserste.de/0001 Das %20Erste.mpd</dvbisd-base:URI for content of the application/dash+xml type through a URI-based location. The MinimumBitRate is 1M, and the ComparisonBitRate is 7M. The ComparisonContentAttribute signals VideoAttributes through "urn:mpeg:mpeg7:cs:VideoCodingFormatCS:2001: 2.2.2" and HEVC Video Main10 Profile @Main Level</tva:Name> (UHD enable). Specifically, the value of the ComparisonBitRate may be an example value. The reception device (terminal, client, etc.) according to the embodiments checks the value of ComparisonBitRate, and recognize, from the value, that a better service is provided. For example, when a better service corresponding to the value of 7M is provided, the method/device according to the embodiments may additionally define corresponding video attribute information like the ComparisonContentAttribute of FIG. 55. Accordingly, the reception device according to the embodiments may check the presence of the UHD stream and switch the stream to a service for the ComparisonContentAttribute according to the network situation.

When the receiver receives two instances within the same service (e.g., ABC drama) in the DVB-I service scheme, the DVB-I client should select an instance that may be provided for a better user experience. When the value of @ComparisonBitrate value is identified as 7 Mbps, the available bandwidth of the current network is exceeded compared to HD, and the attribute of @ComparisonContentAttribute is supportable by the terminal (receiver), an MPD may be requested and a better service may be received and provided to the user. The attribute indicates "beyond HD" based on @ComparisonBitrate (7 Mbps—HD), and means that a service that is enriched compared to the broadcast service instance may be provided.

Here, the bit rates of 1M BPS and 7M BPS may be example values. These values may be bit rates applied between services with different resolutions, such as UD and UHD.

According to embodiments, a use case is expanded as follows.

Instance 1. HD broadcast

Instance 2. UHD DASH with representations from SD to UHD, 1.5 Mbps to 33 Mbps (with an HD Representation at 7 Mbps). MinimumBitRate 1.5 Mbps; ComparisonBitRate 7 Mbps.

That is, Instance 1 indicates HD broadcast, and Instance 2 indicates UHD DASH. Instance 2 may be represented from SD to UHD and may have a bandwidth from 1.5 Mbp to 33 Mbps. In this case, the HD representation is 7 Mbps, the minimum bit rate is 1.5 Mbps, and the comparison bit rate is 7 Mbps.

A player capable of supporting UHD according to the embodiments may select Instance 2 when the bit rate is 7 Mbps.

A player capable of supporting HD without HEVC support according to embodiments selects Instance 1.

A player capable of supporting UHD and having a Wi-Fi link of 5.5 Mpbs speed according to embodiments selects Instance 1.

A player capable of supporting UHD and having a 3G mobile connection of 1 Mbps, at which a broadcast report cannot be received, according to embodiments may not have a connection fast enough to play a service, but may attempt to play the service.

A player capable of supporting UHD and having a 4G mobile connection of 2 Mbps, at which broadcast cannot be received, according to embodiments may select Instance 2.

Figure 18:
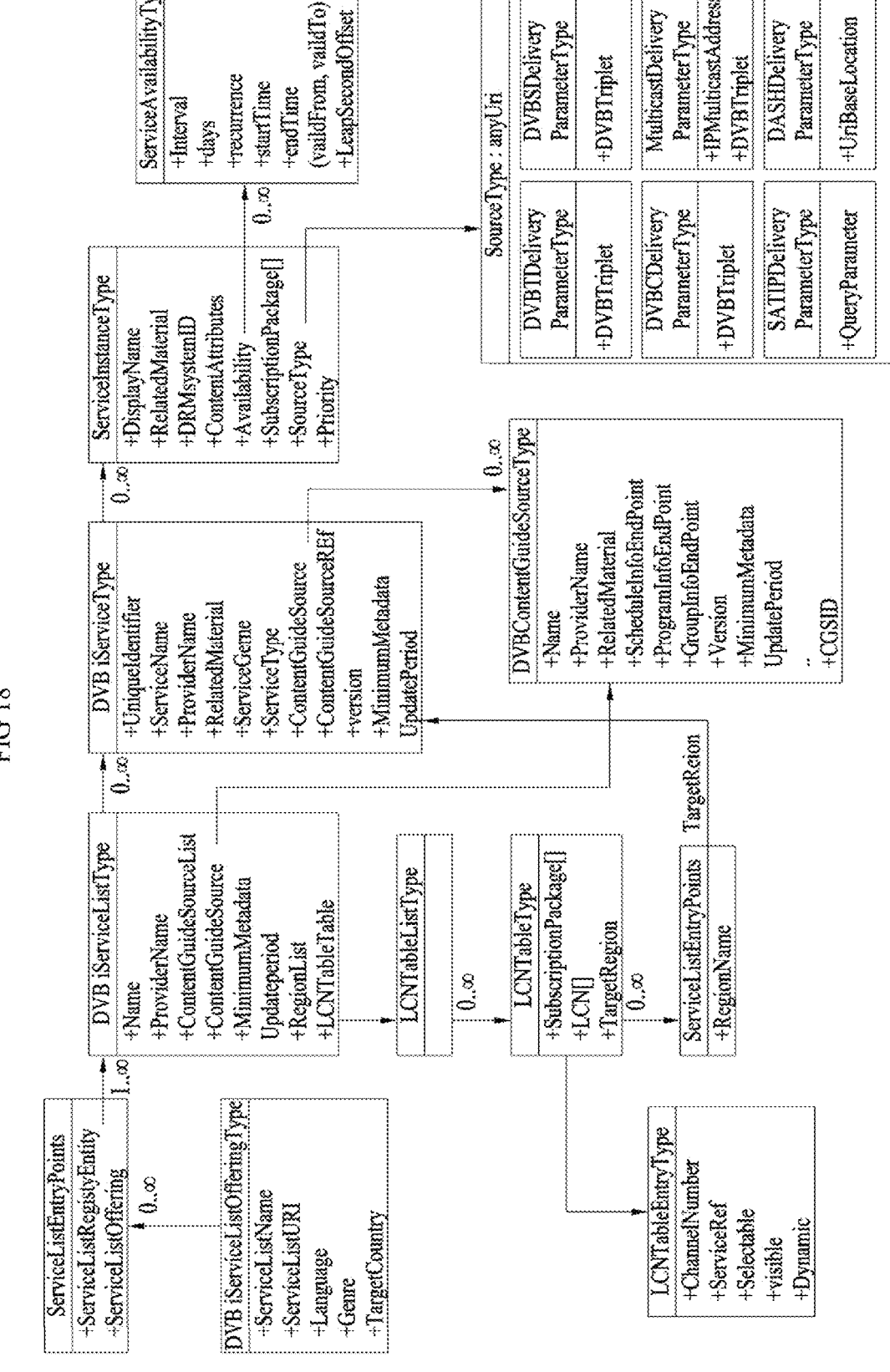
FIG. 18 shows a DVB-I service list hierarchy according to embodiments.

FIG. 18 shows a DVB-I service list hierarchy according to embodiments.

FIG. 19 shows a DVB-I service list according to embodiments.

A transmission device according to embodiments generates a service list and transmits the generated service list to a reception device, and the reception device provides a DVB-I media service to a user based on the service list.

The transmission device generates service information according to embodiments, and the reception device acquires service-related information (e.g., service list information, content guide information, etc.) based on the service information.

In a DVB-I service list hierarchy according to embodiments, each service may include service instances through unique information of service_ID. That is, the Parents element of service_ID may define multiple service instances classified according to the delivery network. In the case of simulcast, when the Internet and the existing DVB network are connected at the same time, the transmission device may define and transmit DVB-T and DASH instances. For a service including each service instance, the transmission device generates a DVB-I service content guide to be provided to the user. The reception device may receive a program guide currently in progress by defining specific information of Program(Event) corresponding to a specific schedule(timeslot). reception of the DVB-I service is basically in HTTP 1.1-based pull-only mode, and each client may download the currently consumed content guide information according to the client's own polling algorithm and show the same through a proper UX/UI.

FIG. 19 shows a ContentGuideSourceList according to embodiments.

The reception device according to the embodiments may download the DVB-I service content guide using a method disclosed below.

When the reception device according to the embodiments makes a request for the content guide to the content guide server (transmission device), it requests and receives data with the following API endpoint. "ContentGuideSource" is given the following API_endpoint_URL and updates necessary information on the corresponding address. The basic structure is configured as follows, and the request method is divided into a timestamp filtered schedule request and a now/next filtered schedule request according to a time span.

[1] Timestamp Filtered Schedule Request

By defining a specific time span of the ScheduleEndpoint, query information is defined as follows.

<ScheduleInfoEndpoint>?start=<start_unixtime>&end=
<end_unixtime>
&sid=<service_id>&image_variant=<variant>

Example

<ScheduleInfoEndpoint>?start=1433246400&end=
1433268000&sid=12345

Here, service_id indicates a single decimal service ID determined by the reception device (client device).

Only a single presence of the service ID parameter may be passed.

Variant may optionally specify an image variant.

[2] Now/Next Filtered Schedule Request

The now/next filtered schedule endpoint represents query information.

Example:
<ScheduleInfoEndpoint>?sid=12345&now_next=true

Figure 20:
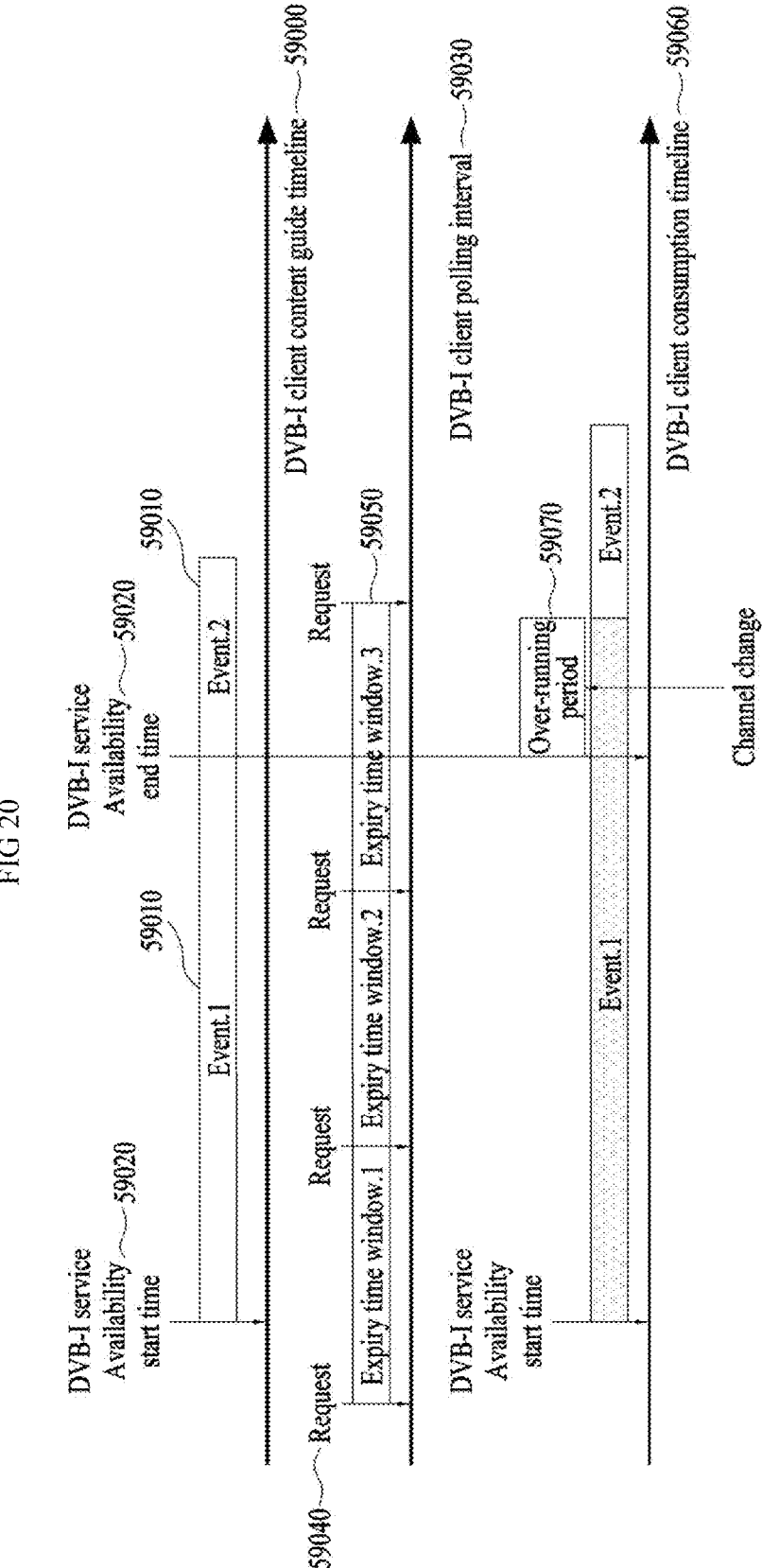
FIG. 20 illustrates a DVB-I client overrunning issue according to embodiments.

FIG. 20 illustrates a DVB-I client overrunning issue according to embodiments.

The figure shows up-to-date state issues according to over-running that may occur while the reception device according to the embodiments reproduces DVB-I related data.

The over-running issue may occur between the broadcast signal reception device (client) and the broadcast signal transmission device (server unit, broadcaster, etc.) according to the embodiments for the following reasons.

The broadcast signal reception device (DVB-I client) according to the embodiments updates the content guide data with the up-to-date information by polling according to the client's own standards and shows the updated data to the user. Live broadcasting on the DVB network provides content guide data in a push form over the broadcast network. On the other hand, DVB-I updates the up-to-date information through a fixed periodic refresh in the pull-only mode.

The broadcast signal reception device (DVB-I client) according to the embodiments may play a program (event) by DVB-I service availability according to the service discovery information according to a DVB-I client content guide timeline 59000. A program (or event) 59010 according to the embodiments has a start time 59020 and an end time 59020.

An event according to embodiments may represent aperiodic sparse media-time related auxiliary information for the client or reception device according to the DASH definition.

The broadcast signal reception device (DVB-I client) according to the embodiments may send a request 59040 for content guide data to the transmission device in every expiry time window 59050 based on a DVB-I client polling interval 59050.

Figures 59, 60:
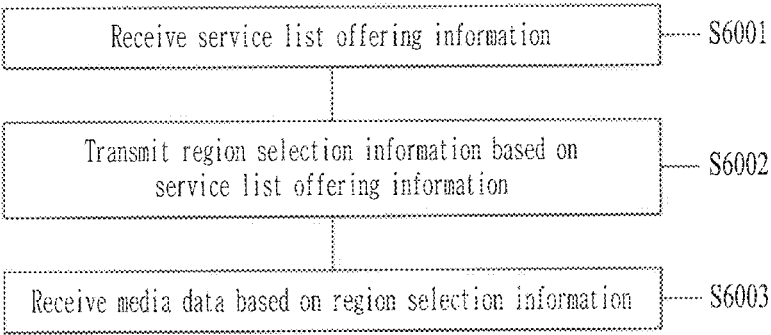
FIG. 59 illustrates a DVB-I service list entry point schema according to embodiments.
FIG. 60 illustrates a media data processing method according to embodiments.

An issue of the content guide based on DVB-I is that a DVB-I service that is different from the information in the guide of the existing program may be displayed due to a delay in a specific program (or event) 59010, for example, sports broadcasting or the insertion of specific live breaking news. FIG. 59 is a diagram illustrating DVB-I content guide information according to a polling interval and a progression of a live program actually being consumed.

The client may be tuned in or switch channels during an over-running period 59070 of a live program. The DVB-I content guide has an issue indicating data about Event 2 according to the scheduled end time (the reception device is playing Event 1 in reality).

In other words, the client updates the content guide through the periodic request 59040. However, when over-running occurs in the end-time span, the current play-out screen may not match the UI information of the channel banner.

In addition, the expiry time related cache-control and the max-age header in predefined HTTP do not take into account a time span for over-running.

Accordingly, embodiments propose methods for updating the up-to-date information by a DVB-I receiver based on a pull-only mode.

Figure 21:
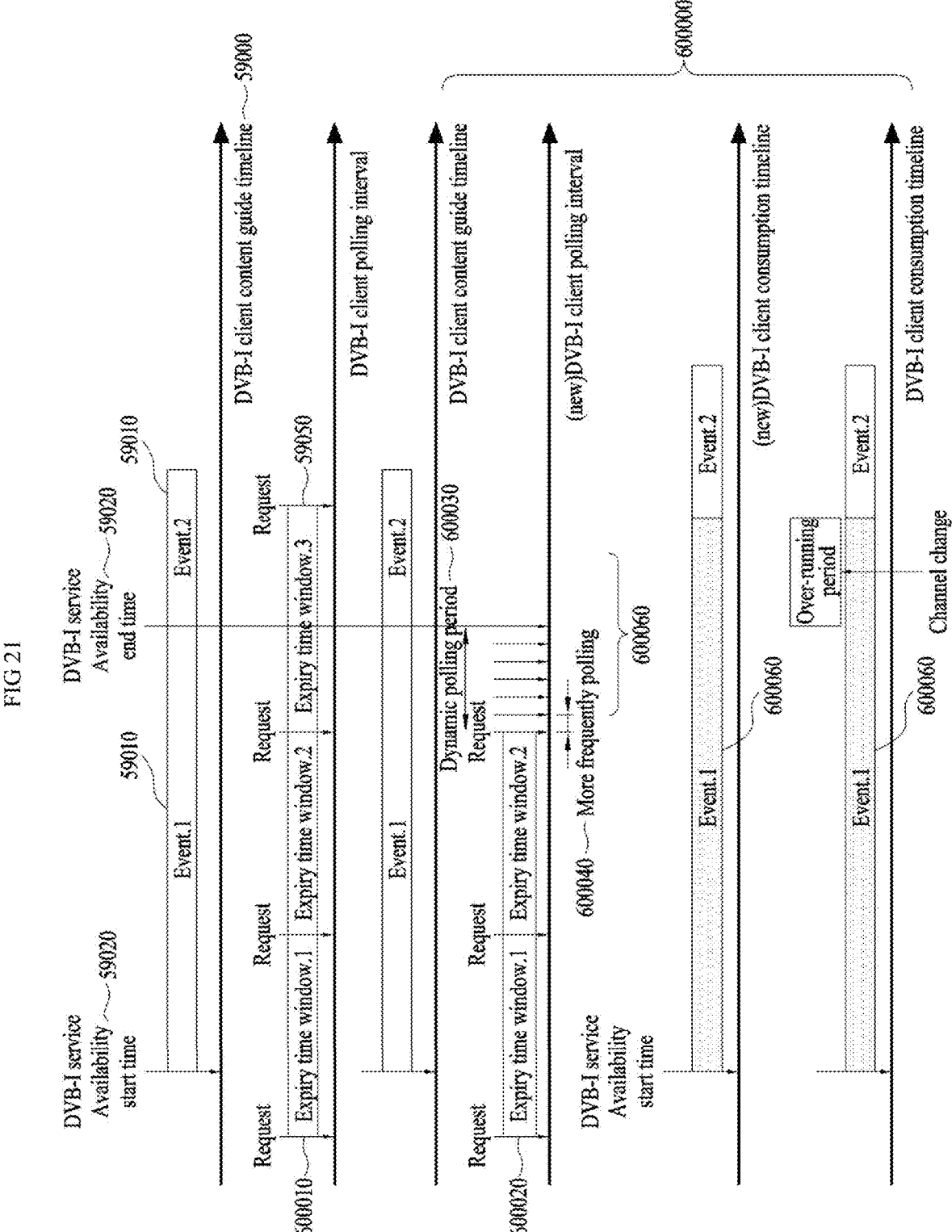
FIG. 21 illustrates a dynamic polling algorithm according to embodiments.

FIG. 21 illustrates a dynamic polling algorithm according to embodiments.

FIG. 21 illustrates a method for a transmitting/reception device according to embodiments to address the issue in FIG. 20.

The broadcast signal reception device (DVB-I client) according to the embodiments may maintain an up-to-date state based on an operation 600000.

As shown in FIG. 60, a method of preventing incorrect information (guide information related to an event/program, etc.) from being shown in the over-running period is proposed. The broadcast signal reception device according to the embodiments may receive a DVB-I service, and may check service availability currently in progress through <Availability> in a service instance (FIGS. 42, 45, 50, 51, 57, etc.), as shown in FIG. 60. Accordingly, the service progress may be checked according to the service window defined in the service availability.

When a specific live service is over-run, the polling period in a specific interval may be adaptively changed through the <pollingInterval> in the existing polling method that the client is running.

Even when the reception device autonomously performs polling as shown in part 600010, it may not appropriately respond to over-running occurring at the event end time.

Accordingly, as shown in part 600020, the reception device may perform polling in a predetermined manner according to the service window, and then may dynamically perform polling from the vicinity of the end time of the event/program for a specific dynamic polling period 600030 in every polling period 600040.

In accordance with the content guide timeline according to the embodiments, when Event 1 is over-run and thus an over-running period 600060 occurs, the reception device may provide the user with a content guide for Event 1 reflecting over-running along with Event 1 based on an entire dynamic polling period 600030 and a polling period 600040.

The entire dynamic polling period 600030 and the polling period 600040 may be set for a certain period 600060 from a time before the expiry time of Event 1 to a time after the start point of Event 2.

The dynamic polling interval may prevent content guide misinformation that occur in over-running and provide up-to-date information. FIG. 60 illustrates an operation of adaptively switching a polling period of a specific interval to apply a dynamic polling interval to address the issue of over-running. The following information is required as an algorithm for addressing the over-running issue.

Reference timing information for applying dynamic polling interval: This may indicate the entire interval in which dynamic polling is applied.

For example, the reference timing information may represent a point indicated by an offset by x sec from the DVB-I service Availability end time.

Polling interval to be newly applied: This indicates an interval at which polling is to be performed for dynamic polling in the entire interval.

Version information for comparison with existing information: This may be version information indicating dynamic polling compared to a client polling interval.

Specifically, (1) the reference timing information for applying the dynamic polling interval indicates a period in which the dynamic polling is applied. (2) The offset by x sec from the reference timing information (e.g., DVB-I service Availability end time) is a value for (1) and may be an offset or a Boolean type. (3) The polling interval to be newly applied may be @minimumMetadataUpdatePeriod according to embodiments.

For example, when the total period is 10 minutes, and polling is dynamically performed every 1 minute within 10 minutes, the information of (1) is 10 minutes, and the information of (2) is the start point of 10 minutes (AST or AET+offset or @dynamic), and the interval of (3) may be 1 minute. In addition, it may be seen that this is information for dynamic polling through the version information for comparison with the existing information.

FIG. 22 illustrates a DVB-I service scheme according to embodiments.

FIG. 22 illustrates a scheme for the operation of FIG. 21;

The figure shows the syntax for polling according to embodiments. The figure illustrates the DVB-I service scheme. The transmission device may generate service list information and transmit the same to the reception device, and the reception device may provide content to the user based on the service list information.

The transmission device generates service information, and the reception device uses the service information to acquire service-related information (e.g., service list information, content guide information, etc.).

The reception device may update the metadata for the content for a certain period and duration based on the MinimumMetadataUpdatePeriod and duration.

The reception device may update the metadata for the content for a certain period based on the MinimumMetadataUpdatePeriod and the MinimumMetadataUpdatePeriodType.

The reception device may recognize that polling should be performed dynamically from the transmission device, based on the Boolean type, such as <attribute name="dynamic" type="boolean" default="false"/> or <attribute name="MinimumMetadataUpdatePeriod" type="duration" use="optional"/>. For example, when the Boolean is False, dynamic polling may be disabled. When the Boolean is True, dynamic polling may be enabled. The reception device may make a request for dynamic polling to the transmission device based on the MinimumMetadataUpdatePeriod and duration, and receive the queried information from the transmission device.

The reception device may update metadata based on MinimumMetadataUpdatePeriod and MinimumMetadataUpdatePeriodType according to the content guide source type.

The transmission device may independently deliver the polling related information together with the version information to the reception device, may deliver the polling related information together with the content guide source type, or may deliver the polling related information together with the LCN table entry type.

The reception device may acquire a polling interval and duration, a dynamic interval period offset, and an integer value according to MinimumMetadataUpdatePeriodType, transmit a query for dynamic polling to the transmission device, and receive response information for the query.

The transmission device may generate MinimumMetadataUpdatePeriod at various locations in the service list and deliver the same to the reception device. The service discovery operation of the reception device may vary according to the location of MinimumMetadataUpdatePeriod. For example, MinimumMetadataUpdatePeriod may be included in a service list, a service, or a content guide. In this way, various locations and hierarchies may be provided.

The DVB-I client may address the above-mentioned issue through "PollingIntervalType," and the type may be defined in the service type level and ContentGuideSourceType. In this solution, the up-to-date information may be checked and queried in a procedure disclosed below.

Figure 23:
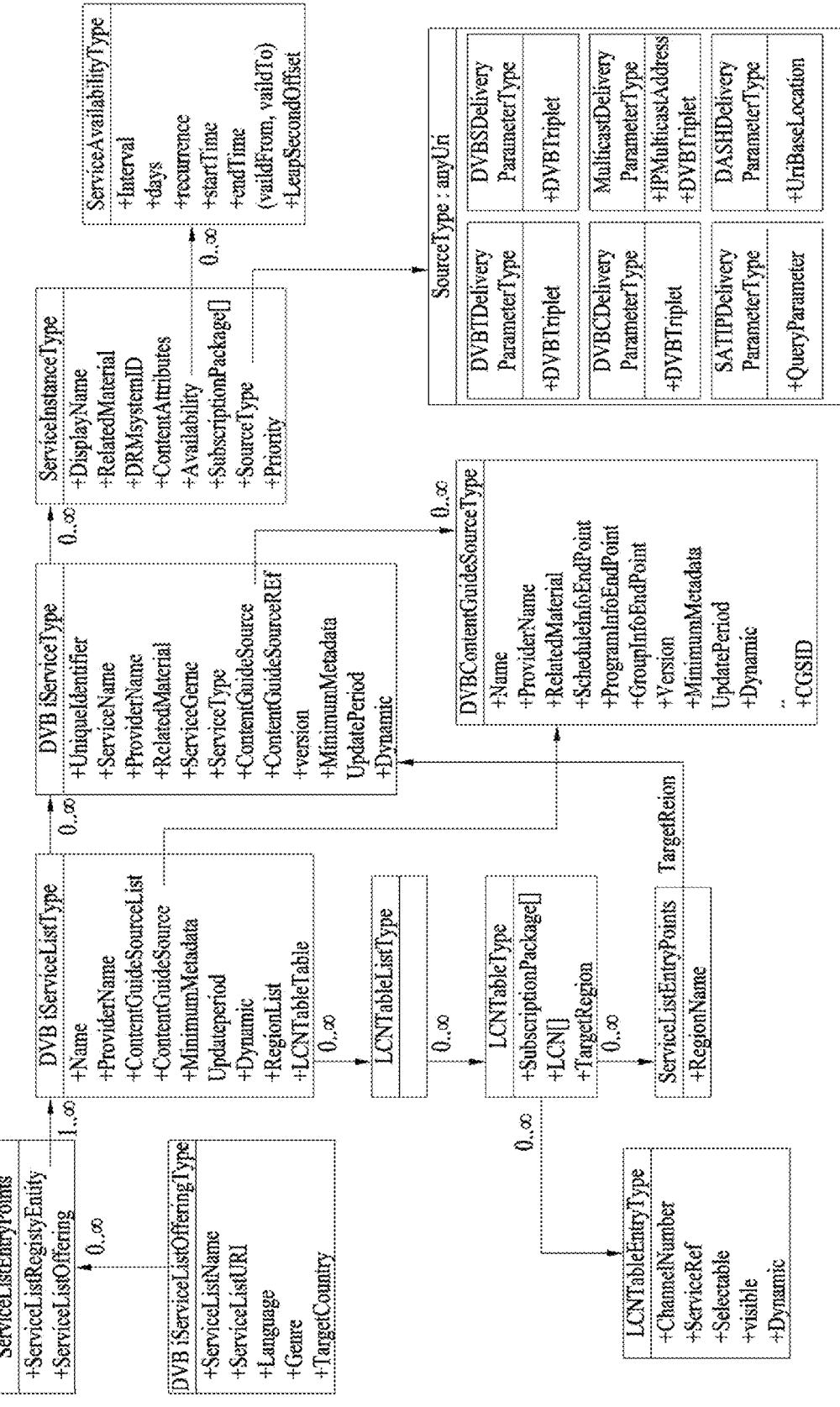
FIG. 23 shows a DVB-I service hierarchy according to embodiments.

FIG. 23 shows a DVB-I service hierarchy according to embodiments.

A service list according to embodiments may have a hierarchy. The transmission device according to the embodiments generates a service list having the hierarchy and transmits the generated service list to the reception device, and the reception device provides a media service to a user based on the service list.

The transmission device generates service information, and the reception device acquires service-related information (e.g., service list information, content guide information, etc.) based on the service information.

The reception device checks the state of the service from the availability start time and end time of the currently ongoing service (or program, event) based on the availability value of the service instance level.

The reception device (client) may update new content guide data through a dynamic request and response according to the value of @PollingInterval rather than through the existing static content guide polling 59040 (see FIG. 60), starting at a point corresponding to a value obtained by subtracting @DynamicIntervalPeriodoffset (the starting point of dynamic polling) (see 600030, 600040, 600060, etc.) from the available end time.

An example of dynamic polling is disclosed below.

@availability End Time="2020-02-19T10:42:02.684Z"

(This indicates the end time of data that is current played by the reception device.)

@DynamicIntervalPeriodoffset="5000"

(This indicates that the reception device may perform dynamic polling from a time preceding the end time of the current data by 5000 time units (where the time unit may be hour, minute, second, or the like according to embodiments).)

@PollingInterval="1000"

(This indicates that the reception device dynamically polls the content guide information for the transmission device (server, processor, etc.) every 1000 time units.)

@version=10→11

(When the version of static polling of the reception device is 10, the version of dynamic polling may be expressed as 11. The version may have various values according to embodiments.)

When a value of the PollingIntervalType is included (that is, the PollingIntervalType indicates dynamic), At intervals of "1000" from a point corresponding to "2020-02-19T10:42:02.684Z"-"5000", the client may perform access through a query of @ScheduleInfoEndpoint (<ScheduleInfoEndpoint>?sid=12345&now_next=true) and update a new content guide.

FIG. 24 shows a method of updating the up-to-date information of content guide and the DVB-I service scheme according to embodiments.

The figure shows a DVB-I service list discovery schema according to embodiments.

The reception device according to the embodiments may update the up-to-date information of the content guide, using the schema.

The DVB-I service list discovery schema includes @ServiceListURI for acquiring service list provider information and a service list according to ServiceListEntryPoints.

The reception device (DVB-I client) initializes the DVB-I service to acquire a service list, performs an HTTP request/response reception process through the service list address information (@ServiceListURI), and stores the received service list. Initialization of the DVB-I service and update of the service list and content guide may be performed through the corresponding execution process.

The DVB-I service list scheme hierarchy supports, through @MinimumMetadataUpdatePeriod, the operation of receiving service list metadata. Based on a DVB-I model according to embodiments, multiple DVB-I service lists and an individual service list may include multiple services or a service. Each single service may be allocated to a service instance according to the delivery source.

The content guide may be content guide information about the entire service list including the individual services, and may be defined the ContentGuideSourceList. ContentGuideSource may be defined for each single service.

Cache-Control related to the expiration time in existing HTTP: The max-age header indicates the expiration period of the low layer of the HTTP level. It does not reflect the actual content on the DVB-I client or the update on the UI. Accordingly, @MinimumMetadataUpdatePeriod, which is an algorithm for indicating up-to-date information or issues such as over-running at the DVB-I client code level, is required for the DVB-I standard.

The operation of the content guide in the receiver corresponding to update of the service list may vary depending on the position of @MinimumMetadataUpdatePeriod in the service list scheme hierarchy.

FIG. 25 shows a model of a DVB-I client according to embodiments.

The figure shows a structure of a reception device (client) and a structure between the reception device and a device associated therewith according to embodiments.

A reception device 690000 acquires service-related information (e.g., service list information, content guide information, etc.) based on the service information.

The reception device 690000 is the reception device (client) according to the embodiments described herein. The reception device includes components described below. Each component corresponds to hardware, software, a processor, and/or a combination thereof.

A DVB-I service selection UI controller 690010 controls a service selection related UI of the reception device 690000. For service selection related UI information, the controller may exchange necessary data with a service list manager 690020 and a content guide UI controller 690040. The service selection UI controller 690010 may receive source data for the service selection UI from a source selection UI controller 690070.

The service list manager 690020 controls service list information. The service list manager 690020 may receive service selection UI information for a service list from a hybrid service selection UI controller 690080, and may exchange service list related data. The service list manager 690020 may exchange service list data and/or service information with a service player 690030. The service list manager 690020 may exchange service list information and/or content guide information with a content guide manager 690050.

The DVB-I service player 690030 controls service play. The service player 690030 may provide a service to a DVB-DASH player 690090, a secondary OTT player 690100, a linked application engine 690110, and the like. The linked application engine 690110 may be an application that provides a service under control of the linked application manager 690060.

The DVB-I content guide UI controller 690040 controls a content guide related UI. The service selection UI controller 690010 and the content guide manager 690050 may exchange service selection UI related data, content guide UI related data, content guide control related data, and the like.

The content guide manager 690050 controls the content guide processing of the reception device. The service list manager 690020 and a hybrid content guide UI controller 690120 may exchange service list related information, content guide control information, and hybrid content guide UI related information. Here, the term hybrid means a unit that supports integration between the DVB-I network broadcast service and the existing broadcast services such as terrestrial, satellite, cable, and IPTV.

The linked application manager 690060 controls service play of an application of an additional device that may be associated with the reception device.

A DVB-C/S/T/IPTV content guide controller 690130 provides the hybrid content guide UI controller 690120 with content guide information about services of the DVB cable network, satellite network, terrestrial network, and IP network for the reception device.

A DVB-C/S/T/IPTV service list manager 690140 controls service list information for services of a cable network, a satellite network, a terrestrial network, and an IP network. It may exchange the cable network, satellite network, terrestrial network, and IP network service list-related information for hybrid and the DVB-I service with the hybrid service selection UI controller 690080.

A DVB-C/S/T/IPTV tuner 690150 receives broadcast services such as terrestrial, satellite, cable, and IPTV services. The tuner 690150 may exchange information for a service list with the service list manager 690140.

The reception device 690000 may provide a service list for the DVB-I service, content guide information, and the like to the user based on embodiments. Optionally, while providing DVB-I service and service guide information, the reception device 690000 may provide users with IP network, cable network, satellite network, terrestrial network, IP network services and service guide information, in connection with a tuner to receive services of the cable network, satellite network, terrestrial network.

Examples of the DVB-I client 690000 maintaining the up-to-date state will be described. The operation of the reception device may be varied among the options according to the embodiments.

Option 1: The meaning and reception of service list level signaling are described below.

@MinimumMetadataUpdatePeriod in the service list is a polling period for updating information about the entire DVB-I service list including services.

The DVB-I client service list manager 690020 included in the reception device 690000 may manage the entire service list and update of the service list.

Regarding HTTP cache-control of the reception device 690000, the max-age value is static, and an expiration period is calculated.

When the value of @MinimumMetadataUpdatePeriod is defined, the service list may be updated. A query may be sent to the service list address (@ServiceListURI) defined in <DVB-I Service List discovery scheme>.

Regardless of the max-age value of the HTTP cache-control for @ServiceListURI, the query period of the service list may be dynamically changed by the value of @MinimumMetadataUpdatePeriod.

The changed service list information may be delivered through a content guide manager 670050, and the update period of the content guide may be dynamically set.

Options 2, 3, and 4: The meaning and reception operation of service level signaling are described below.

@MinimumMetadataUpdatePeriod in the service is a polling period for updating the service information about the DVB-I single service and ContentGuideSource.

The DVB-I client service list manager 690020 of FIG. 69 included in the reception device 690000 may manage individual service information and update of individual services. The HTTP cache-control sets the max-age to static and calculates the expiration period. When the value of @MinimumMetadataUpdatePeriod is defined, the service list update is updated.

The HTTP cache-control for @ServiceListURI defined in <DVB-I Service List discovery scheme> may dynamically set and change the query period of the service list by the value of @MinimumMetadataUpdatePeriod regardless of the max-age value.

In addition, in order to acquire the up-to-date information according to the defined @MinimumMetadataUpdatePeriod, the content guide manager 690050 performs polling dynamically in a specific interval using the @ContentGuideSource HTTP endpoint of the content guide corresponding to each service.

Options 5 and 6: The meaning and reception operation of signaling in the ContentGuideSource level are described below.

@MinimumMetadataUpdatePeriod that defines Content-GuideSource in the service is a polling period for updating ContentGuideSource of a DVB-I single service.

The DVB-I content guide manager 690050 dynamically performs polling in a specific interval using the HTTP endpoint in @ContentGuideSource of the content guide corresponding to each service according to the defined value of @MinimumMetadataUpdatePeriod.

Examples of operations according to the embodiments are described below.

@availability End Time)="12345"

The end time of the current service data may be 12345. When there is no over-running issue, the reception device may receive and reproduce the next service data after the reference time 12345 or according to a predetermined schedule.

@MinimumMetadataUpdatePeriod=1000

The reception device may perform an update operation for receiving metadata including content, a list of services, and guide information at intervals of 1000, which is a set update period.

@version=1→2

The version may indicate an update or polling operation. When the version changes from 1 to 2, it may indicate that the version is changed from static polling to dynamic polling.

@UniqueIdentifier=korea123

The reception device may receive a service and/or service information indicated by the unique identifier, korea123.

As such, when the value of @MinimumMetadataUpdatePeriod is defined, the reception device (client) sends a now/next filtered schedule request of the TV anytime of @ScheduleInfoEndpoint at intervals of "1000" According to the definition of the now/next filtered schedule request (e.g., <ScheduleInfoEndpoint>?korea123=12345&now_next=true), a query may be sent to the transmission device. Thereby, the server, processor, memory, and the like on the transmitting side may be accessed, and the new service and content guide required by the user at the corresponding time may be updated.

<attribute name="dynamic" type="boolean" default="false"/>

The transmission device may generate LCNTableList in each service list and logical channels in LCNTable according to the DVB-I service list hierarchy. The transmission device may provide an LCN channel for each service by connecting @serviceRef included in each LCNTableEntryType to @UniqueIdentifier of each service. The LCN channels connected to each service may define selectable/visible attributes according to channel properties.

The content guide manager 690050 and the service list manager 690010 store the LCN channel of the client (DVB-I client) in the channel database (DataBase) through a series of parsing and caching processes. In addition, channel information is directly provided to the user through the UI.

When the LCN list stored in the channel DB is not updated with the up-to-date information, the UI aligned with the content information being reproduced may not be displayed.

The DVB-I content guide UI controller (content guide UI) 690040 may indicate that the corresponding channel (e.g., a channel for DVB-I) in the channel DB supports dynamic polling in order to present accurate information. For example, the indication may be provided based on a bool attribute of @dynamic.

Through this information, the DVB-I LCN DB may pre-notify that a change may occur in a specific interval on a channel on which dynamic polling may be performed by the LCN corresponding to a specific service. Through this processing, the DVB-I client may create an interface that may update only a specific channel in the cached channel DB, and the updated channel information may be reflected in the UI through dynamic polling.

The channel DB, LCN DB, and the like according to the embodiments may correspond to the media processing device connected to the processor.

FIG. 26 illustrates a method of acquiring the latest content guide information for each DVB-I service according to embodiments.

According to the DVB-I service scheme, there are two methods of receiving ContentGuideSource: (1) constantly receiving all ContentGuideSources in a defined interval of all services at the service list level, e.g., one of the following times of a day (0:00, 3:00, 6:00, 9:00, 12:00, 15:00, 18:00, 21:00); or (2) receiving ContentGuideSource information at the service level.

As for the method of requesting information, information is received according to the following method.

Example URL

<ScheduleInfoEndpoint>?sid=12345&now_next=true

As in the scheme above, @ScheduleInfoEndpoint may be defined in ContentGuideSourceType in the same manner. That is, the endpoint that may be received at the service list level and the endpoint that may be received at the service level should be defined equally, which is a limit. Therefore, the reception interval should be defined equally in the service list and service levels. As described above, Content-GuideSouceList, ContentGuideSource, ContentGuideSourceType, and ScheduleInfoEndPoint are defined equally in the service list and service, and are thus limited to receive the same information.

Figure 27:
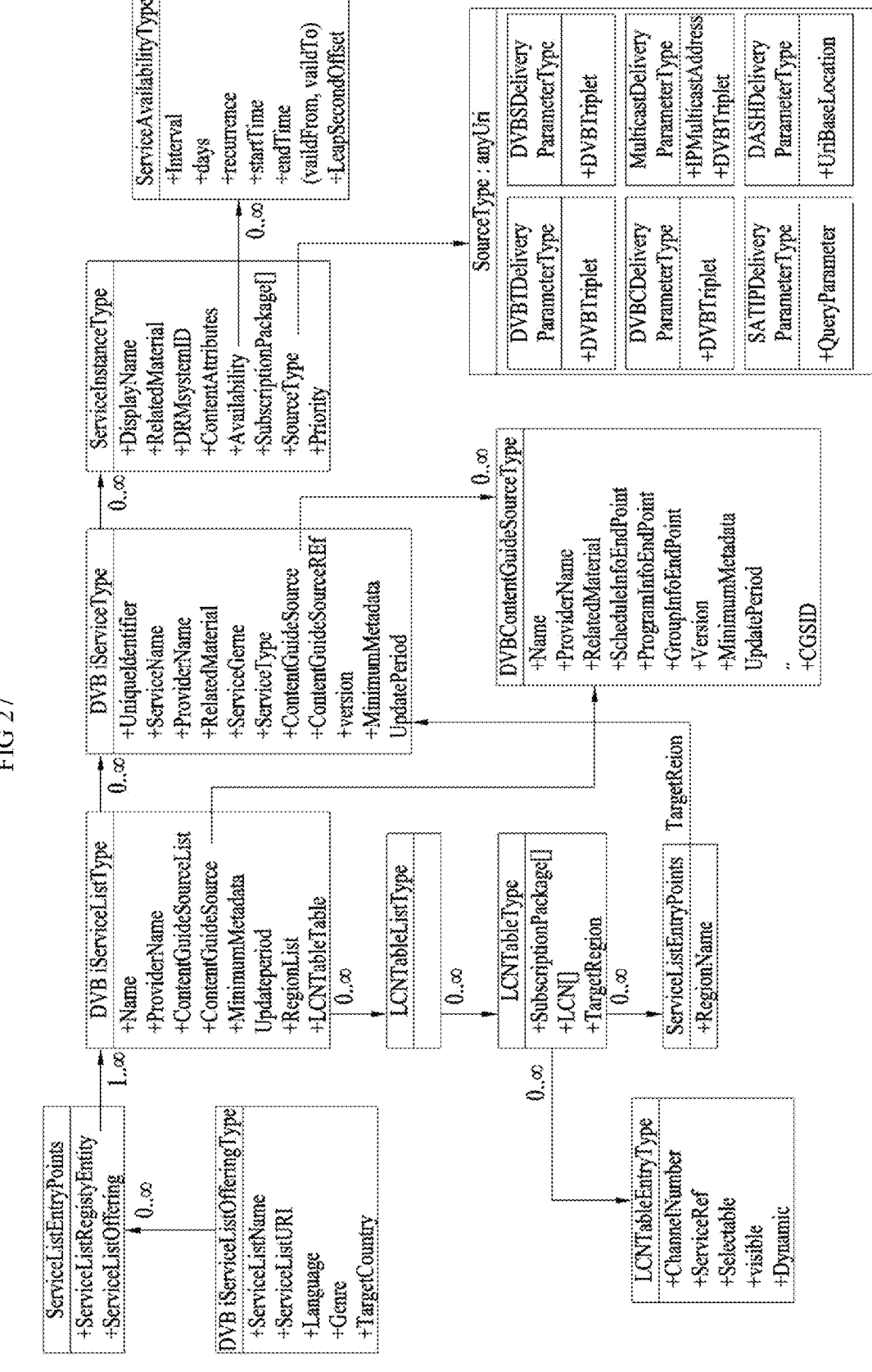
FIG. 27 shows a content guide source hierarchy according to embodiments.

FIG. 27 shows a content guide source hierarchy according to embodiments.

Figure 28:
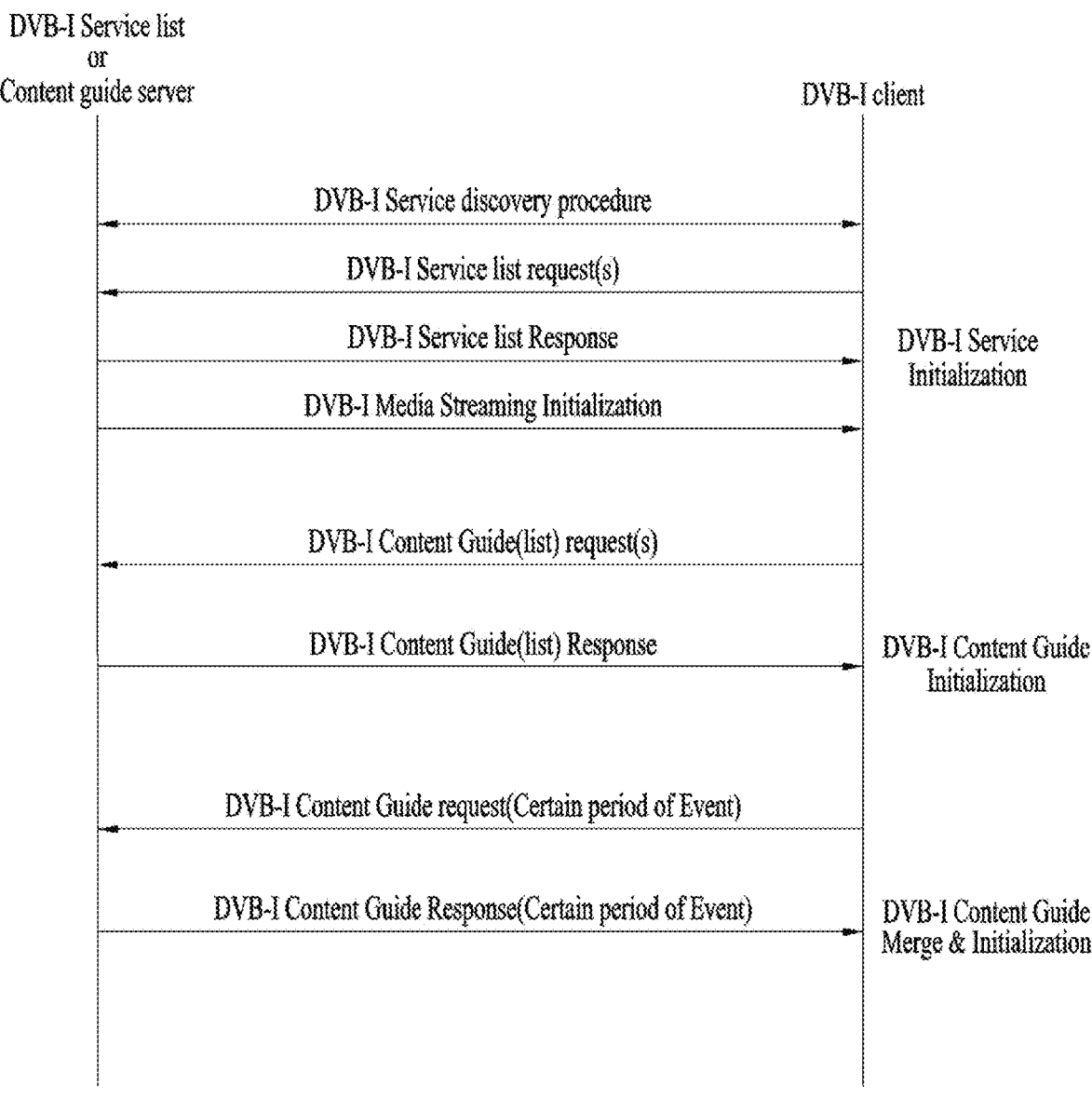
FIG. 28 is a flowchart illustrating DVB-I service initialization and content guide update according to embodiments.

FIG. 28 is a flowchart illustrating DVB-I service initialization and content guide update according to embodiments.

Receiving now/next through ScheduleInfoEndpoint+sid of FIG. 27 is the same for all services. The limit according to this feature is designed to make it impossible to request only update in a specific interval in updating a service. It is necessary to separate the endpoint for each service corresponding to each period, and add an endpoint for a specific individual period for each service.

FIG. 28 is a diagram illustrating the procedure of service initialization, content guide initialization and update between the DVB-I service server and the DVB-I client. As shown in the figure, the DVB-I service discovery, service list acquisition, DVB-I streaming initialization, and content guide initialization, performed in this order, may be applied through the current schema. However, at the current stage, updates of individual events and individual periods cannot be supported through the same content guide update, and therefore only the previously defined time window section should be applied equally to the service list level or service level, which is a limit. Therefore, a method for extending a DVB-I service scheme is proposed for the request and response operations.

FIGS. 29 and 30 illustrate a DVB-I service scheme according to embodiments.

Referring to the figures, which illustrate an example of a DVB-I service list response according to embodiments, ContentGuideSource elements may be received. The DVB-I client is an endpoint to request content guide metadata between individual periods for each service, and may receive IndividualPeriodEndpoint. The client may generate the following string through IndividualPeriodEndpoint and request metadata information for each interval.

[Embodiment 1] For example, it is assumed that the service with Service ID=10 acquires information of Mar. 26, 2020, 21:00:00 to Mar. 27, 2020, 00:00:00, and Service ID=11 acquires data of Mar. 26, 2020, 21:00:00 to Mar. 27, 2020, 03:00:00 (based on the unix time).

https://cgs.az.metadata/
IndividualPeriod?start=1585224000&end=
1585234800&sid=10
https://cgs.az.metadata/
IndividualPeriod?start=1585224000&end=
1585245600&sid=11

Information for each service may be generated, and data about each interval may be requested through the information.

[Embodiment 2] For example, it is assumed that the service with Service ID=10 acquires information of the current time to Mar. 27, 2020, 00:00:00, and Service ID=11 acquires data of the current time to Mar. 27, 2020, 03:00:00 (based on the unix time).

https://cgs.az.metadata/
IndividualPeriod?sid=10&now&end=1585234800
https://cgs.az.metadata/
IndividualPeriod?sid=11&now&end=1585245600

FIG. 31 shows a DVB-I model according to embodiments.

DVB-I Client Technical Improvements to Support Multiple Service Lists

In a DVB-I conceptual model shown in the figure, the respective interfaces represent a series of operations performed for the DVB-I client to perform service discovery and receive a media stream corresponding to each service. The description of each interface is given below. The reception device according to the embodiments may provide the above-described effect of the present disclosure by performing the DVB-I service list discovery and the registry entity access, and the transmission device according to the embodiments may allow the reception device to perform these operations by providing signaling of multiple service lists.

DVB-I Client: A DVB-I client, which corresponds to a media data processing device according to embodiments.

Service List Registry: May provide a list of service list servers to the client. The list provision may be performed based on query parameters.

Service List Server(s): A server that delivers service lists to the client. A separate service list server may aggregate service list fragments from multiple content and service providers.

Content Guide Server(s): may respond to requests from the clients for content guide data. Content guide servers for individual DVB-I services may be referenced in the service list entry for the service.

Content/Service Provider(s): may provide DVB-I services.

Playlist Server(s): may provide a playlist for services that reference a playlist of DVB-DASH content items rather than directly referencing a single DASH MPD.

MPD Server(s): may provide DASH MPDs.

Stream Server(s): may provide DASH media segments to the DVB-I client.

Multicast Server: A server for adaptive bitrate multicast.

Multicast Gateway: A gateway for adaptive bitrate multicast.

A1: Content Guide Query: A content guide query. This means a request from the DVB-I client to the content guide server.

A2: Content guide data

B1: A service list query. It is a request from the DVB-I client to the service list server. The DVB-I client may request a full list of services. The service list may be a locally filtered or pre-filtered list. Alternatively, the DVB-I client may make a request to the server for a tailored service list based on the region selection information (see FIGS. 49, 52, and 55 to 59).

B2: Aggregated service list. Alternatively, the client may receive from the server a tailored service list based on the region selection information (see FIGS. 49, 52, and 55 to 59).

C1: A request for a playlist. It may be an HTTP GET request.

C2: A playlist.

D1: A request for DASH MPD. It may be an HTTP GET request.

D2: DASH MPD: A DASH MPD according to the ETSI TS 103 285 standard.

E1: A request for media. It may be an HTTP GET request.

E2: Unicast DASH: According to ETSI TS 103 285 [1].

F1: A request for determining the entry point(s) of the service list server(s). This request may support a query for performing a selection within a service list discovery.

F2: A list of service list entry points that match a request criterion.

N1: Content guide data.

N2: URLs of the content guide server. URLs for content guide data about each of the services of the service providers and the content contained in the service list entry for the service of interface O M: Registration of service list entry points with service list servers.

O: Service records. It is data about DVB-I services provided by a single content/service provider.

P1: A playlist.

P2: URLs for playlists. URLs are for playlists included in the service list entry for the service for interface O.

Q1: DASH MPDs according to the ETSI TS 103 285 standard document.

Q2: URLs for DASH MPDs included in the playlist for the service of interface

P1 or the service list entry for the service of interface O.

R: URLs for media. This is URLs for media included in DASH MPDs.

X: may be a Pin' or Oin interface in the DVB A176 standard. It is information related to a flow of DASH media data to a multicast server.

Y1: Multicast. It may be interface M in the A176 standard. It may be information related to a flow of DASH media data on multicast.

Y2: Unicast repair. It may be information related to a flow of DASH media data on unicast for repairing data lost from interface Y1. It may be interface U in the DVB A176 standard document.

Z: Unicast DASH. It is interface related information from the DVB-I client to the multicast gateway according to ETSI TS 103 285 document. It may be interface L in DVB A176.

The DVB-I client, which is a media data processing device according to embodiments, may correspond to a DVB-I player, a TV device, a 2nd device, or the like.

In the DVB-I standard, interfaces F1 and F2 perform service discovery and receive service list entry points in response thereto. In addition, according to processes B1 and B2, a curated list may be received by reflecting the user's language, country, region, preference, and the like.

Thereby, service aggregation may be implemented. The DVB-I client may propose selection of service list servers and aggregate service lists from multiple service list servers.

DVB-I client may provide selection of service list servers and may aggregate service lists from multiple service list servers. In addition, the DVB-I client may make a first access after being installed, and perform processes F1 and F2 to show a list of lists of service list servers as follows:

1. The manufacturer of the device executing the DVB-I client may provide such devices.

2. National or regional regulators that provide information for the benefit of clients operating in the relevant countries and regions 3. Operators or platforms for clients 4. Central service list registry (CSR) that operates for the benefit of all devices running a DVB-I client that provides information about service lists.

5. A third-party service list aggregator.

There are methods to operate the service list registry as disclosed above. As in the fourth case, according to the function of DVB-I CSR, the DVB-I service list provider or service providers may register a service in the CSR and may display a list of registered lists according to the acquired information when DVB-I performs bootstrapping through F1. The user may select a service list based on the lists of the registered lists and directly handle the service list through filtering criteria such as user preference and country/language/region.

FIG. 32 shows a DVB-I service architecture for supporting a manufacturer service list according to embodiments.

When the manufacturer implements the DVB-I client, the service list provider may serve to register Mfr service lists, collect the services, manage the entire registry, and curate a service list. A diagram of a service discovery architecture supporting these operations is shown in FIG. 23. Each component of FIG. 23 may correspond to hardware, software, a processor, and/or a combination thereof.

Extension of Manufacturer Service List Repository Supporting Service Discovery Entity The manufacturer service list supporting DVB-I service architecture shown in FIG. 32 includes a DVB-I client, a service provider, a streaming server, a CSR, and a service list provider repository. The role and receiver operation of each module are disclosed below.

DVB-I client: consists of a system client and a DASH engine, wherein the system client aggregates and curates several service lists through the service bootstrapping, service list discovery, and service manager. In addition, it manages a channel DB assigned in each service list, and performs content guide and app launching. The DASH engine receives HTTP and DASH delivery and performs decoding and rendering.

Service provider: Entities capable of providing content, including OTT companies such as Disney, Fox, Netflix, Hulu, and Amazon Prime, MNO or IPTV operators, and personal channel operators, provide content to list providers.

Service list provider repository: List providers curate lists and register the same in the DVB CSR.

CSR: The first bootstrap location of the DVB-I client, where the list of lists is managed.

Each interface has a function as described below.

[Interface 0]: List providers curate lists and register the same in the DVB CSR.

[Interface 1]: Mfr also operates a repository to manage a list, and registers the list in the DVB CSR.

[Interface 2]: After a DVB-I service is launched and a DVB-I service discovery query is sent, the interface shows list entries filtered according to user language, country, region, and postcode through a series of bootstrap processes. It receives service entities adapted to the user selection or environment and ServiceListURI for accessing the service entity repository.

[Interface 3-a]: Receives DVB-I service lists through ServiceListURI for accessing the service list repository.

[Interface 3-b]: Receives a service list of Mfr through ServiceListURI for accessing the service list repository.

[Interface 4-a]: Receives content by requesting a receivable instance of each service in the DVB-I service list

[Interface 4-b]: Receives content by requesting a receivable instance of each service in the DVB-I service list Embodiment 1) https://csr.dvbservices.com/query?TargetCountry=ITA&regulatorListFlag=true When a DVB-I service discovery query is sent to the CSR, the CSR provides DVB-I service discover data and ServiceListURI as follows. The DVB-I client accesses https://dvbi.TVfromTheWorld.com/engTVservices.xml to receive a service list.

<ServiceListURI contentType="application/xml">
<dvbisd:URI>https://dvbi.italian-authority.it/trusted-services.xml</dvbisd:URI>
</ServiceListURI>

Embodiment 2) https://dvbisr.private-service-list-registry.com/query?ServiceListName=LGchannels When a DVB-I service discovery query is sent to the CSR, the CSR provides DVB-I service discover data and ServiceListURI as follows. The DVB-I client makes an access through https://www.LgChannels/dvbmfr/UK/servicelist.xml to receive a service list.

<ServiceListURI contentType="application/xml">
<dvbisd:URI>https://www.LgChannels/dvbmfr/UK/servicelist.xml</dvbisd:U RI>
</ServiceListURI>

In this case, the DVB-I service discovery information may be composed of information disclosed below, and each service list entity may be defined.

FIG. 33 shows DVB-I service discovery information according to embodiments.

The DVB-I service list discovery scheme may define provider offering information that provides service list registry and a service list as described above. As shown in FIG. 18, in providing a service as a separate mfr-only service provider entity, the offering information of mfr in service discovery and information for querying whether the service list provided by mfr is receivable should be extended. It is necessary to extend the capabilities information for checking whether the Mfr service list can be supported. The syntax shown in FIG. 35 may be extended using the extension in the current DVB-I service list discovery scheme.

FIG. 34 shows the syntax of a service list registry entity according to embodiments.

OSName: Supportable OS version and name

ServiceCode: Supportable service code within the device

TargetLocation: A target location where the device is made, e.g., UK, Nordic

Sourcelocation: A location of a streaming server that provides each service

PublishedDate: Service list publish data

ReleasedDate: Service list release data

Manufacturer: A service list implementation company

ManufacturerURL: URL of the service list implementation company

ServiceDescription: A brief description of the service list. Example: List indicating text ServiceReport: A service list issue or consumption report FirmwareUpgrade Version: Firmware version number that the platform should support UpdateLocationURL: URL accessible for firmware update ServiceAvailability Version: The current version in which the service list is provided.

ServiceAvailabilitySearchURL: URL for moving to a web page where service search is available such that additional services provided by the service list provider may be added ServiceAvailabilityDBUpdateURL: Link URL for service data base update. Schema to support XML update based on IETF RFC 5261 is downloaded, and fetching may be performed through the corresponding information.

FIG. 35 shows semantics of a service list registry entity according to embodiments.

FIG. 36 illustrates a service list selection UI/UX according to embodiments.

According to the semantics and syntax according to the embodiments, the media data processing device according to the embodiments may display service list related information as shown in FIG. 36.

Regarding the service list, a service list may be selected based on a provider, language, genre, country, and the like.

A service discovery entity supporting a manufacturer service list repository may be added, and a specific manufacturer service list may be filtered through a provider. As in the embodiment, the UK supported LG channels service may be consumed.

FIG. 37 illustrates a method for coping with channel conflict in receiving a multiple service list according to embodiments.

Channel Conflict Issue when Multiple Service Lists are Received

DVB-I receives service list-based services, and each service list is operated and managed by a specific repository. The repository providing the existing DVB broadcasting list may define the DVB-I service list using the LCN allocation method based on the country or specific region due to the characteristics of the current European broadcasting service. On the other hand, specific DVB-I service list providers collect independent services regardless of region and define the LCN list, and accordingly LCN allocation may be set as desired by the service list provider. Therefore, in this background, there is a potential issue of channel conflict when the DVB-I client receives and aggregates multiple service lists.

Use case 1 distinguishes a service list and each Service ID, an LCN to be assigned to the service list, an LCN used on the legacy TV, and actual content, and means that the services and channels assigned to each service list are allocated. In Use case 1, when different lists List A and List B are received, the Sid/LCN are all allocated identically and the contents are the same. Accordingly, when the four service lists are aggregated, the service may be provided without an issue.

Case 2 is the case of multiple service providers+different service IDs+the same LCN. This is a case where different services are allocated to one LCN and thus a conflict occurs therebetween.

Case 3 is a case of DVB-T+multiple service providers+ same service ID+different LCNs. This case may occur when a hybrid environment of DVB-T and List A and multiple service providers have the same service ID assigned, and service list C is assigned the same LCN.

Case 4 represents a case of multiple service providers+ different service IDs+same LCN, and may occur when the local country/region service list and the immigrant's country list are aggregated.

In the cases according to the embodiments, there is a potential LCN conflict issue when service lists are merged. In order to address this issue, the DVB-I standard is extended as follows such that the media data processing device according to the embodiments may perform reasonable allocation without LCN conflict.

Figure 38B:
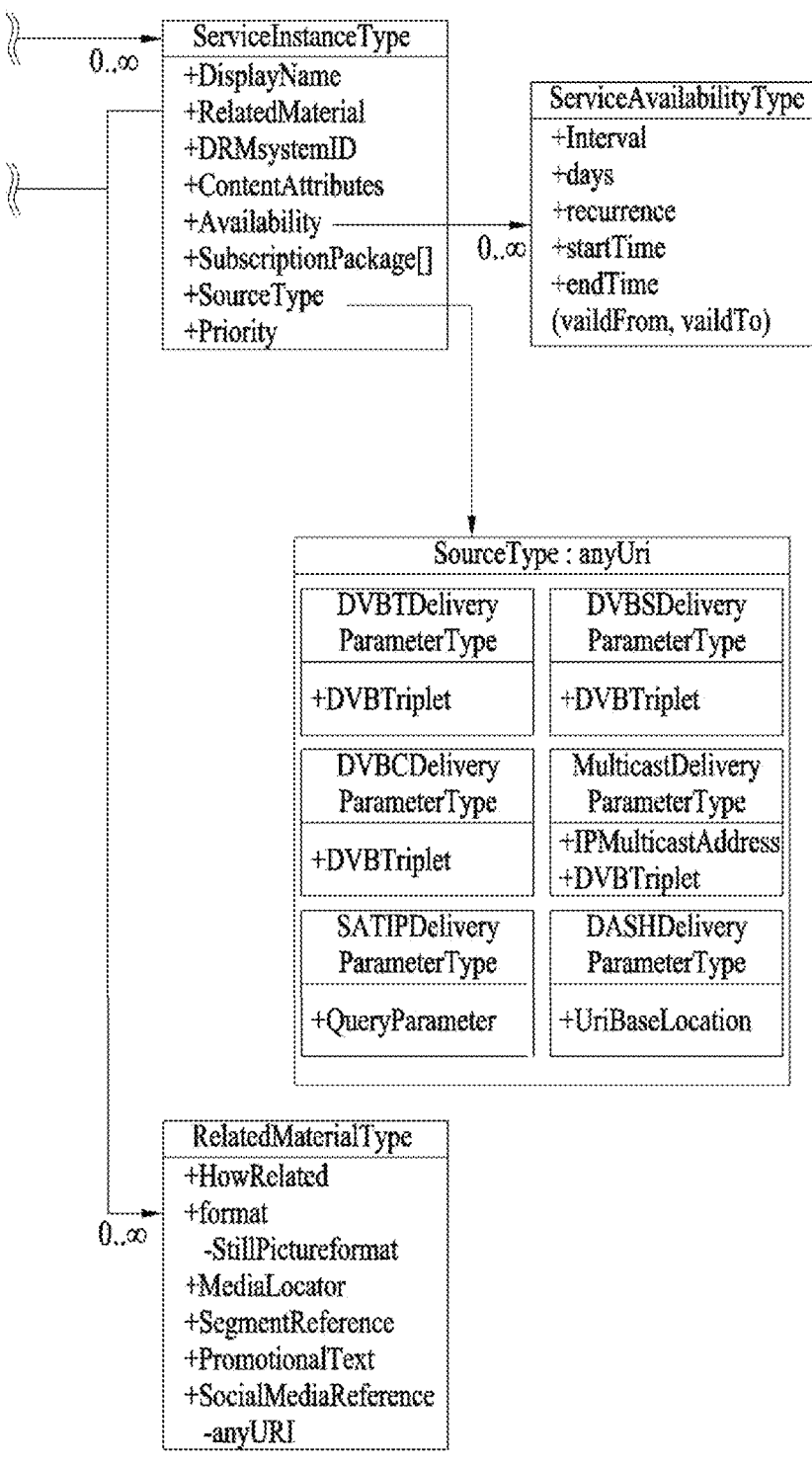
FIG. 38 shows an LCN table entry type extension according to embodiments.

FIG. 38 shows an LCN table entry type extension according to embodiments.

A service list integration operation is performed by an integrated service manager that receives and integrates DVB-I service lists according to embodiments. An LCN table received through a country/region or a meaningful package is defined through a target region or a subscription-Package in each received service list. In FIGS. 28 to 29, when a conflict occurs due to extension of the LCN table, allocation of a reasonable integrated channel may be enabled through corresponding information. Details of XML xsd are disclosed below.

The transmission/reception method/device according to the embodiments may address the issue of channel conflict occurring in receiving multiple service lists, based on the element(s) included in an LCN table described below. The transmission device according to the embodiments may generate and transmit information including element(s) included in the LCN table, and/or may allocate and manage an integrated channel through the integrated service manager (which may be referred to as a manager, a controller, or the like) that receives and integrates DVB-I service lists included in (or connected to) the reception device according to the embodiments. In addition, the processor according to the embodiments may control the service list integration operation based on a memory that stores an instruction for the integrated channel allocation operation according to the embodiments, a controller, or the like. The LCN table may be referred to as LCN information or the like, and the elements included in the LCN table may be referred to as first information, second information, and the like.

FIG. 39 shows LCN table entry syntax according to embodiments.

The priority of the service list is set based on the region or country selected by the user for the first time, or a geographical region at the time when the DVB-I client is currently installed. In addition, when services are integrated, it is considered as a lower priority. The receiver may store the list as a prioritized list to manage lists received later.

The DVB-I client may provide a channel allocation guideline to the user using the corresponding information, and the channel number may be directly reassigned according to the user's intention.

When a user living in Switzerland receives service list 1, which is a Swiss service list, and the DVB-I client receives an additional list, service list 2, ServiceRef information connected to a unique identifier within each DVB-I service and a channel number to be displayed on the screen are received. When the allocated channel number=0 of the two lists is defined as the same number and thus a channel conflict occurs, the DVB-I client has a problem in processing the same channel. In this regard, the channel duplication issue may be addressed by allocating number 1000 through the favorite channel information extended in the present disclosure.

FIG. 40 shows an example of resolving service channel conflicts according to embodiments.

As described above, the DVB-I client may address the issue of channel conflict while newly allocating 1000 to an issue occurring on (channel 0, Sid23) in service list 2.

Embodiment 2

As in Embodiment 2, when service list 1 and service list 2, and n lists, which are user's local lists, are received, a conflict may occur among channel numbers 100 to 108. When it is assumed that service list 1 has a higher priority based on the user's residential area, the conflicting channel number of Service list 2 needs to be reallocated. In this case, for the conflicting channels, the conflicting channel numbers may be reallocated through the information of SecondaryChannelNumberRange. As shown in the result, conflicting channel numbers 100 to 108 may be newly allocated starting from number 1000 according to the SecondaryChannelNumberRange.

FIG. 41 is an example of resolving a channel redundancy issue according to embodiments.

When there is the same overlapping channel as in the embodiment, a channel may be allocated to an unassigned number during a specific interval according to the definition of SecondaryChannelNumberRange. In this regard, when the channel number ordering is assigned to an unassigned channel within the SecondaryChannelNumberRange:

(1) the values of SecondaryChannelNumberRange may be mapped in ascending order of ChannelNumber that requires reallocation due to a channel conflict; or (2) if it is difficult to define the values in ascending order or if ChannelNumber is not defined correctly, the leading number or string sequence may be sequentially allocated in alphabetical order based on the string value of ServiceRef in a single list according to order of reception in the DVB-I client.

Also, when channel information is defined for both FavoriteChannelNumber and SecondaryChannelNumberRange, which are information that may be reassigned when channels overlap, the channels are allocated by assigning a higher priority to FavoriteChannelNumber than to SecondaryChannelNumberRange.

Figure 42:
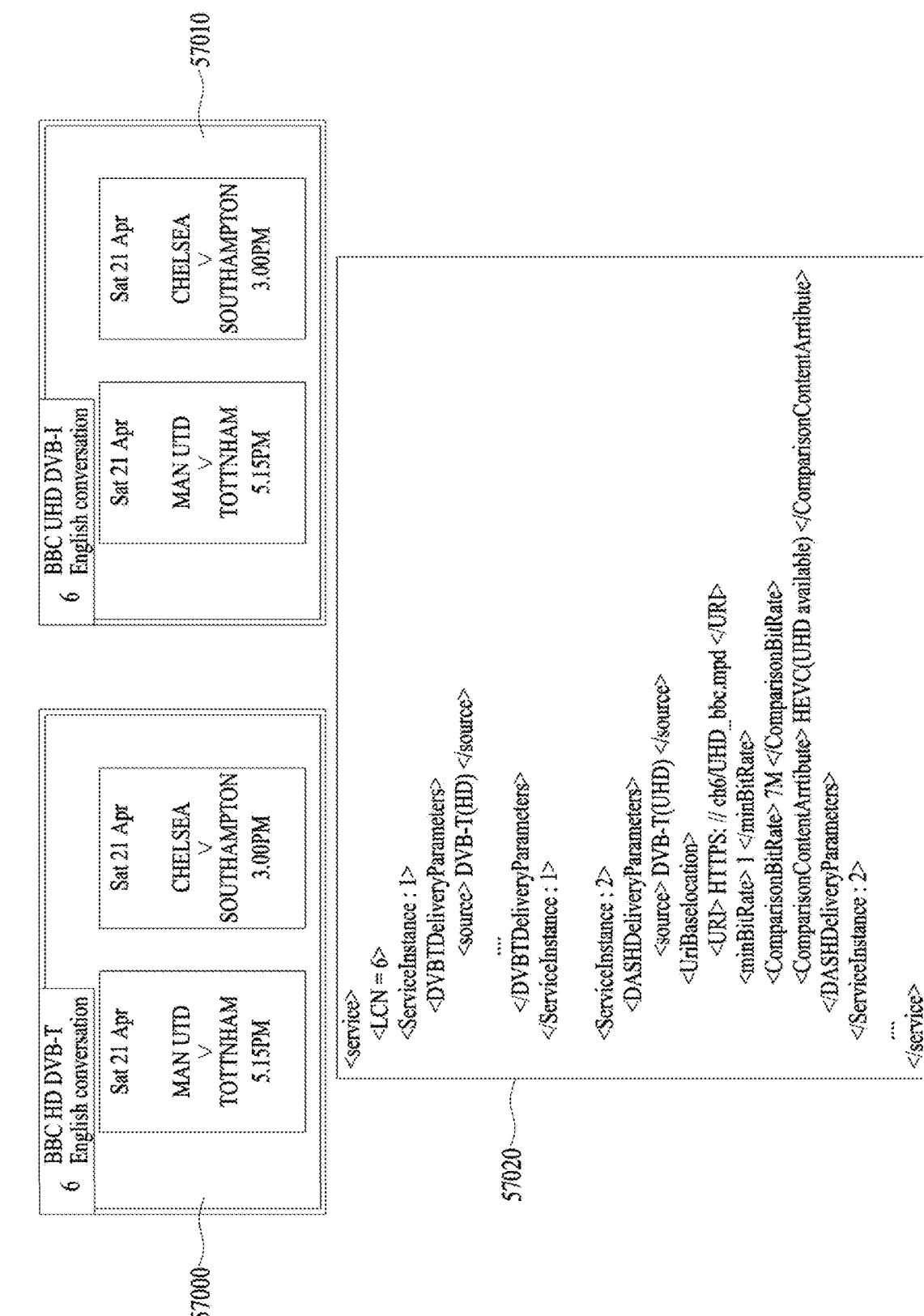
FIG. 42 illustrates a simulcast UX/UI according to embodiments.

FIG. 42 illustrates a simulcast UX/UI according to embodiments.

57000 illustrates a reception device displaying a DVB-T broadcast service according to embodiments, and 57010 illustrates a reception device displaying a DVB-I service according to embodiments. FIG. 42 illustrates providing the same service to a user based on user selection and/or characteristics of the reception device to provide a better user experience based on signaling schemes and UI/UX methods according to embodiments.

57020 is an example of signaling information for this purpose. This may correspond to the service list described above.

The service list according to exemplary embodiments may provide service instances per service. The service in 57000 and 57010 has a logical channel number 6 and includes service instance 1 and service instance 2. Service instance 1 signals a DVB-T (HD) service, as in 57000, and service instance 2 signals a DVB-I (UHD) service, as in 57010.

According to embodiments, a device capable of receiving a DVB-I service may make a determination for providing a better quality media service based on comparative bitrate values and comparative content attribute values included when receiving one or more service instances. When 2 service instances are received, as in the embodiment, a service instance that is likely to receive a better service through IP/DASH is quickly distinguished. When HD and UHD are received simultaneously, as in the embodiment, the delivery type may be selected based on the above-mentioned information.

In other words, a reception device receiving service instance 1 and service instance 2 may immediately determine whether the reception device can provide a better DVB-I UHD service based on the comparison bitrate value and comparison content attribute value contained in the service instance for DVB-I, without parsing all the other signaling information for all services. Based on instance 2, the reception device may recognize from the comparison content attribute that the comparison bitrate is 7 Mbps and the resolution of the better service is UHD (HEVC). The reception device may ask the user if they want to watch the better service based on the UI/UX. Based on the user's selection, or based on settings of the reception device, the reception device may provide the service according to instance 2 to the user.

The reception device according to some embodiments may provide the DVB-I simulcast service UI/UX to the user. FIG. 42 shows a UI/UX that provides a better experience to the user when the DVB-I client receives multiple service instances through extended information according to the embodiments described above. A terminal capable of supporting UHD/HEVC may select a DVB-I service instance for UHD reception over a DVB-T service instance for HD reception. The terminal does not need to receive all DASH MPDs, but may select a high quality service instance through the service list scheme alone.

The signaling information according to the embodiments described above may be referred to as a field, attribute, element, first information, second information, first value, second value, etc.

A discovery method for receiving a service list according to a delivery method on a DVB-I client side.

DVB-I Standard-Based Hybrid Service Scenario

FIG. 43 illustrates an example DVB-I based hybrid service scenario according to embodiments.

For the DVB-I services according to embodiments, the broadcaster 10000 may deliver the service over an Internet channel simultaneously with the terrestrial, satellite, and cable channels, as shown in FIG. 1. Service providers and device manufacturers of devices capable of receiving DVB-I services may acquire authentication of the service channels through regulation and provide Internet channels through existing linear services and a channel aggregator.

Referring to FIG. 43, DVB-S services may be provided through a DASH instance and an STB that supports DVB-S. The DVB-I client may select an instance based on priority and may receive the same service over IP or satellite according to the selection.

For DVB-I, the satellite STB/RF receiver/cable STB, etc. which are installed to support these services, may be pre-installed, and a DVB-I service list may be received to build a DVB-I hybrid service environment. In the case of DVB-I mobile, which is an only-IP environment, the service list may be received and instances that can be received over IP may be selected.

To support regionalization as in a DVB-I service scheme according to embodiments, the client may selectively receive filtered services for the regional services being received based on information such as target region/post-code/Region ID/LCN mapping.

FIG. 31 illustrates a discovery operation of B1, B2 interfaces and an operation of acquiring a service list by F1, F2 interfaces. In this regard, FIG. 44 illustrates a DVB-I service list discovery procedure.

FIG. 44 illustrates a DVB-I service discovery procedure according to embodiments.

FIG. 44 illustrates a sequential service discovery procedure, wherein the "Interface" column shows the abbreviations related to data transmission and reception in FIG. 31.

In the service scheme structure shown in FIG. 44, service discovery searches for all service lists in <ProviderOffering>, regardless of delivery method, and selects and receives a service according to specific criteria on the client side.

In the scheme of FIG. 44, after receiving the service list, a service list is received in the absence of specific criteria without distinction according to the receiving satellite STB/RF receiver/cable STB. In such a structure, there is a risk that a device receiving a satellite STB may also receive a terrestrial list. There is also the processing burden of filtering on the DVB-I client, which may overload the device given the limited device capability.

The client (or reception device) may receive the entire service list, regardless of region or delivery method, and then filter the service list based on the client's criteria to receive a service. However, this shifts the processing burden of filtering to the client and increases the amount of data transmitted between the server and the client.

The device/method according to embodiments may be extended to acquire a service list according to a delivery method during the DVB-I service discovery procedure.

FIG. 45 illustrates a method of acquiring a DVB-I service list according to embodiments.

In the scheme illustrated in FIG. 45, "ServiceListOfferingType" may include "Delivery" as an element. "Delivery" indicates the delivery method used to deliver a service in the service list. "Delivery" may indicate a delivery method that is required to provide an acceptable experience, as defined by the service list provider.

"ServiceListOfferingType" in FIG. 45 may be referred to as service list offering information. The service list offering information may include ServiceListName, ServiceListURI, Delivery, Language, Genre, and TargetCountry as information.

The Delivery information identifies the delivery method used to deliver the service within the service list and may indicate the delivery type.

FIG. 46 illustrates a method of acquiring a DVB-I service list according to embodiments.

Referring to FIG. 46, the delivery type information may include DASHDelivery, DVBTDelivery, DVBCDelivery, DVBSDelivery, RTSPDelivery, MulticastTSDelivery, ApplicationDelivery, or OtherDeliveryParameters.

"AbstractDeliveryType" may include the parameters required, avaliability, priority, and recommendation.

@required indicates whether the delivery type must be supported by the DVB-I client in order to offer an acceptable experience as defined by the service list provider.

@availability may indicate whether the delivery type is available when the related broadcast signal or IP network can be used by the client to retrieve the DVB service.

@priority indicates the priority of the service list relative to other delivery methods. A lower attribute value indicates a higher priority.

FIG. 47 illustrates a method of acquiring a DVB-I service list according to embodiments.

Referring to FIG. 47, a client may transmit a discovery query in a service list registry according to a delivery method (B1). In response to B1, the server may return a service list in the form of entry points based on the query conditions (B2). The delivery method supported by the list and a method that can be supported by IP only devices are defined according to <Delivery> defined in <ProviderOffering> received by the client.

The client may select and request a service list based on the <ProviderOffering> information (F1). Further, the client may parse the received service list and install and provide the service (F2).

The device/method according to the embodiments shifts the processing load of receiving and filtering all service lists by the DVB-I client to the server. Based on the pre-installed received information (pre-installed delivery method/protocol), the DVB-I client may deliver relevant information to the server as a query, and the server may transmit the appropriate list according to the delivery method to the client through filtering. In order to support IP-only devices that are not pre-installed with a DVB network, the lists may be matched according to the appropriate ranking of acceptable experience information defined by the service lists.

DVB-I Server Side Region Selection

DVB-I Region Service List Offering

FIG. 48 illustrates a method of providing a DVB-I regional service list according to embodiments.

FIG. 48 shows an example of regional service list metadata.

In a DVB-I service requirement, a specific regional service list may be defined in the service list metadata. Referring to FIG. 48, within the metadata of the service list, a country (String)/region (String)/service area (Postcode) may be defined based on the scheme hierarchy of <RegionList>-<Region-region ID>-<Postcode>.

The LCN table may be mapped to the defined <TargetRegion> according to the region ID, and the corresponding service ref information may be referenced as an ID value in <service>. With the referenced information and service information, the DVB-I service list metadata satisfies the requirements to enable regional services.

Referring to FIG. 48, a service available in each geographical area is defined in the form of reference through the postcode and region name in the service list, and a regional service is received in the form of filtering the region and service directly by the DVB-I client by matching the region information or postcode input by the user. In other words, the service is defined to be selected by the DVB-I client in a list containing the service reference information for all regions.

Limitations and Solutions to Providing a DVB-I Hybrid Regional Service List

The DVB-I service may provide a regional service list and also provide a channel hybrid service through service instance matching with existing DVB-T transmission instances.

In the current situation of DVB digital terrestrial television (DTT) reception, DTT RF transmission coverages overlap, and it is difficult to achieve accurate local broadcasting according to national or regional boundaries. For example, in a specific region, channel scans may show the same channel twice, or SD/HD/IP broadcast may be provided on redundant channels. Inconsistent channel scanning makes it difficult to provide a complete service when a hybrid channel set is configured by a broadcast network and a broadband (DVB-I).

FIG. 49 illustrates server side region selection according to embodiments.

To configure a hybrid channel, a device/method according to embodiments may deliver channel multiplex information of the DTT being received to a server using the bidirectionality of IP, and the server may provide a tailored service list based on this information.

The DVB-I hybrid terminal 49010 of FIG. 49 may represent a reception device (or client) according to embodiments, and may correspond to the TV 2000 of FIG. 2, the reception device of FIG. 7, the client 690000 of FIG. 25, the DVB-I client of FIG. 31, and the terminal 52010 of FIG. 52. Also, the region selection server 49020 of FIG. 49 may correspond to the service list server of FIG. 31, the service list registry of FIG. 31, or the server 52020 of FIG. 52.

As shown in FIG. 49, after RF scanning, the received multiplex information (mux information) of DVB-T is fetched and DVB-I installation is started. During the installation, it is determined, based on the service list URL and server side region selection information in the received service list entry point, whether the terminal needs server side region selection. If the terminal needs the selection, a service list tailored to the received muxed information may be optionally requested.

The reception device (or client) according to the embodiments may transmit the multiplex information acquired through the RF scan to the server, and the server may return a tailored service list for the hybrid channel service list based on the received multiplex information.

The multiplex information may include information about channels that the reception device according to the embodiments can receive. The channels that the reception device can receive may vary depending on the region in which the reception device is located. Accordingly, the multiplex information indicating the channels that the reception device receives may be utilized by the server side to provide a tailored service list based on the region where the reception device is located. In other words, the multiplex information may be used for server side region selection because the multiplex information is information from which the service region of the reception device may be inferred. In other words, the multiplex information is one of the pieces of information in the region selection information that enables server side region selection. Other region selection information includes postcode information and regionID information.

The server-side region selection according to the embodiments refers to filtering the entire service lists on the server side to generate/deliver a tailored service list, rather than filtering the entire service lists on the client side. The region selection information according to the embodiments represents information that the server receives from the client to generate the tailored service list, and may include multiplex information, postcode information, or region ID information related to the reception device.

The reception device (or client) according to the embodiments may transmit the region selection information (see FIGS. 55 to 59), such as multiplex information, postcode information, or region ID information, when making a request for a service list to the server. The server may transmit a tailored service list to the reception device based on the received region selection information.

<ServiceListURL>: Indicates the URL of the service list.

<Muxlist>: Indicates the information (ONID, TSID, Network ID) about channels that can be received by the terminal (DVB-T) (or client). It may contain information about channels that can be received as a result of RF scanning.

<interactive>: 1 for the first install scan, 0 for background scan

<answer_token>: Indicates the default setting for the user. The value is absent during initial installation, but the value of answer token may be received in the HTTP header of the taylored service list. In subsequent requests, this value may be included.

<postcode>: May indicate the value of Region ID in the JSON return value received by <ServiceList_URL>?postcode=<postcode>.

In FIG. 49, the terminal (e.g., a reception device or client) may perform RF scanning and deliver information about the scanned channel (or multiplex information) to the server, and the server may transmit a tailored service list to the terminal based on the information about the scanned channel.

Web-Based Authentication/Authorization Between User and Server

Web-based connection state may be managed using authentication and authorization. Authentication is to recognize the login status of the user based on IP information and account information and grant permission, and authorization is to recognize that the user is an authenticated user on the server side and allow for individual events when the authenticated user wants to make individual events or use service functions. In other words, among individual events, authorized events may become available by submitting a specific token to the server in resting APIs.

The authentication that requires account information and login information to be delivered at every request has security risks and may burden server-side database management when many users connect simultaneously. To address these drawbacks, a JSON web token (JWT) may be utilized. According to embodiments, a JWT may be configured as follows.

FIG. 50 illustrates an example web token (JWT) according to embodiments.

The JWT may be encoded in the form of Base 64 and separated by a delimiter (.) into a header, a payload, and a signature. This information includes who issued the token to whom, how long it is valid, and what is possible with the service.

Figure 51:
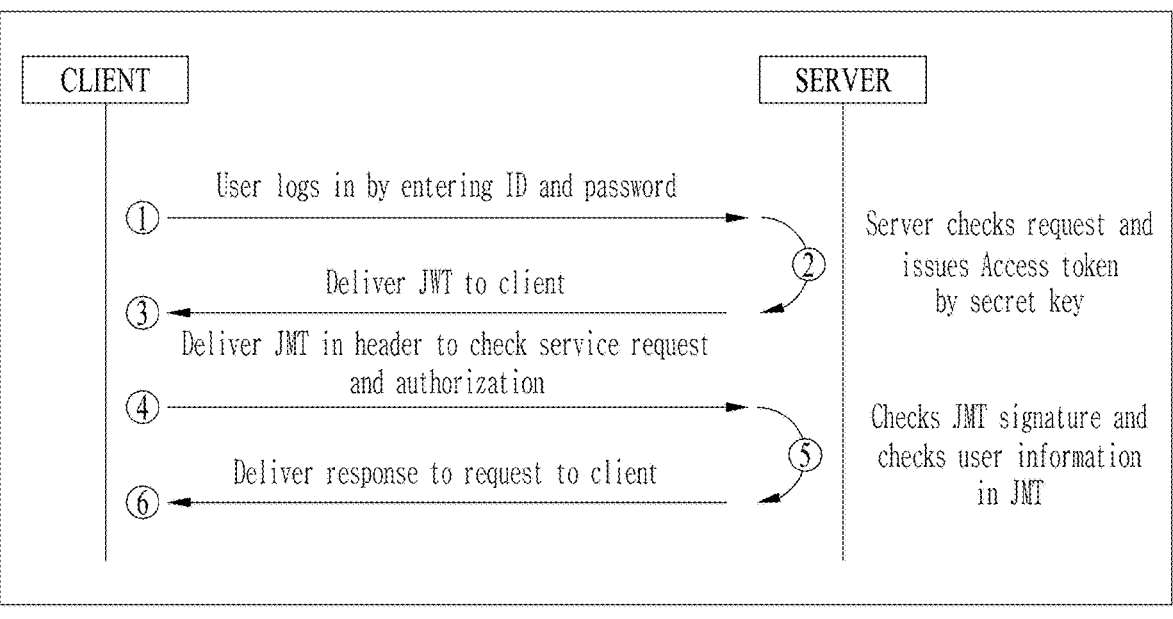
FIG. 51 illustrates a JWT acquisition and authorization procedure according to embodiments.

When a client delivers a JWT in the http header, the server may compare the JWT algorithm with a specific key value on the server to grant authorization. The signature may only be decrypted with the key stored by the server. Unlike account connections (session connections: stateful), which are managed by both the client and server on a 50/50 basis, these web tokens are stateless, meaning that the token is not remembered after it is delivered. Therefore, when the server and the client exchange information, the client includes a JSON token in the http packet and makes a request, and the server only verifies that the JWT is valid and authenticated without authenticating the user account information in a separate DB, and proceeds with authorization by checking whether the user is authorized to perform the requested operation. FIG. 51 illustrates a typical JWT acquisition and authorization method.

FIG. 51 illustrates a web token (JWT) acquisition and authorization procedure according to embodiments.

Referring to FIG. 51, the client logs in by entering a user ID and password, the server checks the client's request and issues an access token with a secret key. Then, it delivers a JWT to the client. The client delivers a JWT in the header to check the service request and authorization. The server checks the JWT signature, checks the user information in the JWT, and delivers a response to the client's service request.

The JWT has the following drawbacks. In the case of the method that utilizes the JWT, the server does not manage the session, but only manages the client's JWT value, and therefore cannot control it for a long period of time. In other words, if the token is stolen, there is no way to take action until the token expires. In the case of an existing session, even if the session ID is stolen, a complementary action (stateful) can be taken to disconnect the existing terminal when another device accesses, but the JWT alone cannot take any action in the case of access from multiple devices. Problems with Implementing DVB-I SSRS (Server Side Region Selection) Based on Web Tokens FIG. 52 illustrates a method of supporting web-token-based server side region selection (SSRS).

FIG. 52 illustrates an operational process for a DVB-I hybrid TV (reception device) capable of receiving DVB-T to support server side region selection (SSRS).

The DVB-I hybrid terminal 52010 of FIG. 52 may represent a reception device (or client) according to embodiments, and may correspond to the TV 2000 of FIG. 2, the reception device of FIG. 7, the client 690000 of FIG. 25, the DVB-I client of FIG. 31, and the terminal 49010 of FIG. 49. The region selection server 52020 of FIG. 52 may correspond to the service list server of FIG. 31, the service list registry of FIG. 31, or the server 49020 of FIG. 49.

Referring to FIG. 52, the reception device according to the embodiments may support server side region selection (SSRS) by performing the following operations.

1. Acquiring service list entry points: After selecting a service list URL, it is determined whether to perform SSRS.

2. Requesting SSRS: Service list URL and RF scanned <muxlist> information are requested through the endpoint.

3. A tailored service list and access_token are acquired.

4. Requesting additional SSRS: SSRS is requested through the endpoint containing the received answer_token.

5. A tailored service list is acquired.

Web Token Based DVB-I SSRS Support

The following two methods may be proposed

Issuing refresh_token: When JWT is initially issued, refresh_token could be issued along with access_token to ensure the refresh or renewal of tokens. When the server confirms that the token has expired, a new access_token may be issued through the refresh_token. A refresh_token is issued in the following scenarios.

1. The client receives a tailored service list, access token, and refresh token from the server in an initial SSRS operation.

2. The client stores the refresh token and supports SSRS operations with the access token.

3. When the access token expires, the client makes a request to the server to renew the access token through the refresh token.

4. a client may receive the renewed access token and refresh token and repeat operations 1, 2, and 3 above.

The reception device (e.g., client) according to the embodiments may acquire a service list entry point from the CSR server, determine whether SSRS is performed, and transmit multiplex information (<Muxlist>) to the server according to the embodiments. The server according to the embodiments transmits a tailored service list to the reception device based on the received multiplex information, and transmits an access token and a refresh token as well. When the access token expires, the reception device according to the embodiments may request reissuance of the access token based on the refresh token, request a service list with the reissued access token, and receive a tailored service list.

The reception device according to the embodiments may transmit region selection information (see FIGS. 55 to 59), such as multiplex information, postcode information, or region ID information, when making a request for a service list to the server. The server may send a tailored service list to the reception device based on the received region selection information.

Reference Method for Managing Issued Access Token with Service List

In order to manage the access_token issued through the initial SSRS operation, the DVB-I client needs information to define the reference relationship with each service list. rfc7519 defines a method for defining a JWT and the attributes of the information in the JWT through each JWT claim.

With the two methods described above, the case where the access_token is stolen by a third party may be coped with. Also, even if the length of the Access_token is increased, the load does not increase significantly. Also, there is no need to add UI/UX to check account information on the TV when the token expires. In addition, there is a clear uniqueness of the Access_token and a reference for management with the service list. Answer_token may be applied even for DVB-I paid/free service list management.

FIG. 53 shows the result of decoding the extended JWT as an embodiment utilizing the claims defined in rfc7519 and the information required for DVB-I service management.

FIG. 53 illustrates a result of decoding a JWT according to embodiments.

Figure 54:
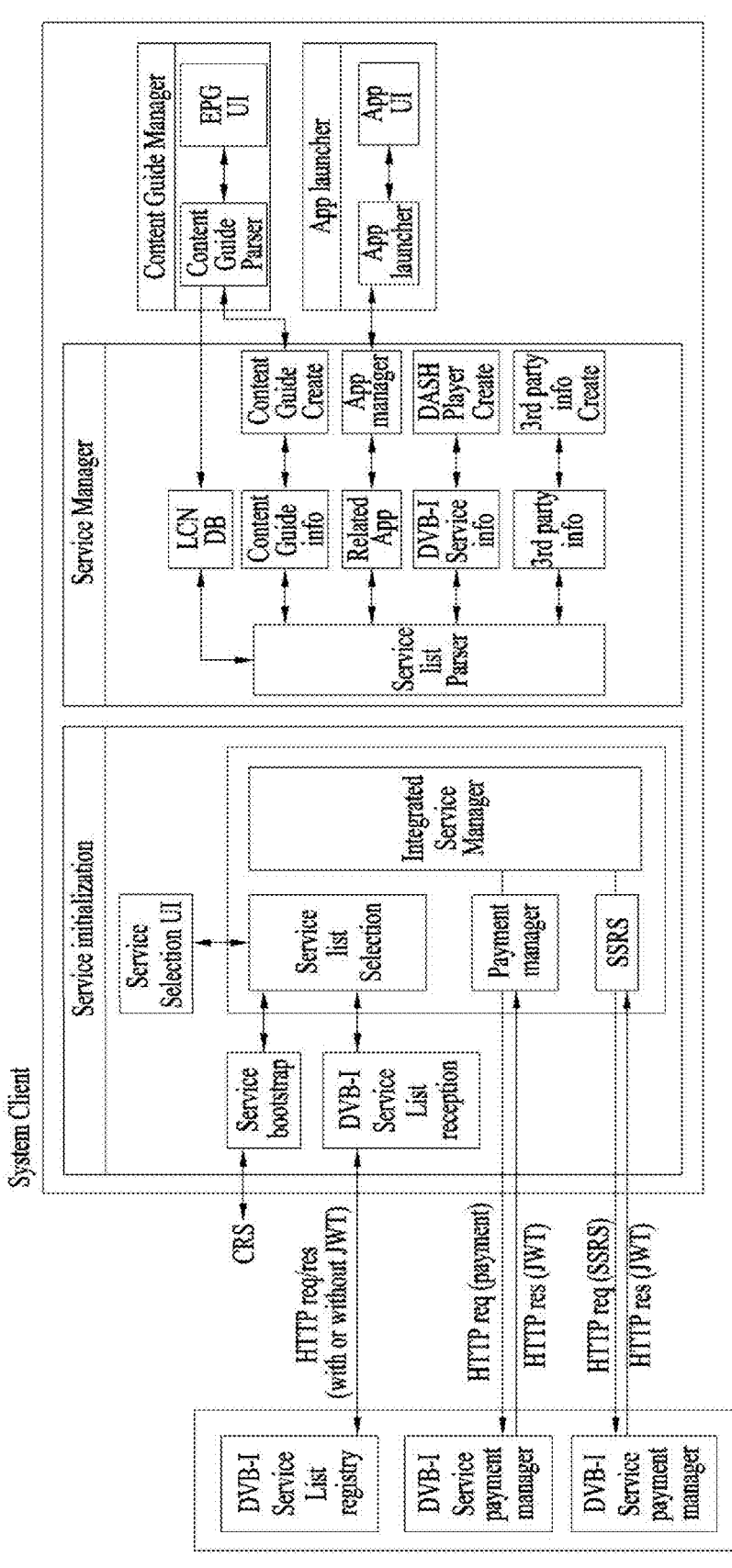
FIG. 54 illustrates a receiver according to embodiments.

Referring to FIG. 53, in order for a DVB-I client to store and manage a service list and a token simultaneously, the uniqueness of the token and its reference relationship with the service list are required. rfc7519 allows the server/client through additional Private Claim Name. By adding additional service information to support DVB-I SSRS, clear information and reference between DVB-I client and access token may be defined. The claims of "Dvb", "ServiceList-Provider", and "ServiceListName" in FIG. 53 may be utilized as service list management and reference information within the DVB-I client, which may be stored by conventional web cache methods and used as an authentication token for subsequent service requests. FIG. 54 illustrates a receiver to support the solution described above.

FIG. 54 illustrates a receiver according to embodiments.

The system client of FIG. 54 may represent a reception device (or client) according to embodiments, and may correspond to the TV 2000 of FIG. 2, the reception device of FIG. 7, the client 690000 of FIG. 25, the DVB-I client of FIG. 31, the terminal 49010 of FIG. 49, and the terminal 52010 of FIG. 52.

Referring to FIG. 54, the reception device (e.g., client) according to the embodiments performs the following operations:

1. It performs a service bootstrap through the CSR server and receives a service list.
2. It receives a service list, and performs an additional request (req)/response (res) process to the service list server depending on whether additional service provision can be performed (SSRS, payment).
3. It receives an authorization token (JWT) during the additional provisioning operation.
4. It builds a reference relationship of each jwt–service list (service or services), and stores jwt+service list (service or services) information+service list endpoint through cache methods applicable in the service manager.
5. When the client needs further provisioning or authentication of the service list, it makes a request to the service list (service) server by including the jwt in the HTTP packet.
6. The server checks the jwt in the request packet from the DVB-I client to verify that the request is an acceptable request.
7. The server returns an HTTP response and the provisioned service to the DVB-I client only for requests that include an acceptable jwt.
8. The client and server may perform the access token renewal operation.

DVB Existing Broadcast Service Coverage Status and Problems and Solutions in Configuring Hybrid Channels In general, according to the broadcast DTT RF coverage, the broadcast receiver may receive a signal if the signal strength is greater than or equal to a threshold. That is, whether to receive the signal depends on the signal strength. Transmitters are arranged at regular intervals in consideration of broadcast coverage and are equipped to receive location-specific broadcasts depending on the country or specific region. However, it is difficult to accurately match the signal strength of each transmitter and the transmission coverage. Thus, there may be overlap between countries or regions. For example, the broadcast coverage of region A may overlap with a part of region B, and a receiver in region B may receive a broadcast channel from region A. In other words, even receivers located in the same region (e.g., region B) may have inconsistent RF reception.

DVB-I may configure a hybrid channel set of services from the conventional DVB network (T, S, C) and IP to provide different quality content by separating the same content for each service instance. The inconsistent channel reception of DVB RF networks makes it difficult to create a perfect hybrid channel instance configuration. To address this issue, information that allows the DVB-I client's channel to be inferred may be delivered to the server, allowing the server-side to create a hybrid channel set that corresponds to the DVB-I reception environment based on the information and return a service list. Methods and embodiments for delivering server side region selection information as shown in FIG. 49 are described below.

1. Delivering Postcode
    a physical geographic location, which may be information input by the user.
    <ServiceList_URL>?postcode=<postcode>
    https://Servicelist.com/query?postcode=19273 or
    https://Servicelist.com/postcode=19273

2. Delivering Receivable T/C/S Multiplexes (Multiplex Information)

pseudo-geographic location, which may indicate unique information about the service being received by the DVB tuner.

<ServiceList_URL>/<muxlist>-<interactive>-<service-_list_id> https://Servicelist.com/muxlist=1023_2582_4163

3. Delivering Region ID

It may represent the region information from which the region can be inferred or region ID defined by DVB-I.

<ServiceList_URL>?region=<region> https://Servicelist.com/query?region=london or https://Servicelist.com/region=london The device/method according to the embodiments may include the above three pieces of information after the service list URL, transmit the same to the server, and receive from the server a service list that is appropriate for the current receivable channel environment.

The reception device (e.g., client) according to the embodiments may transmit at least one of the postcode information, the receivable T/C/S multiplexes, or the RegionID to the server. Then, a customized service list may be received from the server based on the transmitted information.

The postcode information, the receivable multiplex information (receivable T/C/S multiplexes), and the RegionID information may be referred to as region selection information for supporting region selection by the server. In other words, the region selection information according to the embodiments may include postcode information, receivable T/C/S multiplexes, and RegionID.

The DVB-I service list entry point schema that allows the above three options to be selected is shown in FIG. 55.

FIG. 55 illustrates a DVB-I service list entry point schema according to embodiments.

FIG. 55 illustrates Option 1, which allows the three options described above to be selected.

Referring to FIG. 55, ServiceListOfferinngType (referred to as "service list offering information") includes an SRSsupport element, and the type of the SRSsupport element is text.

The values of @SRSsupport may include PC, RM, and RI.

PC indicates that the server supports postcode queries.

RM indicates that the server supports queries through receivable multiplex.

RI indicates that the server supports queries through regionID.

@SRSsupport may define a selection of three or fewer options with option formats and unbounded.

<ServiceListOfferingType>

. . .

<SRSsupport>PC</SRSsupport>
    <SRSsupport>RM</SRSsupport>
    <SRSsupport>RI</SRSsupport>

. . .

</ServiceListOfferingType>

Referring to FIG. 55, the service list offering information (ServiceListOfferingType) may include a service list name, a service list URL, a Language, a Genre, a TargetCountry, a TargetONID, and SRSsupport. SRSsupport in FIG. 55 may indicate the type of region selection information supportable by the server. The type of SRSsupport may be text. Alternatively, the type of SRSsupport may be defined as a string or a selectable flag.

The service list offering information according to the embodiments may be transmitted to the reception device according to the embodiments, and the reception device may make a request to the server for a service list based on the service list offering information.

The value of SRSsupport included in the service list offering information may include a combination of at least one of PC, RM, and RI. PC may indicate that the server supports postcode, RM may indicate that the server supports multiplex information, and RI may indicate that the server supports region ID.

FIG. 56 illustrates a DVB-I service list entry point schema according to embodiments.

Referring to FIG. 56, ServiceListOfferinngType (referred to as "service list offering information") may include an SRSsupport element, and a type of the SRSsupport element may be represented by SRSsupportType. FIG. 56 illustrates Option 2.

Option 2 requires that a postcode representing a physical geographic location must be provided to the server-side.

Option 2 includes the postcode as a mandatory option, which is received by the DVB-I client. Option 2 is defined such that any of the combinations that must include PC can be expressed as a regular expression. That is, the following combinations must include PC and do not include RM alone.

1. PC, RM, RI
    2. PC, RM
    3. PC, RI
    4. PC
    5. PC, RI, RM

Referring to the five value patterns above, PC support is mandatory and may be defined by a regular expression as follows Thus, the option of supporting RM alone on the server is excluded.

/^(PC,RM,RI|PC,RM|PC,RI|PC|PC,RI,RM)$/

Since PC support is mandatory, the regular expression is composed of a string that must contain PC, and may have five different value patterns. When delivering an option whose selection determines the operation of the receiver, the regular expression may define a string value if there is an option that must be included.

Referring to FIG. 56, service list offering information (ServiceListOfferingType) according to the embodiments may include a service list name, a service list URL, a language, a genre, a TargetCountry, a TargetONID, and SRSsupport information. SRSsupport in FIG. 56 may indicate the type of region selection information supportable by the server. The service list offering information according to the embodiments may be transmitted to a reception device according to embodiments, and the reception device may make a request to the server for a service list based on the service list offering information.

The value of SRSsupport included in the service list offering information may be a combination of at least one of PC, RM, and RI, where PC indicates that the server supports postcode, RM indicates that the server supports multiplex information, and RI indicates that the server supports region ID.

In the service list offering information, SRSsupport indicates the type of region selection information that the server supports. The type of region selection information supported by the server may be at least one of PC, RM, or RI. PC is information indicating a postcode, RM is information indicating a multiplex, and RI is information indicating a region ID. For example, when the type of region selection information in the service list offering information is PC and RM, it indicates that the server supports postcode information and multiplex information. Therefore, the reception device according to the embodiments may transmit the postcode information or multiplex information to the server to enable region selection to be performed on the server side.

The service list offering information may indicate the type of region selection information supported by the server by listing a string, which may be a combination of one or more of PC, RM, or RI. For example, it may be "PC, RI", "PC, RM", or "PC, RM, RI".

The service list offering information (ServiceListOffer-ingType) according to the embodiments may correspond to the service list offering information (ServiceListOffering-Type) of FIGS. 18, 23, 27, 38, and 45. The service list offering information may be included in ServiceListEntry-Points. The server transmits the ServiceListEntryPoints to the client at the request from the client (see F2 in FIG. 31).

FIG. 57 illustrates delivery of region selection information according to embodiments.

The server may provide the service list to the client based on physical geographic location information. The geographic location information may be a user-selected territory/region, a user entered postcode, or the like. In addition, the server may use pseudo-geographic location information to provide a service list to the client. The pseudo-geographic location information may be information that is inferred by the receivable T/C/X multiplexes. The receivable T/C/X multiplexes information may be provided by the client.

Instead of sending sensitive receiver performance information (mux information), the DVB-I client may receive selectable postcode information and deliver the option to the server side. To define these regular expressions within a scheme, a new type may be defined, as shown in FIG. 58.

FIG. 58 shows an example description of DVB-I service list offering information (ServiceListOfferingType) according to embodiments.

Referring to FIG. 58, @SRSsupport may represent a selection of mandatory and optional in a single definition based on maxOccurs="1". Furthermore, PC is a fixed value, and RM and RI may be separated by commas. That is, any of the combinations of PC, RM, and RI may be specified, including at least PC. Information indicating a type of region selection information (e.g., SRSsupport) according to embodiments may include one of the combinations of region selection information including PC.

FIG. 59 shows an example description of DVB-I service list offering information (ServiceListOfferingType) according to embodiments.

Referring to FIG. 59, the SRSsupport may have PC, RI defined, PC, RM defined, or all of PC, RM, RI defined. In all cases, PC is included, indicating that in all cases the client can deliver postcode (PC) information to the server. The PC information is information indicative of a postcode, and is not the postcode itself.

Referring to FIG. 59, the service list offering information according to the embodiments includes information (SRS-support) indicating the type of region selection information supported by the server. The information indicating the type of region selection information (e.g., SRSsupport) may be a list of at least one of information indicating a postcode (PC), information indicating multiplexes (RM), and information indicating a region ID (RI). For example, it may be "PC", "PC, RI", "PC, RM", or "PC, RM, RI".

In some embodiments, the service list offering information may include flag information indicating whether the server supports the postcode (PC), multiplexes (RM), and region ID (RI).

For example, it may be expressed as follows.

```
<element name="SRSSupport" minOccurs="0">
<complexType>
<attribute      name="postcode"      type="boolean"
    default="false"/>
<attribute      name="regionId"      type="boolean"
    default="false"/>
<attribute name="receivedMultiplex" type="boolean"
    default="false"/>
</complexType>
```

The scheme described above may provide a boolean value indicating whether the server supports each of the information indicating a postcode, the information indicating a regionID, and the information indicating a multiplex (receivedMultiplex).

Based on the service list offering information received from the server, the reception device (or client) according to the embodiments may check the type of region selection information supported by the server, transmit the region selection information supported by the server, and receive a tailored service list based on the region selection information from the server.

FIG. 60 illustrates a media data processing method according to embodiments.

The reception method of FIG. 60 may be performed by the system client of FIG. 54. The client of FIG. 54 may represent a reception device (or client) according to embodiments, and may correspond to the TV 2000 of FIG. 2, the reception device of FIG. 7, the client 690000 of FIG. 25, the DVB-I client of FIG. 31, and the terminals 49010 and 52010 of FIGS. 49 and 52.

Referring to FIG. 60, the device/method according to the embodiments may include receiving service list entry points, requesting a service list (service list query), and receiving the service list. In this regard, reference is made to FIG. 31.

Referring to FIGS. 18, 27, and 23, the service list entry points include service list offering information. Accordingly, the receiving of the service list entry points includes receiving the service list offering information.

Referring to FIGS. 49 and 52, the requesting of the service list (service list query) may include transmitting region selection information. The region selection information may include one of multiplex information, postcode information, or region ID related to the receiver.

Further, referring to FIGS. 49 and 52, the client receives a tailored service list based on the region selection information.

Based on the foregoing, the reception method of FIG. 60 includes receiving service list offering information (S6000), transmitting region selection information based on the service list offering information (S6001), and receiving media data (or a service list) based on the region selection information (S6002). In this regard, refer to FIGS. 49, 52, 55, 56, 58, and 59.

The service list offering information may indicate the type of region selection information supported by the server. The type of the region selection information may include information indicating a postcode, information indicating a multiplex, and information indicating a regionID, and the service list offering information may indicate that at least one of the types is supported by the server.

The service list offering information may list the types of region selection information to indicate whether the server supports the types, or may provide flag information specifying a boolean value for each type of the region selection information. The region selection information includes postcode information, multiplex information, and region ID information.

For example, the type of regional selection information may be indicated by listing one or more of the information indicating the postcode (PC, see FIG. 55), the information indicating the multiplex (RM, see FIG. 55), and the information indicating the region ID (RI, see FIG. 55). In this case, the type of the region selection information supported by the server may include the information indicating the postcode (see FIG. 58).

Alternatively, for the type of the region selection information, flag information may indicate whether the server supports the information indicating the postcode, information indicating the multiplex, and information indicating the region ID. For example, a Boolean value may be specified for each type of the information to indicate whether the server supports the type.

The operation of the reception device requesting the service list may include transmitting the region selection information based on the service list offering information (S6002).

Operation S6002 of transmitting the region selection information may include transmitting one of postcode information, multiplex information, and region ID information to the server, according to the type of the region selection information.

The operation S6003 of receiving the media data (or service list) includes receiving a service list based on the region selection information. The reception device according to embodiments may receive a tailored service list from the server and receive media data based thereon.

The postcode information may indicate geographic information about the reception device, and the multiplex information may indicate information about channels receivable by the reception device. The region ID information may indicate region information from which the region of the reception device may be inferred, or a RegionID defined in DVB-I.

The service list offering information (ServiceListOfferingType) according to the embodiments may correspond to the service list offering information (ServiceListOffering-Type) of FIGS. 18, 23, 27, 38, and 45. The service list offering information according to the embodiments may be included in the ServiceListEntryPoints.

The type of the region selection information according to embodiments may include at least one of information indicating a postcode, information indicating a receivable multiplex, and information indicating a region ID.

The devices/methods according to embodiments may represent a DVB-I client or a method performed by the client.

A reception device according to embodiments may include a receiver configured to receive service entry points (or service list offering information) and a transmitter configured to request a service list, wherein the receiver may receive media data (or service list) based on the region selection information.

Each of the operations of the reception method according to the embodiments may be performed by a processor of the reception device and a memory storing instructions for executing the processor. The components of the reception device performing each operation may be physically separated by function, or may be logically separated even if not physically separated. Even when multiple functions are performed by one processor and one memory, they may be logically separated by function and represented by function-specific components. The components of the device that perform each operation may be referred to as parts, units, modules, or other appropriate names.

Figure 61:
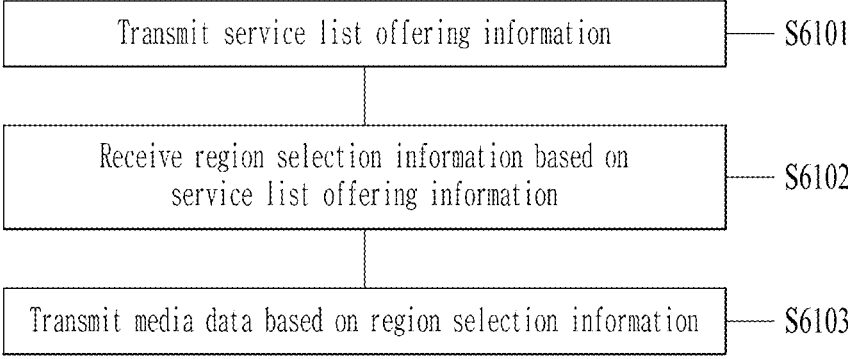
FIG. 61 illustrates a media data processing method according to embodiments.

FIG. 61 illustrates a method of transmitting media data according to embodiments.

The transmission method of FIG. 61 may be performed by a transmission device (or, server) according to embodiments. The transmission device according to the embodiments may correspond to the region selection server of FIG. 52, the service list server or service list registry of FIG. 31, the server 49020 of FIG. 49, or the server 52020 of FIG. 52.

The transmission method of FIG. 61 corresponds to the reception method of FIG. 60.

Referring to FIG. 61, the transmission device/method according to the embodiments may include transmitting service list entry points, receiving a service list request (service list query), and transmitting a service list. In this regard, reference is made to FIG. 31.

Referring to FIGS. 18, 27, and 23, the service list entry points include service list offering information. Accordingly, the transmitting of the service list entry points may include transmitting the service list offering information (S6101).

Referring to FIGS. 49 and 52, the receiving of the service list request (service list query) may include receiving region selection information (S6102). The region selection information may include one of multiplex information, postcode information, or region ID related to the receiver.

Further, referring to FIGS. 49 and 52, the server transmits a tailored service list (or media data) based on the region selection information.

Based on the foregoing, the transmission method of FIG. 61 includes transmitting service list offering information (S6101), receiving region selection information based on the service list offering information (S6102), and transmitting media data (or a service list) based on the region selection information (S6103). In this regard, refer to FIGS. 49, 52, 55, 56, 58, and 59.

The service list offering information indicates the type of region selection information supported by the server, wherein the type of the region selection information according to embodiments may include at least one of information indicating a postcode, information indicating a receivable multiplex, and information indicating a region ID.

In this case, the type of the region selection information supported by the server may be indicated by listing at least one of the information indicating a postcode (PC), information indicating a multiplex (RM), and information indicating a region ID (RI). The type of the region selection information includes the information indicating the postcode (PC). As the information indicating the postcode is included in the type of region selection information, the reception device may receive a tailored service list by transmitting the postcode information. Thus, the multiplex information that may indicate the reception performance of the RF signal may not be exposed.

Further, for the type of the region selection information, flag information may indicate whether the server supports the information indicating the postcode, information indicating the multiplex, and information indicating the region ID. For example, whether each type is supported by the server may be delivered as a Boolean value.

S6102 of receiving the region selection information includes receiving one of the postcode information, multiplex information, and region ID information, corresponding to the type of the region selection information. Then, a transmission device (or server) according to embodiments may filter and transmit a service list to a client based on the received region selection information. For example, when the received region selection information is a postcode, the service list related to the value of the received postcode may be transmitted to the client. Alternatively, when the received region selection information is multiplex information, a service list may be transmitted to the client based on the client's received channel information indicated by the multiplex information. When the received region selection information is region ID information, a service list associated with the region indicated by the region ID information may be transmitted to the client.

S6102 of transmitting the media data (or the service list) includes transmitting a service list based on the received region selection information.

A reception device according to embodiments may receive the tailored service list to receive a region-based media data service.

A transmission device according to embodiments may include a transmitter configured to transmit service entry points (or service list offering information) and a receiver configured to receive a request for a service list, wherein the transmitter may transmit a tailored service list (or media data) based on the received region selection information.

Each of the operations of the transmission method according to the embodiments may be performed by a processor of the transmission device and a memory storing instructions for executing the processor. The components of the transmission device performing each operation may be physically separated by function, or may be logically separated even if not physically separated. Even when multiple functions are performed by one processor and one memory, they may be logically separated by function and represented by function-specific components. The components of the device that perform each operation may be referred to as parts, units, modules, or other appropriate names.

The transmission/reception method/device according to embodiments may filter the service list on the server side and transmit the filtered list to the client, thereby reducing the amount of data transmitted between the server and the client. Furthermore, the performance burden on the client for filtering the service list is reduced, and a consistent service list may be provided based on information indicating the region of the client. In addition, since the region selection information includes postcode information, the client may receive region-specific services without disclosing the receiver's reception performance, which is advantageous for security.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications may be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/"and"," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted,

49 when a specific condition is satisfied, to perform the related operation or interpret the related definition according to the specific condition.

Operations according to the embodiments described in the present disclosure may be performed by a transmission/ reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/ or a combination thereof may be stored in the processor or the memory.

The operations according to the above-described embodiments may be performed by the transmission device and/or the reception device according to the embodiments. The transmission/reception device may include a transmitter/ receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

Various embodiments have been described in the best mode for carrying out the invention.

INDUSTRIAL APPLICABILITY

It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

What is claimed is:

1. A method by a DVB-I (Digital Video Broadcasting-Internet) client comprising:
transmitting a query for service list entry points for at least one of a DVB broadcast service or DVB-I service;
receiving the service list entry points based on the query;
requesting a service list; and
receiving the service list,
wherein the service list includes region list information for a region for the service list,
wherein the region list information includes:
country code information for a list of countries that make the region,
a region identifier for identifying the region,
postcode information for a primary region,
region name information for representing a readable name of the primary region, and
region information for a secondary sub-region within the region.

2. The method of claim 1, wherein the service list entry points comprise service list offering information,

50 wherein the requesting of the service list comprises:
transmitting region selection information based on the service list offering information; and
wherein the receiving of the service list comprises:
receiving the service list based on the region selection information.

3. The method of claim 2, wherein the service list offering information comprises a type of the region selection information supported by a server.

4. The method of claim 3, wherein the type of the region selection information comprises at least one of:
information indicating a postcode;
information indicating a receivable multiplex; or
information indicating a region ID.

5. The method of claim 4, wherein the region selection information is presented by listing at least one of the information indicating the postcode, the information indicating the receivable multiplex, or the information indicating the region ID.

6. The method of claim 5, wherein the region selection information comprises the information indicating the postcode.

7. The method of claim 4, wherein the type of the region selection information is provided with boolean information indicating whether the server supports each of the information indicating the postcode, the information indicating the receivable multiplex, and the information indicating the region ID.

8. The method of claim 5, wherein the transmitting of the region selection information comprises:
transmitting one of postcode information, multiplex information, and region ID information, corresponding to the type of the region selection information.

9. A method comprising:
receiving a query for service list entry points for at least one of a DVB broadcast service or DVB-I service;
transmitting the service list entry points based on the query;
receiving a request for a service list; and
transmitting the service list,
wherein the service list includes region list information for a region for the service list,
wherein the region list information includes;
country code information for a list of countries that make the region,
a region identifier for identifying the region,
postcode information for a primary region,
region name information for representing a readable name of the primary region, and
region information for a secondary sub-region within the region.

10. The method of claim 9, wherein the service list entry points comprise service list offering information,
wherein the receiving of the request for the service list comprises:
receiving region selection information based on the service list offering information; and
wherein the transmitting of the service list comprises:
receiving the service list based on the region selection information.

11. The method of claim 10, wherein the service list offering information comprises a type of the region selection information supported by a server.

12. The method of claim 11, wherein the type of the region selection information comprises at least one of:
information indicating a postcode;
information indicating a receivable multiplex; or
information indicating a region ID.

13. The method of claim 12, wherein the region selection information is presented by listing at least one of the information indicating the postcode, the information indicating the receivable multiplex, or the information indicating the region ID.

14. The method of claim 13, wherein the region selection information comprises the information indicating the postcode.

15. The method of claim 12, wherein the type of the region selection information is provided with boolean information indicating whether the server supports each of the information indicating the postcode, the information indicating the receivable multiplex, and the information indicating the region ID.

16. The method of claim 13, wherein the receiving of the region selection information comprises:

receiving one of postcode information, multiplex information, and region ID information, corresponding to the type of the region selection information.

17. A DVB-I (Digital Video Broadcasting-Internet) client comprising:

a memory; and at least one processor connected to the memory, the at least one processor configured to:

transmit a query for service list entry points for at least one of a DVB broadcast service or DVB-I service;

receive the service list entry points based on the query;

request a service list; and receive the service list, wherein the service list includes region list information for a region for the service list, wherein the region list information includes:

country code information for a list of countries that make the region, a region identifier for identifying the region, postcode information for a primary region, region name information for representing a readable name of the primary region, and region information for a secondary sub-region within the region.

18. An apparatus comprising:

a memory; and at least one processor connected to the memory, the at least one processor configured to:

receive a query for service list entry points for at least one of a DVB broadcast service or DVB-I service;

transmit the service list entry points based on the query;

receive a request for a service list; and transmit the service list, wherein the service list includes region list information for a region for the service list, wherein the region list information includes:

country code information for a list of countries that make the region, a region identifier for identifying the region, postcode information for a primary region, region name information for representing a readable name of the primary region, and region information for a secondary sub-region within the region.

* * * * *